(12) United States Patent
Smith et al.

(10) Patent No.: US 10,819,444 B2
(45) Date of Patent: Oct. 27, 2020

(54) METHODS AND SYSTEMS FOR DISTRIBUTING FIBER OPTIC TELECOMMUNICATION SERVICES TO LOCAL AREAS AND FOR SUPPORTING DISTRIBUTED ANTENNA SYSTEMS

(71) Applicant: CommScope Technologies LLC, Hickory, NC (US)

(72) Inventors: Trevor D. Smith, Eden Prairie, MN (US); M'hamed Anis Khemakhem, San Diego, CA (US)

(73) Assignee: CommScope Technologies LLC, Hickory, NC (US)

( * ) Notice: Subject to any disclaimer, the term of this patent is extended or adjusted under 35 U.S.C. 154(b) by 29 days.

(21) Appl. No.: 15/231,138

(22) Filed: Aug. 8, 2016

(65) Prior Publication Data

US 2017/0063470 A1    Mar. 2, 2017

Related U.S. Application Data

(63) Continuation of application No. 14/486,453, filed on Sep. 15, 2014, now Pat. No. 9,414,137, which is a
(Continued)

(51) Int. Cl.
*H04B 10/80*     (2013.01)
*G02B 6/48*      (2006.01)
(Continued)

(52) U.S. Cl.
CPC .......... *H04B 10/807* (2013.01); *G02B 6/483* (2013.01); *H04B 10/25753* (2013.01);
(Continued)

(58) Field of Classification Search
None
See application file for complete search history.

(56) References Cited

U.S. PATENT DOCUMENTS

| 1,276,825 A | 8/1918 | Swope |
| 1,442,999 A | 1/1923 | Boyle |

(Continued)

FOREIGN PATENT DOCUMENTS

| DE | 42 26 368 A1 | 2/1994 |
| EP | 1 107 031 A1 | 6/2001 |

(Continued)

OTHER PUBLICATIONS

"V-Linx™ EZ-Spool Combiner", Furukawa Electric North America, Copyright © 2007.

(Continued)

*Primary Examiner* — Oommen Jacob
(74) *Attorney, Agent, or Firm* — Merchant & Gould P.C.

(57) ABSTRACT

A fiber optic network includes a fiber distribution hub including at least one splitter and a termination field; a plurality of drop terminals optically connected to the fiber distribution hub by a plurality of distribution cables; and a distributed antenna system (DAS). The DAS includes a base station and a plurality of antenna nodes. The base station is optically connected to the fiber distribution hub and the antenna nodes are optically connected to the drop terminals. Example splitters include a passive optical power splitter and a passive optical wavelength splitter. Signals from a central office can be routed through the passive optical power splitter before being routed to subscriber locations optically connected to the drop terminals. Signals from the base station can be routed through the wavelength splitter before being routed to the antenna nodes.

18 Claims, 35 Drawing Sheets

Related U.S. Application Data continuation of application No. 13/086,909, filed on Apr. 14, 2011, now Pat. No. 8,837,940.

(60) Provisional application No. 61/324,284, filed on Apr. 14, 2010.

(51) Int. Cl.
*H04Q 11/00* (2006.01)
*H04B 10/2575* (2013.01)
*G02B 6/44* (2006.01)
*H04W 88/08* (2009.01)

(52) U.S. Cl.
CPC ....... *H04Q 11/0067* (2013.01); *G02B 6/4457* (2013.01); *H04Q 2011/009* (2013.01); *H04W 88/085* (2013.01)

(56) References Cited

U.S. PATENT DOCUMENTS

| | | |
|---|---|---|
| 1,446,410 A | 2/1923 | Bennett et al. |
| 1,474,580 A | 11/1923 | Clark et al. |
| RE20,995 E | 2/1939 | Beasley |
| 2,434,363 A | 1/1948 | Lenox |
| 2,502,496 A | 4/1950 | Wickman |
| 2,521,226 A | 9/1950 | Keller |
| 2,727,703 A | 12/1955 | Bonnett |
| 3,091,433 A | 5/1963 | Riley, Jr. |
| 3,131,729 A | 5/1964 | Leysinger |
| 3,657,491 A | 4/1972 | Ryder et al. |
| 3,667,417 A | 6/1972 | Clinkenbeard |
| 3,920,308 A | 11/1975 | Murray |
| 3,940,086 A | 2/1976 | Stoquelet |
| 4,053,118 A | 10/1977 | Aikins |
| 4,081,258 A | 3/1978 | Goell et al. |
| 4,282,954 A | 8/1981 | Hill |
| 4,365,865 A | 12/1982 | Stiles |
| 4,384,688 A | 5/1983 | Smith |
| 4,420,220 A | 12/1983 | Dean et al. |
| 4,497,537 A | 2/1985 | Dench |
| 4,552,432 A | 11/1985 | Anderson et al. |
| 4,587,801 A | 5/1986 | Missout et al. |
| 4,635,875 A | 1/1987 | Apple |
| 4,657,140 A | 4/1987 | Zagar et al. |
| 4,666,237 A | 5/1987 | Mallinson |
| 4,669,705 A | 6/1987 | Langston |
| 4,695,127 A | 9/1987 | Ohlhaber et al. |
| 4,723,832 A | 2/1988 | Okazato et al. |
| 4,767,073 A | 8/1988 | Malzacher |
| 4,787,705 A | 11/1988 | Shinmoto et al. |
| 4,846,343 A | 7/1989 | Rupert |
| 4,867,527 A | 9/1989 | Dotti et al. |
| 4,869,437 A | 9/1989 | Berz et al. |
| 4,880,182 A | 11/1989 | Gelfman |
| 4,883,337 A | 11/1989 | Dahlgren |
| 4,895,426 A | 1/1990 | Pinson |
| 4,913,369 A | 4/1990 | Lia et al. |
| 4,938,432 A | 7/1990 | Kurt et al. |
| 4,939,798 A | 7/1990 | Last |
| 4,940,859 A | 7/1990 | Peterson |
| 5,013,121 A | 5/1991 | Anton et al. |
| 5,016,554 A | 5/1991 | Harris, Jr. et al. |
| 5,066,256 A | 11/1991 | Ward, Sr. |
| 5,074,863 A | 12/1991 | Dines |
| 5,109,467 A | 4/1992 | Hogan et al. |
| 5,168,969 A | 12/1992 | Mayhew |
| 5,185,843 A | 2/1993 | Aberson et al. |
| 5,202,780 A * | 4/1993 | Fussanger ........... H04J 14/0226 14/226 |
| 5,265,815 A | 11/1993 | Soyka et al. |
| 5,268,971 A | 12/1993 | Nilsson et al. |
| 5,280,861 A | 1/1994 | Corriveau |
| 5,317,663 A | 5/1994 | Beard et al. |
| 5,323,479 A | 6/1994 | Allen |
| 5,326,040 A | 7/1994 | Kramer |
| 5,335,874 A | 8/1994 | Shrum et al. |
| 5,388,781 A | 2/1995 | Sauber |
| 5,394,466 A | 2/1995 | Schneider |
| 5,457,557 A * | 10/1995 | Zarem ................. G02B 6/4202 398/116 |
| 5,469,523 A | 11/1995 | Blew et al. |
| 5,485,972 A | 1/1996 | Mummery et al. |
| 5,494,234 A | 2/1996 | Kramer |
| 5,494,446 A | 2/1996 | DeLucia et al. |
| 5,497,444 A | 3/1996 | Wheeler |
| 5,519,275 A | 5/1996 | Scott et al. |
| 5,520,346 A | 5/1996 | Hoban |
| 5,522,561 A | 6/1996 | Koyamatsu et al. |
| 5,529,186 A | 6/1996 | Bass |
| 5,539,851 A | 7/1996 | Taylor et al. |
| 5,544,836 A | 8/1996 | Pera |
| 5,551,545 A | 9/1996 | Gelfman |
| 5,555,336 A | 9/1996 | Winslow |
| 5,555,338 A | 9/1996 | Haag et al. |
| 5,557,698 A | 9/1996 | Gareis et al. |
| 5,638,481 A | 6/1997 | Arnett |
| 5,651,081 A | 7/1997 | Blew et al. |
| 5,677,974 A | 10/1997 | Elms et al. |
| 5,682,256 A | 10/1997 | Motley et al. |
| 5,699,176 A | 12/1997 | Cohen |
| 5,703,990 A | 12/1997 | Robertson et al. |
| 5,709,347 A | 1/1998 | Hoffmann et al. |
| 5,717,810 A | 2/1998 | Wheeler |
| 5,718,397 A | 2/1998 | Stevens |
| 5,745,627 A | 4/1998 | Arroyo et al. |
| 5,749,148 A | 5/1998 | White, III et al. |
| 5,773,757 A | 6/1998 | Kenney et al. |
| 5,778,122 A | 7/1998 | Giebel et al. |
| 5,787,219 A | 7/1998 | Mueller et al. |
| 5,864,672 A | 1/1999 | Bodeep et al. |
| 5,880,865 A | 3/1999 | Lu et al. |
| 5,913,003 A | 6/1999 | Arroyo et al. |
| 5,915,062 A | 6/1999 | Jackson et al. |
| 5,915,640 A | 6/1999 | Wagter et al. |
| 5,946,617 A | 8/1999 | Portaro et al. |
| 5,987,203 A | 11/1999 | Abel et al. |
| 5,992,787 A | 11/1999 | Burke |
| 6,087,587 A | 7/2000 | Gonzalez |
| 6,169,834 B1 | 1/2001 | Keller |
| 6,195,487 B1 | 2/2001 | Anderson et al. |
| 6,215,938 B1 | 4/2001 | Reitmeier et al. |
| 6,220,413 B1 | 4/2001 | Walters et al. |
| 6,236,789 B1 | 5/2001 | Fitz |
| 6,315,598 B1 | 11/2001 | Elliot et al. |
| 6,343,172 B1 | 1/2002 | Schiestle et al. |
| 6,363,192 B1 | 3/2002 | Spooner |
| 6,367,347 B1 | 4/2002 | Blaschke et al. |
| 6,385,381 B1 | 5/2002 | Janus et al. |
| 6,463,198 B1 | 10/2002 | Coleman et al. |
| 6,494,396 B2 | 12/2002 | Sugata |
| 6,496,641 B1 | 12/2002 | Mahony |
| 6,503,097 B2 | 1/2003 | Archambault |
| 6,511,009 B1 | 1/2003 | Harrison et al. |
| 6,522,826 B2 | 2/2003 | Gregory |
| 6,546,175 B1 | 4/2003 | Wagman et al. |
| 6,554,221 B2 | 4/2003 | Hinds |
| 6,567,592 B1 | 5/2003 | Gimblet et al. |
| 6,591,051 B2 | 7/2003 | Solheid et al. |
| 6,599,025 B1 | 7/2003 | Deutsch |
| 6,616,080 B1 | 9/2003 | Edwards et al. |
| 6,625,374 B2 | 9/2003 | Holman et al. |
| 6,640,041 B2 | 10/2003 | Ichinari et al. |
| 6,643,443 B2 | 11/2003 | Holman et al. |
| 6,661,961 B1 | 12/2003 | Allen et al. |
| 6,669,129 B1 | 12/2003 | Shah |
| 6,674,966 B1 | 1/2004 | Koonen |
| 6,687,437 B1 | 2/2004 | Starnes et al. |
| 6,711,339 B2 | 3/2004 | Puetz et al. |
| 6,714,710 B2 | 3/2004 | Gimblet |
| 6,719,461 B2 | 4/2004 | Cull |
| 6,721,484 B1 | 4/2004 | Blankenship et al. |
| 6,738,547 B2 | 5/2004 | Spooner |
| 6,755,575 B2 | 6/2004 | Kronlund et al. |

(56) References Cited

U.S. PATENT DOCUMENTS

| | | |
|---|---|---|
| 6,758,693 B2 | 7/2004 | Inagaki et al. |
| 6,785,450 B2 | 8/2004 | Wagman et al. |
| 6,785,558 B1 | 8/2004 | Stratford et al. |
| 6,801,767 B1 | 10/2004 | Schwartz et al. |
| 6,834,517 B1 | 12/2004 | Sheehy, Jr. |
| 6,847,767 B2 | 1/2005 | Hurley et al. |
| 6,856,748 B1 | 2/2005 | Elkins, II et al. |
| 6,885,674 B2 | 4/2005 | Hunt et al. |
| 6,895,185 B1 | 5/2005 | Chung et al. |
| 6,899,467 B2 | 5/2005 | McDonald et al. |
| 6,915,058 B2 | 7/2005 | Pons |
| 6,926,449 B1 | 8/2005 | Keenum et al. |
| 6,931,183 B2 | 8/2005 | Panak et al. |
| 6,933,441 B2 | 8/2005 | Fuller et al. |
| 6,937,725 B2 | 8/2005 | Liao |
| 6,948,680 B2 | 9/2005 | Ganster |
| 6,963,552 B2 | 11/2005 | Sabat, Jr. et al. |
| 6,965,718 B2 | 11/2005 | Koertel |
| 6,983,095 B2 | 1/2006 | Reagan et al. |
| 6,997,410 B1 | 2/2006 | Huang |
| 7,000,863 B2 | 2/2006 | Bethea et al. |
| 7,006,740 B1 | 2/2006 | Parris |
| 7,011,538 B2 | 3/2006 | Chang |
| 7,016,590 B2 | 3/2006 | Tanaka et al. |
| 7,017,721 B1 | 3/2006 | Bradford et al. |
| 7,035,513 B2 | 4/2006 | Mohler et al. |
| 7,044,278 B2 | 5/2006 | Cleveland |
| 7,090,406 B2 | 8/2006 | Melton et al. |
| 7,090,407 B2 | 8/2006 | Melton et al. |
| 7,111,990 B2 | 9/2006 | Melton et al. |
| 7,113,679 B2 | 9/2006 | Melton et al. |
| 7,120,347 B2 | 10/2006 | Blackwell, Jr. et al. |
| 7,158,703 B2 | 1/2007 | Mjelstad |
| 7,198,409 B2 | 4/2007 | Smith et al. |
| 7,220,144 B1 | 5/2007 | Elliot et al. |
| 7,233,731 B2 | 6/2007 | Solheid et al. |
| 7,266,283 B2 | 9/2007 | Kline et al. |
| 7,272,281 B2 | 9/2007 | Stahulak et al. |
| 7,292,763 B2 | 11/2007 | Smith et al. |
| 7,310,430 B1 | 12/2007 | Mallya et al. |
| 7,315,681 B2 | 1/2008 | Kewitsch |
| 7,333,708 B2 | 2/2008 | Blackwell, Jr. et al. |
| 7,346,253 B2 | 3/2008 | Bloodworth et al. |
| 7,349,605 B2 | 3/2008 | Noonan et al. |
| 7,362,936 B2 | 4/2008 | Stark et al. |
| 7,364,108 B2 | 4/2008 | Kim et al. |
| 7,369,739 B2 | 5/2008 | Kline et al. |
| 7,371,014 B2 | 5/2008 | Willis et al. |
| 7,397,997 B2 | 7/2008 | Ferris et al. |
| 7,400,814 B1 | 7/2008 | Hendrickson et al. |
| 7,400,815 B2 | 7/2008 | Mertesdorf et al. |
| 7,401,985 B2 | 7/2008 | Aronson et al. |
| 7,418,181 B2 | 8/2008 | Zimmel et al. |
| 7,445,389 B2 | 11/2008 | Aronson |
| 7,477,829 B2 | 1/2009 | Kaplan |
| 7,480,437 B2 | 1/2009 | Ferris et al. |
| 7,489,849 B2 | 2/2009 | Reagan et al. |
| 7,494,287 B2 | 2/2009 | Wang et al. |
| 7,499,616 B2 | 3/2009 | Aronson et al. |
| 7,512,304 B2 | 3/2009 | Gronvall et al. |
| 7,522,806 B2 | 4/2009 | Hendrickson et al. |
| 7,539,387 B2 | 5/2009 | Mertesdorf et al. |
| 7,539,388 B2 | 5/2009 | Mertesdorf et al. |
| 7,546,018 B2 | 6/2009 | Hendrickson et al. |
| 7,548,679 B2 | 6/2009 | Hirano et al. |
| 7,565,055 B2 | 7/2009 | Lu et al. |
| 7,565,080 B2 | 7/2009 | Mickelsson et al. |
| 7,572,065 B2 | 8/2009 | Lu et al. |
| 7,591,595 B2 | 9/2009 | Lu et al. |
| 7,627,222 B2 | 12/2009 | Reagan et al. |
| 7,643,713 B2 | 1/2010 | Buthe et al. |
| 7,653,282 B2 | 1/2010 | Blackwell, Jr. et al. |
| 7,676,136 B2 | 3/2010 | Wakileh et al. |
| 7,680,388 B2 | 3/2010 | Reagan et al. |
| 7,692,098 B2 | 4/2010 | Wyatt, II et al. |
| 7,712,976 B2 | 5/2010 | Aronson et al. |
| 7,715,679 B2 | 5/2010 | Kowalczyk et al. |
| 7,720,343 B2 | 5/2010 | Barth et al. |
| 7,744,288 B2 | 6/2010 | Lu et al. |
| 7,751,672 B2 | 7/2010 | Smith et al. |
| 7,756,379 B2 | 7/2010 | Kowalczyk et al. |
| 7,762,727 B2 | 7/2010 | Aronson |
| 7,778,510 B2 | 8/2010 | Aronson et al. |
| 7,805,044 B2 | 9/2010 | Reagan et al. |
| 7,809,234 B2 | 10/2010 | Smith et al. |
| 7,816,602 B2 | 10/2010 | Landry et al. |
| 7,844,158 B2 | 11/2010 | Gronvall et al. |
| 7,869,681 B2 | 1/2011 | Battey et al. |
| 7,869,682 B2 | 1/2011 | Kowalzyk et al. |
| 7,873,255 B2 | 1/2011 | Reagan et al. |
| 7,876,989 B2 | 1/2011 | Aronson et al. |
| 7,894,701 B2 | 2/2011 | Kowalczyk et al. |
| 7,897,873 B2 | 3/2011 | Gemme et al. |
| 7,941,027 B2 | 5/2011 | Mertesdorf et al. |
| 8,041,178 B2 | 10/2011 | Lu et al. |
| 8,060,081 B2 | 11/2011 | Owens et al. |
| 8,083,417 B2 | 12/2011 | Aronson et al. |
| 8,121,458 B2 | 2/2012 | Barth et al. |
| 8,155,525 B2 | 4/2012 | Cox |
| 8,175,433 B2 | 5/2012 | Caldwell et al. |
| 8,204,348 B2 | 6/2012 | Keller et al. |
| 8,244,087 B2 | 8/2012 | Sales Casals et al. |
| 8,249,410 B2 | 8/2012 | Andrus et al. |
| 8,254,740 B2 | 8/2012 | Smith et al. |
| 8,263,861 B2 | 9/2012 | Landry et al. |
| 8,270,387 B2 | 9/2012 | Cannon et al. |
| 8,270,838 B2 | 9/2012 | Cox |
| RE43,762 E | 10/2012 | Smith et al. |
| 8,297,854 B2 | 10/2012 | Bickham et al. |
| 8,301,003 B2 | 10/2012 | de los Santos Campos et al. |
| 8,328,433 B2 | 12/2012 | Furuyama |
| 8,532,490 B2 | 9/2013 | Smith et al. |
| 8,569,618 B2 | 10/2013 | Landry et al. |
| 8,583,100 B2 | 11/2013 | Koziy et al. |
| 8,649,649 B2 * | 2/2014 | Smith ................ G02B 6/46 385/135 |
| 8,737,454 B2 | 5/2014 | Wala et al. |
| 8,837,940 B2 | 9/2014 | Smith et al. |
| 9,414,137 B2 | 8/2016 | Smith et al. |
| 2001/0048044 A1 | 12/2001 | Sugata |
| 2002/0003186 A1 | 1/2002 | Hinds |
| 2002/0023814 A1 | 2/2002 | Poutiatine |
| 2002/0126980 A1 | 9/2002 | Holman et al. |
| 2002/0136510 A1 | 9/2002 | Heinz et al. |
| 2002/0164121 A1 | 11/2002 | Brennan, III et al. |
| 2002/0171002 A1 | 11/2002 | Kretsch et al. |
| 2003/0037480 A1 | 2/2003 | Davis |
| 2003/0174996 A1* | 9/2003 | Henschel ............ G02B 6/2804 385/135 |
| 2003/0215197 A1 | 11/2003 | Simon et al. |
| 2004/0170369 A1 | 9/2004 | Pons |
| 2004/0228598 A1* | 11/2004 | Allen .................. G02B 6/4454 385/135 |
| 2004/0244430 A1 | 12/2004 | Sheehy, Jr. |
| 2005/0002633 A1* | 1/2005 | Solheid ............... G02B 6/3849 385/135 |
| 2005/0105873 A1* | 5/2005 | Reagan ............... G02B 6/4452 385/135 |
| 2005/0172328 A1 | 8/2005 | Park et al. |
| 2005/0213920 A1 | 9/2005 | Tanaka et al. |
| 2005/0247136 A1 | 11/2005 | Cross et al. |
| 2005/0258411 A1 | 11/2005 | Zeitler |
| 2005/0266854 A1 | 12/2005 | Niiho et al. |
| 2006/0008231 A1* | 1/2006 | Reagan ............... G02B 6/3849 385/135 |
| 2006/0093303 A1* | 5/2006 | Reagan ............... G02B 6/4466 385/135 |
| 2006/0163403 A1 | 7/2006 | Dickson |
| 2006/0183362 A1 | 8/2006 | Mullaney et al. |
| 2006/0210230 A1 | 9/2006 | Kline et al. |
| 2006/0291787 A1 | 12/2006 | Seddon |
| 2007/0025675 A1 | 2/2007 | Kramer |
| 2007/0065089 A1 | 3/2007 | Matsuoka et al. |

(56) References Cited

U.S. PATENT DOCUMENTS

| | | | |
|---|---|---|---|
| 2007/0071189 A1* | 3/2007 | Henning | H04M 11/062 379/93.06 |
| 2007/0110026 A1 | 5/2007 | Sinha et al. | |
| 2007/0165995 A1 | 7/2007 | Reagan et al. | |
| 2007/0269170 A1 | 11/2007 | Easton et al. | |
| 2008/0008437 A1 | 1/2008 | Reagan et al. | |
| 2008/0013910 A1 | 1/2008 | Reagan et al. | |
| 2008/0025725 A1 | 1/2008 | Jette et al. | |
| 2008/0035778 A1 | 2/2008 | Belden et al. | |
| 2008/0037941 A1 | 2/2008 | Mallya et al. | |
| 2008/0037945 A1 | 2/2008 | Gniadek et al. | |
| 2008/0063397 A1 | 3/2008 | Hu et al. | |
| 2008/0159744 A1 | 7/2008 | Soto et al. | |
| 2008/0218947 A1 | 9/2008 | Atkinson | |
| 2008/0236209 A1 | 10/2008 | Conti et al. | |
| 2008/0315030 A1 | 12/2008 | Hendrickson et al. | |
| 2009/0016741 A1* | 1/2009 | Smith | H04J 14/02 398/158 |
| 2009/0060531 A1 | 3/2009 | Biegert et al. | |
| 2009/0074370 A1 | 3/2009 | Kowalzyk et al. | |
| 2009/0162016 A1 | 6/2009 | Lu et al. | |
| 2009/0190894 A1 | 7/2009 | Nhep et al. | |
| 2009/0196616 A1* | 8/2009 | Bolster | G02B 6/4452 398/79 |
| 2009/0307984 A1* | 12/2009 | Thompson | H04Q 1/10 49/484.1 |
| 2009/0317047 A1 | 12/2009 | Smith et al. | |
| 2010/0014868 A1 | 1/2010 | McGlynn et al. | |
| 2010/0021164 A1 | 1/2010 | Luk et al. | |
| 2010/0054680 A1 | 3/2010 | Lochkovic et al. | |
| 2010/0090830 A1 | 4/2010 | Conti et al. | |
| 2010/0166376 A1 | 7/2010 | Nair et al. | |
| 2010/0200270 A1 | 8/2010 | Gemme et al. | |
| 2010/0247051 A1 | 9/2010 | Kowalczyk et al. | |
| 2011/0091180 A1 | 4/2011 | Kowalzyk et al. | |
| 2011/0094274 A1 | 4/2011 | Conti et al. | |
| 2011/0158599 A1 | 6/2011 | Kowalczyk et al. | |
| 2011/0211799 A1* | 9/2011 | Conner | G02B 6/4471 385/135 |
| 2011/0216751 A1 | 9/2011 | Bianchi et al. | |
| 2011/0280527 A1 | 11/2011 | Tamura | |
| 2011/0293227 A1 | 12/2011 | Wu | |
| 2011/0311191 A1 | 12/2011 | Hayashishita et al. | |
| 2012/0008904 A1 | 1/2012 | Han et al. | |
| 2012/0008905 A1 | 1/2012 | Han et al. | |
| 2012/0008906 A1 | 1/2012 | Han et al. | |
| 2012/0057821 A1 | 3/2012 | Aronson et al. | |
| 2012/0080225 A1 | 4/2012 | Kim et al. | |
| 2012/0114288 A1 | 5/2012 | Wu | |
| 2012/0191997 A1 | 7/2012 | Miller | |
| 2012/0281952 A1 | 11/2012 | McColloch | |
| 2012/0281953 A1 | 11/2012 | Choi et al. | |
| 2012/0288245 A1 | 11/2012 | Hurley et al. | |
| 2013/0011106 A1 | 1/2013 | Congdon, II et al. | |
| 2013/0022318 A1 | 1/2013 | Fingler et al. | |
| 2015/0309271 A1* | 10/2015 | Huegerich | G02B 6/4448 385/101 |
| 2015/0309276 A1* | 10/2015 | Collart | G02B 6/4452 385/135 |
| 2016/0077296 A1* | 3/2016 | Kowalczyk | G02B 6/4446 385/135 |

FOREIGN PATENT DOCUMENTS

| | | |
|---|---|---|
| FR | 2 566 997 A1 | 1/1986 |
| JP | 9-236709 | 9/1997 |
| JP | 11-349230 | 12/1999 |
| JP | 2003-114339 | 4/2003 |
| JP | 2005-73365 | 3/2005 |
| JP | 2005-249858 | 9/2005 |
| WO | WO 2007/062606 A1 | 6/2007 |

OTHER PUBLICATIONS

"V-Linx™ EZ-Spool Terminal", Furukawa Electric North America, Copyright © 2007.

7 Inch Modules, ADC Telecommunications, Inc, © 1998, "7 Inch Connector Module with IFC", pp. 127.

Above Ground Level (AGL) magazine; dated Jul. 2006 (vol. 3, No. 4) and Aug./Sep. 2006 (vol. 3, No. 5); pp. 1-8.

Broadband Properties *You Don't Know Jack?*; dated Jun. 2005; pp. 26-29.

Corning Cable Systems Evolant® *Solutions for Wireless Networks*; dated Sep. 2006; pp. 1-6.

Description of Admitted Prior Art, 30 pages.

F3DF Modules, ADC Telecommunications, Inc. © 1995, "Individual 12-Pack Assemblies", pp. 90.

Fiber Cable Management Products, Third Edition, ADC Telecommunications, Inc., © 1995, 1998.

Fiber Distribution Frame, Pre-Terminated Rear Load Connector Module, Installation Instructions, ADC Telecommunications, Inc., © 2000.

Fiber Main Distribution Frame (FMDF), Fiber Terminal Block, Installation Instructions, ADC Telecommunications, Inc., © 2001.

Fiber Panel Products—Cable Management Tray Panels, ADC Telecommunications, Inc., © 1994, 1996 "72 Fiber Distribution Module (FDM) with Intrafacility Fiber Cable", pp. 56.

Fiber Panel Products, Second Edition, ADC Telecommunications, Inc., © 1994, 1996.

FL2000 Products, ADC Telecommunications, Inc., © 1994, 1996.

FL2000 System—Preconfigured Panels, ADC Telecommunications, Inc., © 2000 "Rack or Cabinet Mount Termination Panel with Multifiber Cable", pp. 13.

FL2000 System, ADC Telecommunications, Inc., © 1994, 1996, "Rack Mount Panel with Intrafacility Fiber Cable", pp. 16.

IFC Style Frame Modules, ADC Telecommunications, Inc., © 1995, "Connector Module Equipped with IFC", pp. 27.

Next Generation Frame (NGF), Product Family Ordering Guide, ADC Telecommunications, Inc., © 1996, 1999, 2000, "Fiber Termination Blocks (FTB) Preterminated", pp. 8.

Next Generation Frame (NGF), Product Family Ordering Guide, ADC Telecommunications, Inc., © 1996, 1999, 2000.

Next Generation Frames—Fiber Termination Blocks, ADC Telecommunication, Inc., © 1998, "Fiber Termination Blocks (FTB) Preterminated" pp. 6.

Value-Added Module System, ADC Telecommunications, Inc., © 1993, 1194, 1998, "12-Pack Module Assemblies", pp. 30-31.

Webopedia "CO"; dated Apr. 23, 2008; pp. 1-4.

Wikipedia "Fiber to the premises (FTTP)"; dated Apr. 15, 2008; pp. 1-4.

Wikipedia "Fiber to the x (FTTX)"; Dated Apr. 15, 2008; pp. 1-4.

Wikipedia "local loop"; dated Apr. 16, 2008; pp. 1-2.

Wikipedia "Local-Area Network"; dated Apr. 18, 2008; pp. 1-3.

Wikipedia "Voice over Internet Protocol (VoIP)"; dated Apr. 18, 2008; pp. 1-14.

Wikipedia "Wireless local loop (WLL)"; dated Apr. 16, 2008; pp. 1-6.

Wikipedia *Network Operations Center*; dated Apr. 23, 2008; pp. 1-2.

\* cited by examiner

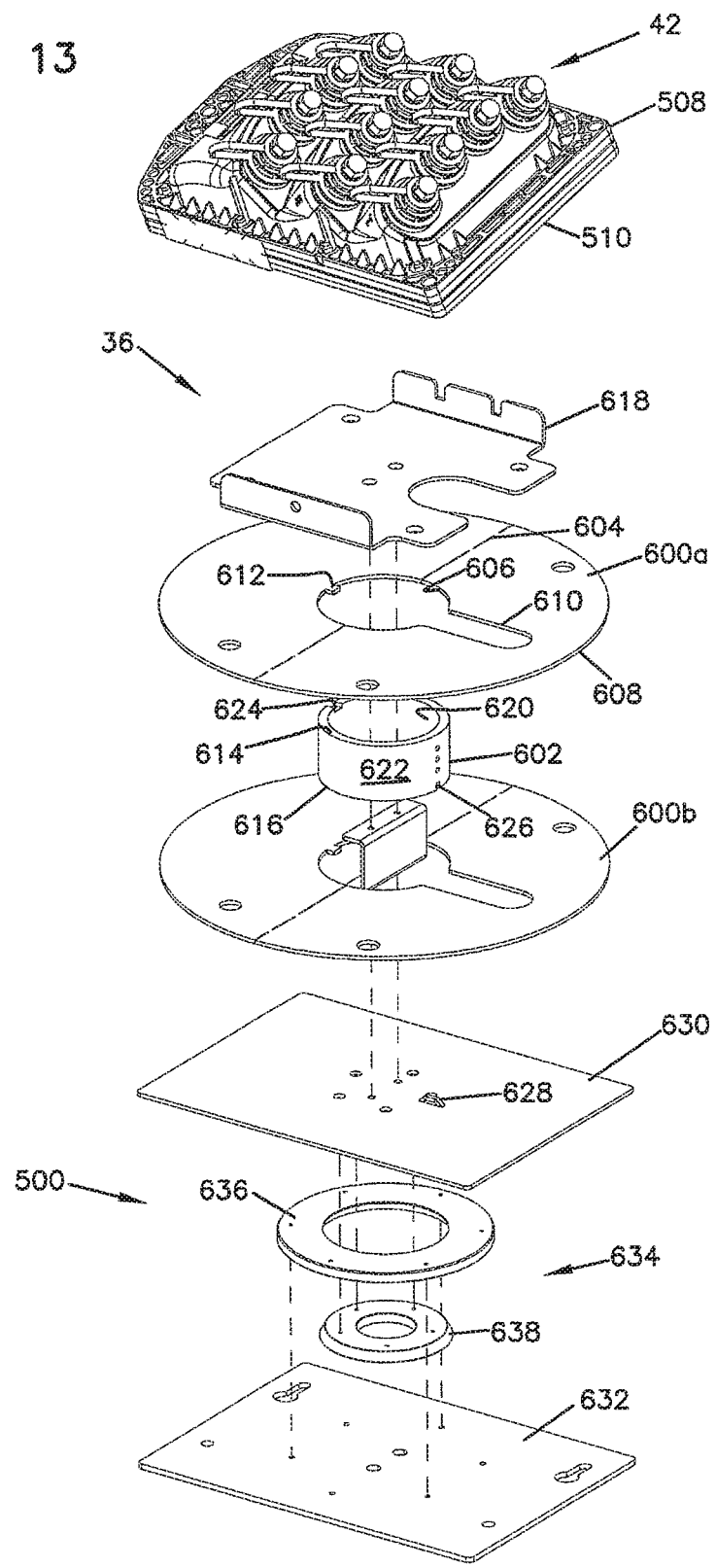

METHODS AND SYSTEMS FOR DISTRIBUTING FIBER OPTIC TELECOMMUNICATION SERVICES TO LOCAL AREAS AND FOR SUPPORTING DISTRIBUTED ANTENNA SYSTEMS

CROSS-REFERENCE TO RELATED APPLICATION

This application is a continuation of application Ser. No. 14/486,453, filed Sep. 15, 2014, now U.S. Pat. No. 9,414,137, which is a continuation of application Ser. No. 13/086,909, filed Apr. 14, 2011, now U.S. Pat. No. 8,837,940, which application claims the benefit of provisional application Ser. No. 61/324,284, filed Apr. 14, 2010, which applications are incorporated herein by reference in their entirety

BACKGROUND

Fiber optic telecommunications technology is becoming more prevalent as service providers strive to deliver higher bandwidth communication capabilities to customers/subscribers. The phrase "fiber to the x" (FTTX) generically refers to any network architecture that uses optical fiber in place of copper within a local distribution area. Example FTTX networks include fiber-to-the-node (FTTN) networks, fiber-to-the-curb (FTTC) networks and fiber-to-the-premises (FTTP) networks.

FTTN and FTTC networks use fiber optic cables that are run from a service provider's central office to a cabinet serving a neighborhood. Subscribers connect to the cabinet using traditional copper cable technology such as coaxial cable or twisted pair wiring. The difference between an FTTN network and an FTTC network relates to the area served by the cabinet. Typically, FTTC networks typically have cabinets closer to the subscribers that serve a smaller subscriber area than the cabinets of FTTN networks.

In an FTTP network, fiber optic cables are run from a service provider's central office all the way to the subscriber's premises. Example FTTP networks include fiber-to-the-home (FTTH) networks and fiber-to-the-building (FTTB) networks. In an FTTB network, optical fiber is routed from the central office over an optical distribution network to an optical network terminal (ONT) located in a building. The ONT typically includes active components that convert the optical signals into electrical signals. The electrical signals are typically routed from the ONT to the subscriber's residence or office space using traditional copper cable technology. In an FTTH network, fiber optic cable is run from the service provider's central office to an ONT located at the subscriber's residence or office space. Once again, at the ONT, optical signals are typically converted into an electrical signal for use with the subscriber's devices. However, to the extent that an end user may have devices that are compatible with optical signals, conversion of the optical signal to an electrical signal may not be necessary.

FTTP networks include active optical networks and passive optical networks. Active optical networks use electrically powered equipment (e.g., a switch, router, multiplexer or other equipment) to distribute signals and to provide signal buffering. Passive optical networks use passive beam splitters instead of electrically powered equipment to split optical signals. In a passive optical network, ONT's are typically equipped with equipment (e.g., wave-division multiplexing and time-division multiplexing equipment) that prevents incoming and outgoing signals from colliding and that filters out signals intended for other subscribers.

A typical passive FTTP network includes fiber optic cables routed from a central location (e.g., a service provider's central office) to a fiber distribution hub (FDH) located in a local area such as a neighborhood. The fiber distribution hub typically includes a cabinet in which one or more passive optical splitters are mounted. The splitters each are capable of splitting a signal carried by a single fiber to a plurality of fibers. The fibers split out at the splitter are routed from the fiber distribution hub into the local area using a fiber optic distribution cable. Fibers are routed from the fiber distribution cable to subscriber locations (e.g., homes, businesses or buildings) using various techniques. For example, fiber optic drop cables can be routed directly from a breakout location on the distribution cable to an ONT at a subscriber location. Alternatively, a stub cable can be routed from a breakout location of the distribution cable to a drop terminal. Drop cables can be run from the drop terminal to ONT's located at a plurality of premises located near the drop terminal.

Distributed Antenna Systems (DAS) are also becoming more prevalent. DAS are used to provide wireless service (e.g., cell phone, WiFi, etc.) within a given geographic area. DAS include a network of spaced-apart antenna nodes optically or electrically connected to a common control location (e.g., a base station). Each antenna node typically includes an antenna and a remote unit (i.e., a radio head, a remote transceiver, etc.).

DAS are one way that a wireless cellular service provider can improve the coverage provided by a given base station or group of base stations. In a DAS, radio frequency (RF) signals are communicated between a host unit and one or more remote units. The host unit can be communicatively coupled to one or more base stations directly by connecting the host unit to the base station using, for example, electrical or fiber telecommunications cabling. The host unit can also be communicatively coupled to one or more base stations wirelessly, for example, using a donor antenna and a bi-directional amplifier (BDA).

RF signals (also referred to here as "downlink RF signals") transmitted from the base station are received at the host unit. The host unit uses the downlink RF signals to generate a downlink transport signal that is distributed to one or more of the remote units. Each such remote unit receives the downlink transport signal and reconstructs the downlink RF signals based on the downlink transport signal and causes the reconstructed downlink RF signals to be radiated from at least one antenna coupled to or included in that remote unit. A similar process is performed in the uplink direction. RF signals (also referred to here as "uplink RF signals") transmitted from mobile units are received at each remote unit. Each remote unit uses the uplink RF signals to generate an uplink transport signal that is transmitted from the remote unit to the host unit. The host unit receives and combines the uplink transport signals transmitted from the remote units. The host unit reconstructs the uplink RF signals received at the remote units and communicates the reconstructed uplink RF signals to the base station. In this way, the coverage of the base station can be expanded using the DAS.

One or more intermediate devices (also referred to here as "expansion hubs" or "expansion units") can be placed between the host unit and the remote units in order to increase the number of remote units that a single host unit can feed and/or to increase the hub-unit-to-remote-unit distance.

One general type of DAS is configured to use optical fibers to communicatively couple the host unit to the remote units and/or expansions hubs. However, such a fiber-optic DAS typically makes use of dedicated optical fibers that are deployed specifically to support that DAS.

SUMMARY

Features of the present disclosure relate to methods and systems for efficiently and cost effectively distributing fiber optic communications services to a local area while concurrently supporting a Distributed Antenna System.

An aspect of the present disclosure relates to a fiber optic network including a fiber distribution hub and a plurality of drop terminals (i.e., multi-service terminals) optically connected to the fiber distribution hub by a plurality of fiber optic distribution cables. The fiber optic network is used to connect antenna nodes of a Distributed Antenna System to a base station. For example, a feeder cable (e.g., an F1 cable) can be used to connect the base station to the fiber distribution hub, drop cables can be used to connect the antenna nodes to the drop terminals, and the distribution cables connect the drop terminals to the fiber distribution hub. In this way, the optical network provides optical signal pathways between the antenna nodes and the base station for linking the base station to the antenna nodes.

Another aspect of the present disclosure relates to a method for supporting a Distributed Antenna System by using excess capacity of an existing FTTX network. In this way, a new Distributed Antenna System can be deployed in the field while minimizing the amount of new optical fiber that need be installed to support the Distributed Antenna System.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

FIG. 13 is an exploded perspective view of a drop terminal suitable for use in the fiber optic networks of FIGS. 1, 5 and 8.

DETAILED DESCRIPTION

Figure 1:
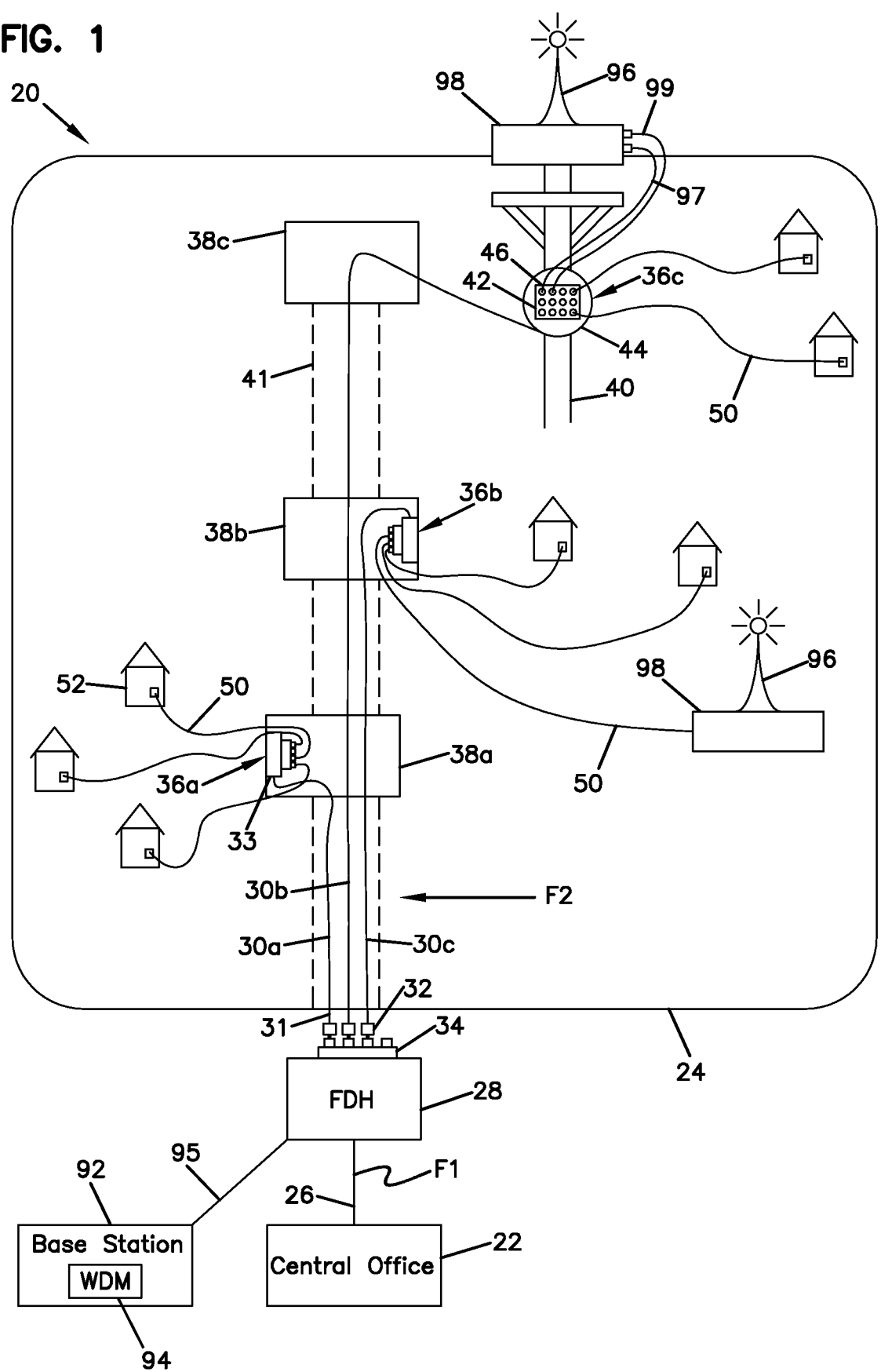
FIG. 1 shows a fiber optic network in accordance with the principles of the present disclosure.

Reference will now be made in detail to the exemplary aspects of the present disclosure that are illustrated in the accompanying drawings. Wherever possible, the same reference numbers will be used throughout the drawings to refer to the same or like structure.

An aspect of the present disclosure relates to a fiber optic network including a fiber distribution hub and a plurality of drop terminals (i.e., multi-service terminals) optically connected to the fiber distribution hub by a plurality of fiber optic distribution cables. The fiber optic network is used to connect antenna nodes of a Distributed Antenna System to a base station. For example, a feeder cable (e.g., an F1 cable) can be used to connect the base station to the fiber distribution hub, drop cables can be used to connect the antenna nodes to the drop terminals, and the distribution cables connect the drop terminals to the fiber distribution hub. The fiber optic network can also be used to connect a central office to a plurality of subscriber locations so as to provide the subscriber locations with service. For example, a feeder cable (e.g., an F1 cable) can be used to connect the central office to the fiber distribution hub, drop cables can be used to connect the subscriber locations to the drop terminals, and the distribution cables connect the drop terminals to the fiber distribution hub.

The base station includes active electrical components for managing the various signals fed back and forth between the antenna nodes and the base station. For example, the base station can include a plurality of transceivers for receiving and transmitting signals and a power amplifier for amplifying the signals. The base station can be configured for any one or more telecommunications standards including 3G (e.g., GSM, EDGE, UMTS, CDMA, DECT, WiMAX, etc.), LTE, and 4G. In one embodiment, the base station includes optical multiplexers (e.g., wavelength division multiplexers) to join signal transmitted through the feeder cable to the FDH and to separate signals received from the FDH through the feeder cable.

The fiber distribution hub can include one or more splitters as well as a termination field including an array of fiber optic adapters. The splitters can include passive optical power splitters and/or passive wavelength splitters such as wavelength division multipliers (e.g., core wavelength division multipliers or dense wavelength division multipliers). Passive optical power splitters (e.g., 1 to 8 splitters, 1 to 16 splitters, 1 to 32 splitters, 1 to 64 splitters, etc.) split signals from one to many and combine signals from many to one without providing any wavelength filtration. In the case of a 1 to 8 splitter, each of the split signals has $\frac{1}{8}^{th}$ the power of the input signal. Passive optical power splitters are often used as part of a passive FTTX network for splitting signals that are ultimately routed to subscriber locations. In certain embodiments, a signal carried by an optical fiber of a feeder cable routed from the central office is split at the passive optical power splitter to a plurality of connectorized pigtails. The connectorized pigtails are routed to the termination field of the fiber distribution hub where the connectorized pigtails are placed in optical connection with the distribution cables routed to the drop terminals. The drop terminals provide connection locations for connecting subscribers to the FTTX network via drop cables. In this way, signals from the central office can be split in power/intensity at the fiber distribution hub and then routed to subscriber locations, and signals from the subscriber locations can be combined at the fiber distribution hub and routed to the central office.

Passive wavelength splitters split signals split signals from one to many and combine signals from many to one based on wavelength (e.g., 1 to 8 splitters, 1 to 16 splitters, 1 to 32 splitters, 1 to 64 splitters, 1 to 160 splitters, etc.). For example, a wavelength splitter can be used to split a signal from a fiber of the feeder cable connected to the base unit to a plurality of connectorized pigtails such that each of the connectorized pigtails carries a signal having a different wavelength band. Signals carried from the connectorized pigtails to the wavelength splitter are combined by the wavelength splitter before being transmitted through the fiber of the feeder cable. The connectorized pigtails are routed to the termination field of the fiber distribution hub where the connectorized pigtails are placed in optical connection with the distribution cables routed to the drop terminals. The drop terminals provide connection locations for connecting the antenna nodes of the distributed antenna system to the fiber optic network. A given antenna node can include a remote unit including transmit and receive connection locations. By routing a first drop cable from a first connection location (e.g., a port/adapter) of the drop terminal to the transmit connection location of the remote unit and a second drop cable from a second connection location of the drop terminal to the receive connection location of the remote unit, the antenna node is optically connected to the fiber optic network. In this way, signals from the base unit can be split based on wavelength band at the fiber distribution hub and then routed to subscriber locations, and signals from the subscriber locations having different wavelength bands can be combined at the fiber distribution hub and routed to the base unit. In other embodiments, a duplexing or multiplexing arrangement may be used so that one cable can be used to optically connect the antenna node to the drop terminal. In still another embodiment, at least some of the ports of the drop terminal can include duplex adapters for receiving duplex connectors mounted on a drop cable containing two separate optical fibers for conveying transmit signals and received signals between the antenna node and the drop terminal.

FIG. 1 shows a passive fiber optic distribution network 20 having features that are examples of inventive aspects in accordance with the principles of the present disclosure. Generally, a distribution network 20 is adapted for transmitting fiber optic telecommunication services between a central office 22 and a local area 24 (e.g., a local loop). The distribution network includes one or more F1 distribution cables 26 that each preferably includes a plurality of optical fibers. For example, in one embodiment, a first F1 distribution cable 26 may have on the order of 12 to 48 fibers. However, alternative numbers of fibers may also be used. One or more of the optical fibers of the first F1 distribution cable 26 are routed to a fiber distribution hub 28.

The fiber distribution hub 28 preferably includes one or more passive optical splitter modules adapted to receive signals carried by the fibers of the first F1 distribution cable 26 and output a plurality of signals onto fibers that are optically coupled to one or more F2 distribution cables 30a-c routed from the distribution hub 28 into the local area 24. In one embodiment, the F2 distribution cables 30a-c can each include 12 optical fibers. In some implementations, one or more of the optical splitters are configured to split an incoming signal into a plurality of lesser powered iterations of the same signal. In other implementations, one or more of the optical splitters are wave division multiplexers (WDM) that separate out an plurality of different signals from an incoming signal based on signal wavelength. In one implementation, the WDM is a coarse wave divisional multiplexer (CWDM). In another implementation, the WDM is a dense wave divisional multiplexer (DWDM), which can separate out more signals than the CWDM.

As shown at FIG. 1, the F2 distribution cables 30a-c include first ends 31 terminated by ruggedized multi-fiber connectors 32. The multi-fiber connectors 32 interface with a bank 34 of fiber optic adapters provided at an exterior of the fiber distribution hub 28. The adapter bank 34 facilitates quickly providing an optical connection between the optical fibers within the fiber distribution hub 28 and the optical fibers of the F2 distribution cables 30a-c. Fiber optic drop terminals 36a-c are respectively located at second ends 33 of the F2 distribution cables 30a-c. Drop terminal 36a is shown positioned within hand hole 38a, drop terminal 36b is shown mounted within hand hole 38b, and drop terminal 36c is shown mounted to a utility pole 40. The F2 distribution cables 30a-c are shown routed through an underground conduit 41 that is shown interconnecting three hand holes 38a-38c. Referring still to FIG. 1, fiber optic drop cables 50 are routed from the drop terminals 36a-c to ONT's located at subscriber locations 52.

In some implementations, a distributed antenna system (DAS) 90 can be integrated with the passive fiber optic distribution network 20. The DAS 90 includes a base station 92 including at least one WDM 94. In some implementations, the base station 92 is located within the central office 22. In other implementations, the base station 92 is external of the central office 22. In certain implementations, the base station 92 is locate remote from the central office 22. In some implementations, the WDM 94 of the base station 92 includes one or more CWDMs. In other implementations, the WDM 94 includes one or more DWDMs.

The DAS 90 also includes one or more antenna nodes 96 and remote units (i.e. remote units) 98 positioned at various locations (e.g., within a building, campus, city, or geographic region). For example, in various implementations, the antenna nodes 96 and remote units 98 can be mounted to utility poles, light poles, water towers, signs, or other such suitable locations. Each remote unit 98 includes a signal receiving port and a signal transmitting port (see FIG. 5). Signals to be transmitted over the DAS 90 are provided over a second F1 feeder cable 95 that connects the base station 92 to the FDH 28. Signals provided over the second F1 feeder cable 95 are provided to one or more of the optical splitters within the FDH (see FIGS. 12A-12D) at which the signals are separated onto F2 distribution cable fibers that are routed to one or more drop terminals 36*a-c*.

Drop cables 50 connect the drop terminals 36 to the remote units 98 of the DAS. For example, in one implementation, a first fiber 97 can connect a first port of the drop terminal 36 to the signal receiving port of the remote unit 98 and a second fiber 99 can connect a second port of the drop terminal 36 to the signal transmitting port of the remote unit 98. In other implementations, the antenna 96 can include or be connected to a duplexer, thereby allowing the transmission and reception signals to be passed over a single fiber between the antenna 96 and the drop terminal 36.

Because the antenna 96 and remote units 98 connect to the drop terminals 36, the DAS 90 can be retrofitted to any existing fiber to the premises (FTTX) network by mounting suitable antennas 96 and remote units 98 adjacent existing drop terminals 36. For example, an antenna 96 and remote unit 98 can be mounted to a water tower and connected to unused ports of an underground drop terminal 36*a*, 36*b* via one or more drop cables 50.

Still referring to FIG. 1, each of the drop terminals 36*a-c* includes a housing 42 and a spool 44 connected to the housing 42. A plurality of ruggedized fiber optic adapters 46 are mounted to each of the housings 42. It will be understood that the term "ruggedized" refers to a component or system that is capable of withstanding the elements of an outdoor environment and that reduces the risk of or prevents the ingress of dirt, dust, water, etc. from entering the drop terminal 36. The ruggedized fiber optic adapters 46 include first ports that are accessible from outside the housings 42 and second ports that are accessible from inside the housings 42. The fibers of the F2 distribution cables 30*a-c* are terminated by optical connectors that are inserted into the second ports of the ruggedized fiber optic adapters 46. In certain embodiments, the optical connectors can be terminated directly on the ends of the fibers of the F2 distribution cables 30*a-c*. In alternative embodiments, the optical connectors can be terminated indirectly to the ends of the optical fibers of the F2 distribution cables 30 through the use of connectorized pigtails that are spliced to the ends of the fibers of the F2 distribution cables 30*a-c*.

The drop cables 50 can be terminated at each end by a ruggedized optical connector. An example ruggedized optical connector is disclosed at U.S. Pat. No. 7,090,406 that is hereby incorporated by reference. The ruggedized optical connector terminated at one end of a given drop cable can be inserted into the first port of one of the drop terminals 36*a-c*, while the ruggedized optical connector located at the opposite end of the drop cable can be inserted into a corresponding ruggedized adapter provided at the ONT located at the subscriber location 52. In the subject embodiment, the ruggedized optical connector includes a sealing member that engages a sealing surface of the ruggedized fiber optic adapter to provide an environmental seal or a weatherproof seal between the ruggedized optical connector and the ruggedized adapter 46.

Portions of the F2 distribution cables 30*a-c* are preferably wrapped around the spools 44 of the drop terminals 36*a-c*. For example, the F2 distribution cables 30*a-c* may include first lengths that extend from the drop terminals 36*a-c* to the fiber distribution hub 28, and second lengths that are wrapped around the spool 44 corresponding to the given drop terminal 36*a-c*. Thus, the total length of each of the F2 distribution cables 30*a-c* includes the length of cable extending from the drop terminal to the fiber distribution hub 28 plus an excess length that remains wrapped around the spool 44 after installation of the drop terminal 36*a-c*. From the spool 44, the fibers of the multi-fiber cables 30 are routed into the interior of the housing 42 through an access opening. An environmental seal preferably is provided at the access opening. In certain embodiments, the access opening is provided at a backside of the housing while the ruggedized fiber optic adapters are provided at a front side of the housing.

Prior to installation of the local network, the installer can identify the locations where it is desired to mount drop terminals. The installer can then roughly estimate the distances from the drop terminal mounting locations to the fiber distribution hub 28. The installer can preferably select drop terminals from a supply of drop terminals having different lengths of F2 distribution cable pre-wrapped around the spools of the drop terminals. For example, drop terminals can be provided with F2 distribution cable lengths of 100 feet, 250 feet, 500 feet, 1,000 feet, 1,500 feet, 2,000 feet, 2,500 feet, 3,000 feet, etc. Thus, when a drop terminal mounting location is determined, the distance from the drop terminal location to the fiber distribution hub is estimated and a drop terminal having a pre-spooled length of F2 distribution cable sufficient to reach from the drop terminal mounting location to the fiber distribution hub is selected. Typically, because the pre-spooled lengths of F2 distribution cable are not specifically customized for each drop terminal mounting location, the spool will have a certain amount of excess cable that remains on the spool after the F2 distribution cable has been routed from the drop terminal mounting location to the fiber distribution hub.

Figure 2:
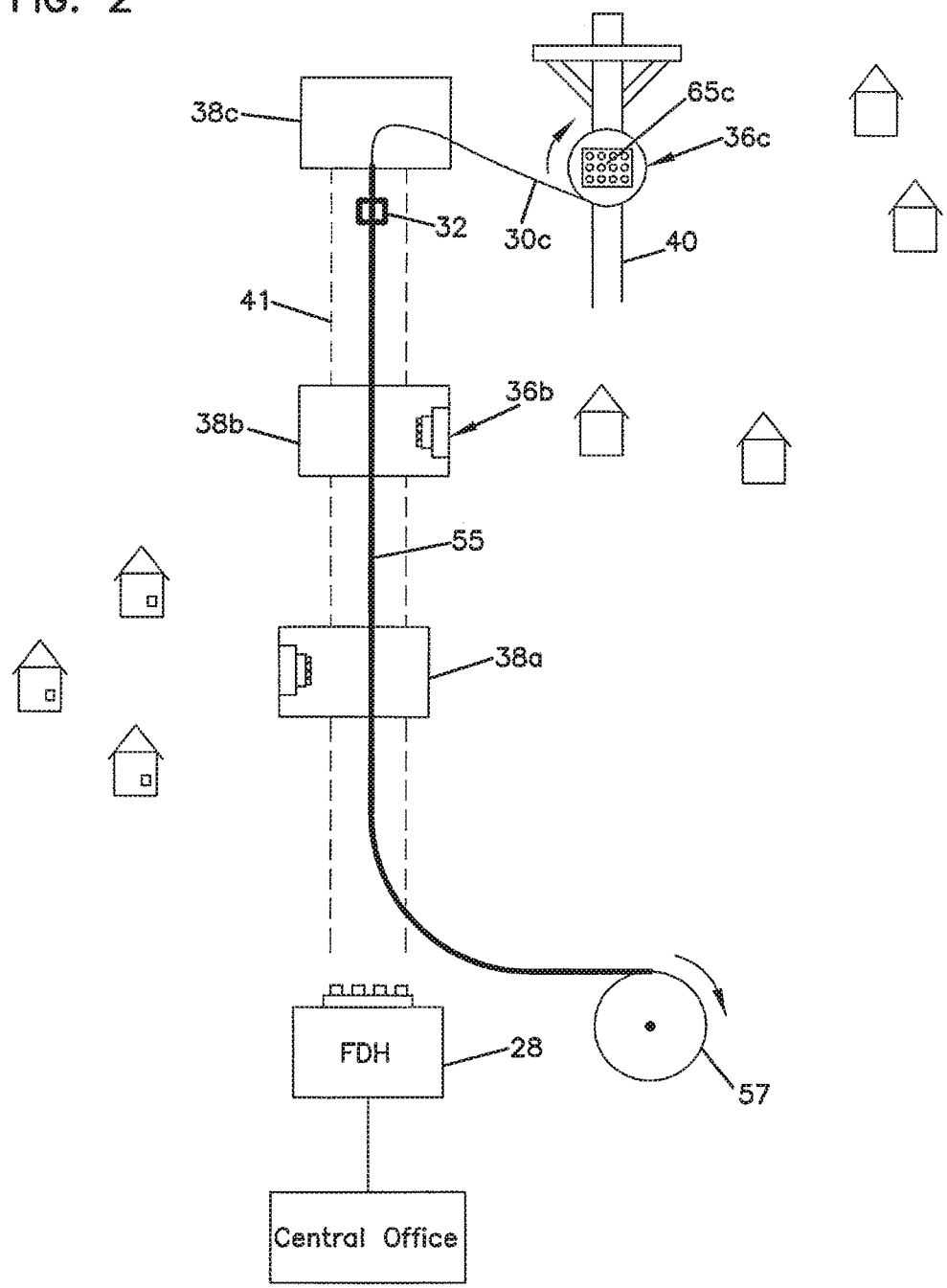
FIGS. 2-4 illustrate a sequence for installing the fiber optic network of FIG. 1.
Figure 3:
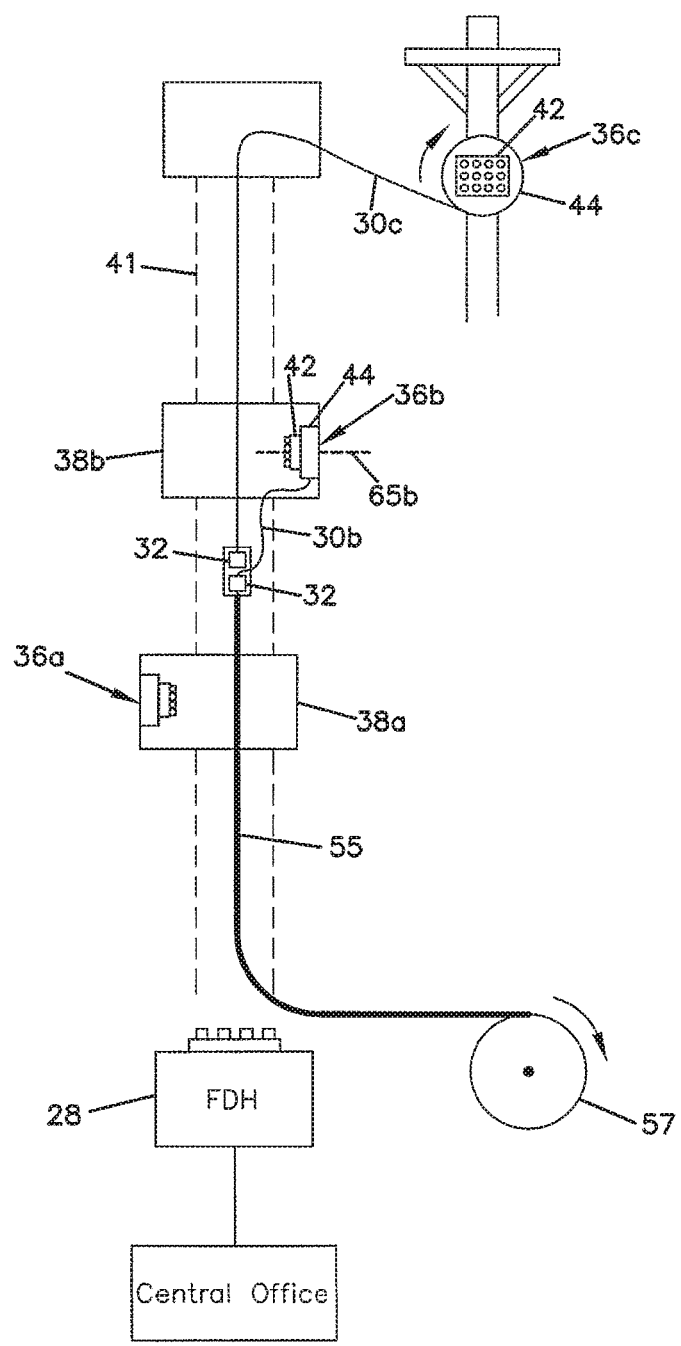
Figure 4:
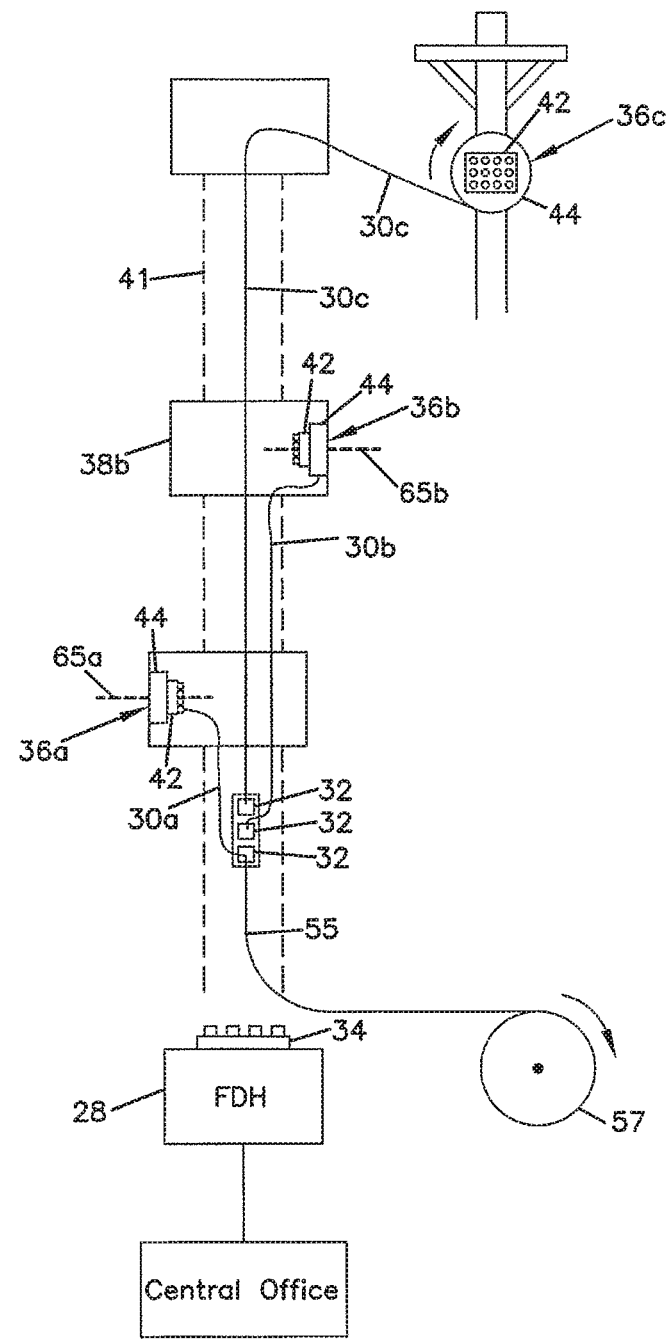

Referring now to FIGS. 1-4, the installation of the network of FIG. 1 will be described. In the subject embodiment, the installer can select three separate drop terminals 36*a-c* each having a pre-spooled length of F2 distribution cable that is sufficiently long to reach from the desired drop terminal mounting location to the fiber distribution hub 28. The installer can then first mount the drop terminal 36*c* to the utility pole 40 as shown at FIG. 2. The multi-fiber connector 32 at the end of the F2 distribution cable 30*c* pre-coiled about the spool 44 of the drop terminal 36*c* is then connected to a pulling cable 55 that has been pre-routed through the underground conduit 41. The pulling cable 55 is then used to pull the F2 distribution cable 30*c* through the underground conduit 41 in a direction extending from the hand hole 38*c* toward the hand hole 38*b* through the use of a cable puller 57 located near the fiber distribution hub 28. As the F2 distribution cable 30*c* is pulled through the conduit 41, the spool 44 and the housing 40 of the drip terminal 36*c* rotate in unison about a common axis 65*c* to allow the F2 distribution cable 30*c* to be paid off from the spool.

Once the multi-fiber connector 32 of the F2 distribution cable 30c reaches the hand hole 38b, the drop terminal 36b can be mounted at the hand hole 38b and the multi-fiber connector 32 of the F2 distribution cable 30b spooled about the spool 44 of the drop terminal 36b is also connected to the pulling cable 55. Thereafter, the cable puller 57 resumes pulling and both F2 distribution cables 30b and 30c are pulled together through the conduit 41 toward the hand hole 38a. As the cables 30b, 30c are pulled, the housings 42 and spools 44 of the drop terminals 36b,c rotate about respective axes 65b, 65c to allow the cables 30b,c to be paid off from the spools 44. When the multi-fiber connectors 32 of the F2 distribution cables 30b, c reach the hand hole 38a, pulling of the cable 55 stops and the operator installs the drop terminal 36a at the hand hole 38a. The multi-fiber connector 32 of the F2 distribution cable 30a wrapped around the spool 44 of the drop terminal 36a is then connected to the cable 55 and pulling resumes to pull all three cables 30a-c through the underground conduit 41 from the hand hole 38a to the fiber distribution hub 28. As the cables 30a-c are pulled, the housings 42 and spools 44 of the drop terminals 36a-c rotate about respective axes 65a-c to allow the cables 30a-c to be paid off from the spools 44. When the multi-fiber connectors 32 reach the fiber distribution hub 28, the multi-fiber connectors 32 are disconnected from the cable 55 and plugged into the adapter bank 34 of the fiber distribution hub 28. In this way, the fiber distribution hub 28 provides an interface between the optical fibers of the F1 distribution cable and the F2 distribution cables.

Figure 5:
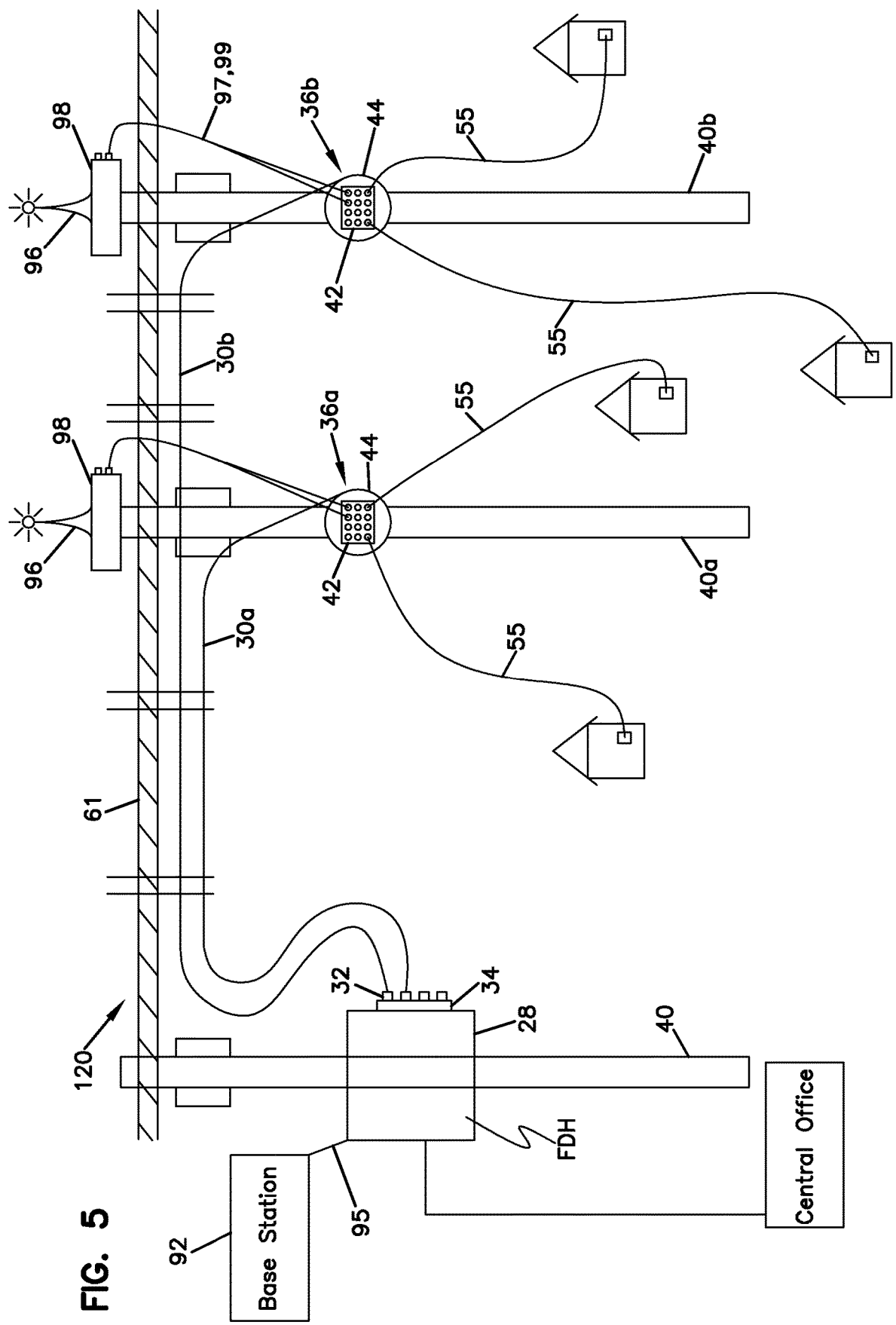
FIG. 5 shows another fiber optic network in accordance with the principles of the present disclosure.

FIG. 5 shows another fiber optic network 120 having features that are examples of inventive aspects in accordance with the principles of the present disclosure. The network 120 shows a fiber distribution hub 28 mounted on a utility pole 40 and drop terminals 36a, 36b mounted on utility poles 40a, 40b. A utility line 61 is routed across the utility poles. The drop terminals 36a, 36b have F2 distribution cables 30a, 30b that are routed from the fiber distribution hub 28 along the utility line 61 to the utility poles 40a, 40b. Typically, the F2 distribution cables 30a, 30b can be secured to the utility line 61 by conventional techniques such as lashing, tying, or other securing techniques. Drop cables 55 can be routed from the drop terminals 30a, 30b to the ONT's of subscriber locations in need of telecommunication services.

In some implementations, antenna nodes 96 and remote units 98 also can be mounted to one or more utility poles 40a, 40b. For example, one or more of the antenna nodes 96 and remote units 98 can form a DAS (e.g., for providing cellular phone service). The remote units 98 connect to ports on the drop terminals 36a, 36b. For example, a first fiber 97 can connect a first drop terminal port with a first port on the remote unit 98 and a second fiber 99 can connect a second drop terminal port with a second port on the remote unit 98.

Figure 6:
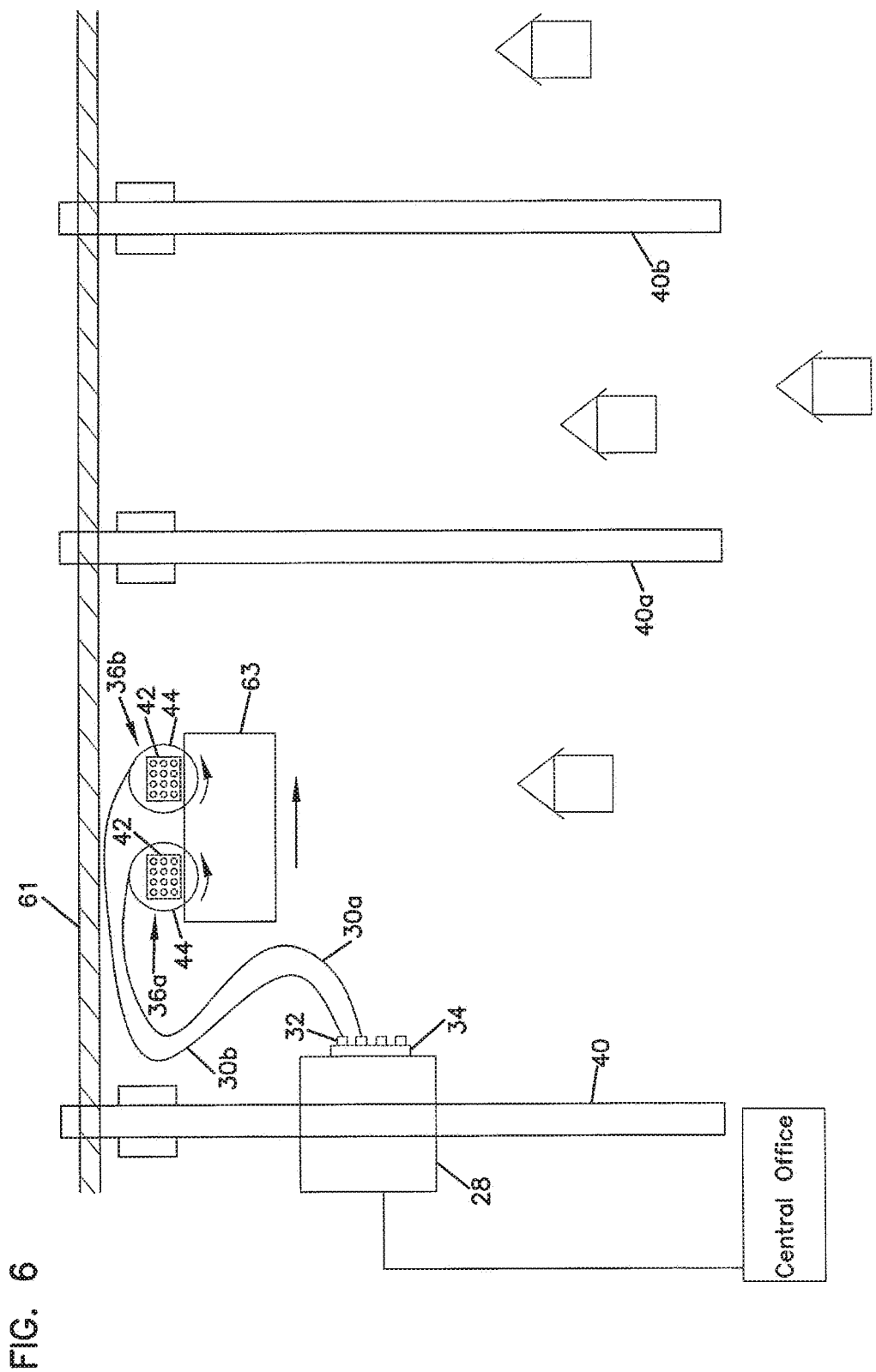
FIGS. 6 and 7 show a sequence for installing the fiber optic network of FIG. 5.
Figure 7:
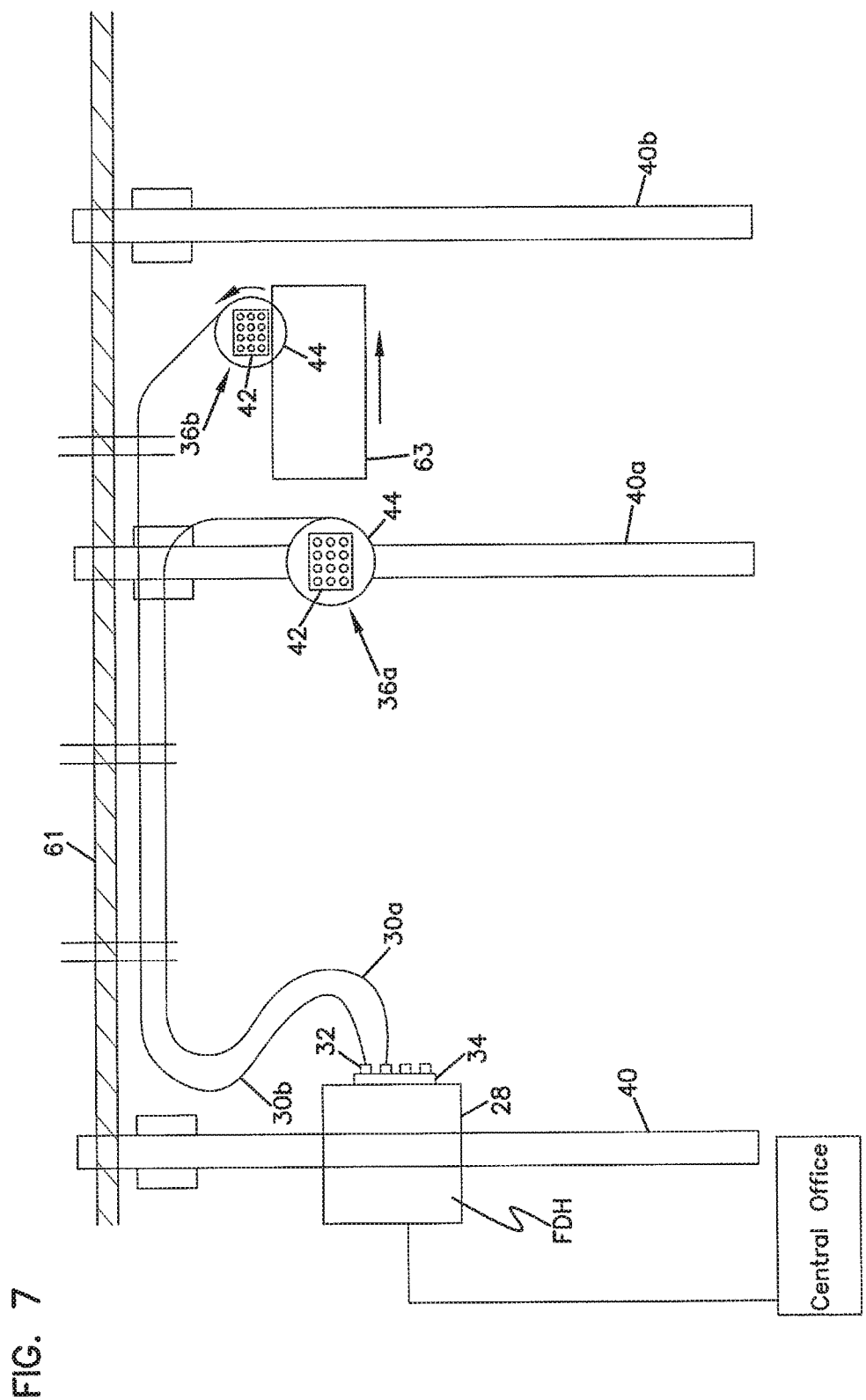

Referring now to FIGS. 6 and 7, the installation of the network 120 will be described. To install the network 120 of FIG. 5, the drop terminal mounting locations are identified and the operator selects drop terminals that are pre-spooled with a sufficient length of F2 distribution cable to reach from the fiber distribution hub 28 to the identified drop terminal mounting location. Multi-fiber connectors 32 of the F2 multi-fiber distribution cables 30a, 30b are then inserted into an adapter bank 34 of the fiber distribution hub 28. The drop terminals 36a, 36b are then mounted on an elevated carrying device 63 that carries the drop terminals 36a, 36b along the utility line 61 from pole to pole. As the elevated carrying device 63 moves the drop terminals 36a, 36b, the drop terminals housings 42 and their corresponding spools 44 rotate in unison about rotation axes 65a, 65b to allow the F2 distribution cables 30a, 30b to be paid off from the spools 44. Periodically, the elevated carrying device 63 can be stopped to allow the operator to lash the F2 distribution cables 30a, 30b to the utility line 61. When the elevated carrying device 63 reaches pole 40a, the drop terminal 36a is removed from the elevated carrying device 63 and secured to the pole 40a. Thereafter, the elevated carrying device 63 continues to move along the utility line 61 while the housing 42 and spool 44 of the drop terminal 36b spin in unison about axis 65b to allow the F2 distribution cable 30b to be paid off from the spool 44. Once again, the operator can periodically stop to lash the F2 distribution cable 30b to the utility line 61. When the elevated carrying device 63 reaches the pole 40b, the drop terminal 36b is removed from the elevated carrying device 63 and mounted to the pole 40b. Once the drop terminals 30a, 30b have been mounted to their drop terminal mounting locations, drop cables 55 can be routed from the drop terminals 30a, 30b to the ONT's of subscriber locations in need of telecommunication services.

Figure 8:
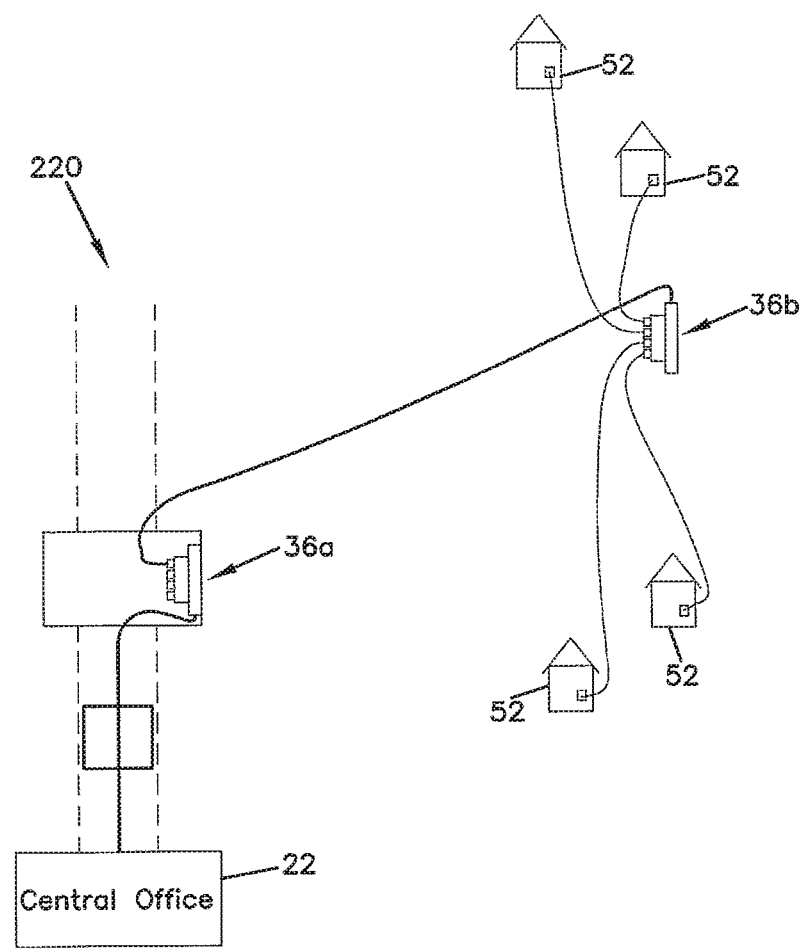
FIG. 8 shows still another fiber optic network in accordance with principles of the present disclosure.

FIG. 8 shows another fiber optic network 220 in accordance with the principles of the present disclosure. The fiber optic network of FIG. 8 has decentralized passive splitting that eliminates the need for a fiber distribution hub where all of the splitting takes place. Instead, splitters are provided within drop terminals 36a, 36b. In such an embodiment, a distribution cable (e.g., a single fiber or multi-fiber distribution cable) can be routed from a central office 22 or another intermediate location to drop terminal 36a. At the drop terminal 36a, the signal is split into a plurality of fibers that have connectorized ends inserted within inner ports of ruggedized adapters mounted at the drop terminal 36a. Another distribution cable can be plugged into the outer port of one of the adapters and routed to drop terminal 36b having a splitter therein. At the drop terminal 36b, drop cables can be routed from the ports of the drop terminal to subscriber locations 52.

To install the network 220, the drop terminals are preferably selected so as to have a sufficient amount of pre-wrapped distribution cable provided on the spools to reach from the drop terminal mounting location to the other connection location. Once the drop terminals 36a, 36b have been selected, the drop terminals 36a, 36b can be mounted at their desired locations. Thereafter, the cables can be paid off from the drop terminal spools and pulled to the desired interconnection location. As the cables are pulled, the spools 44 and the corresponding housings 42 of the drop terminals 36 rotate in unison to allow the distribution cables to be paid off from the spools 44. In the case of the drop terminal 36a, the drop terminal 36a is mounted at a desired location and then the distribution cable is pulled to the desired interconnect location where the fibers interconnect with a fiber from the central office. Thereafter, the drop terminal 36b is mounted at its desired location and its corresponding distribution cable is pulled from the drop terminal mounting location to the first drop terminal mounting location where the distribution cable is plugged into an adapter port of the drop terminal 36a.

Figure 9:
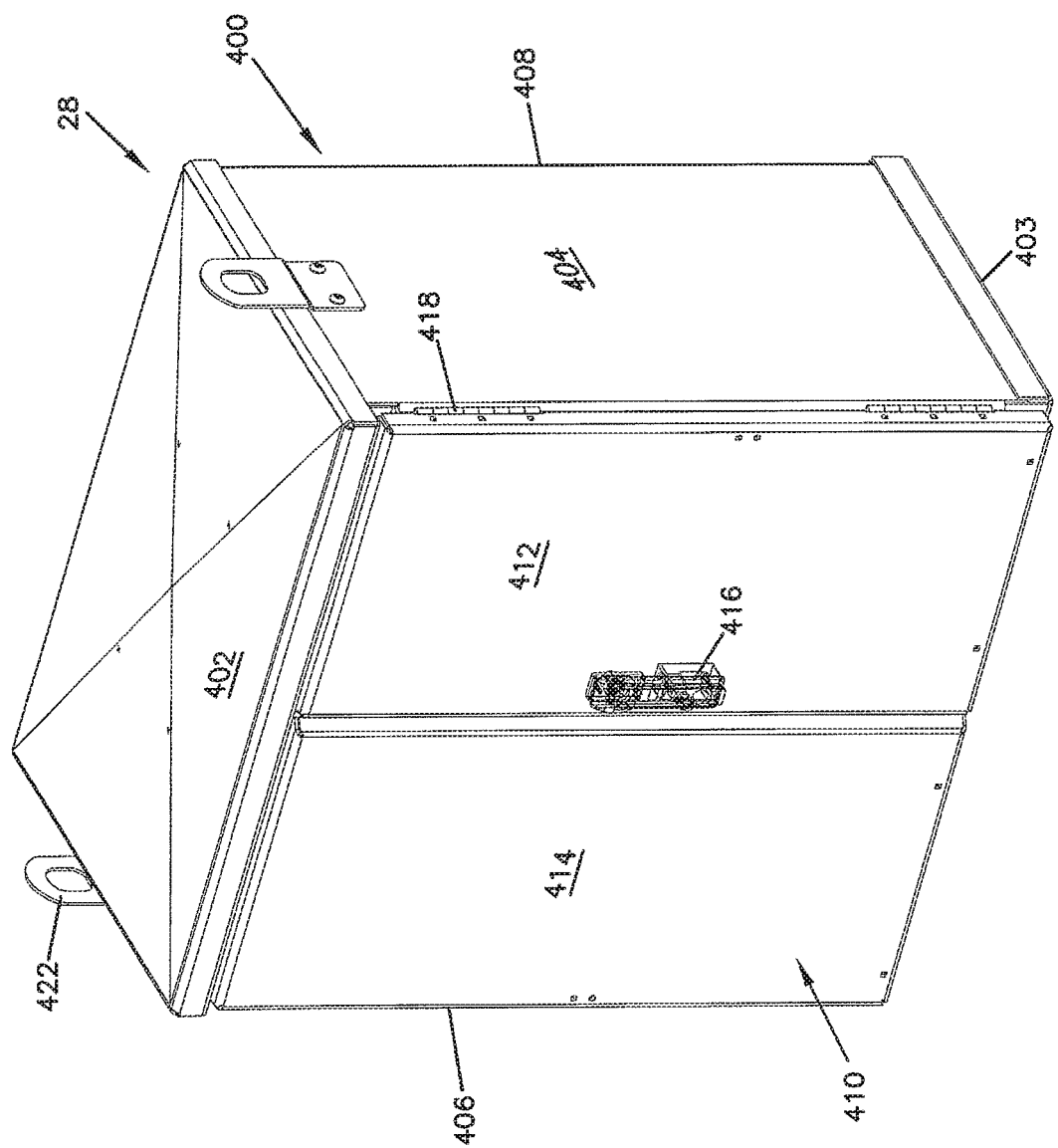
FIG. 9 is a perspective view of a fiber distribution hub suitable for use in fiber optic networks of FIGS. 1, 5 and 8 in accordance with the principles of the present disclosure.
Figure 10:
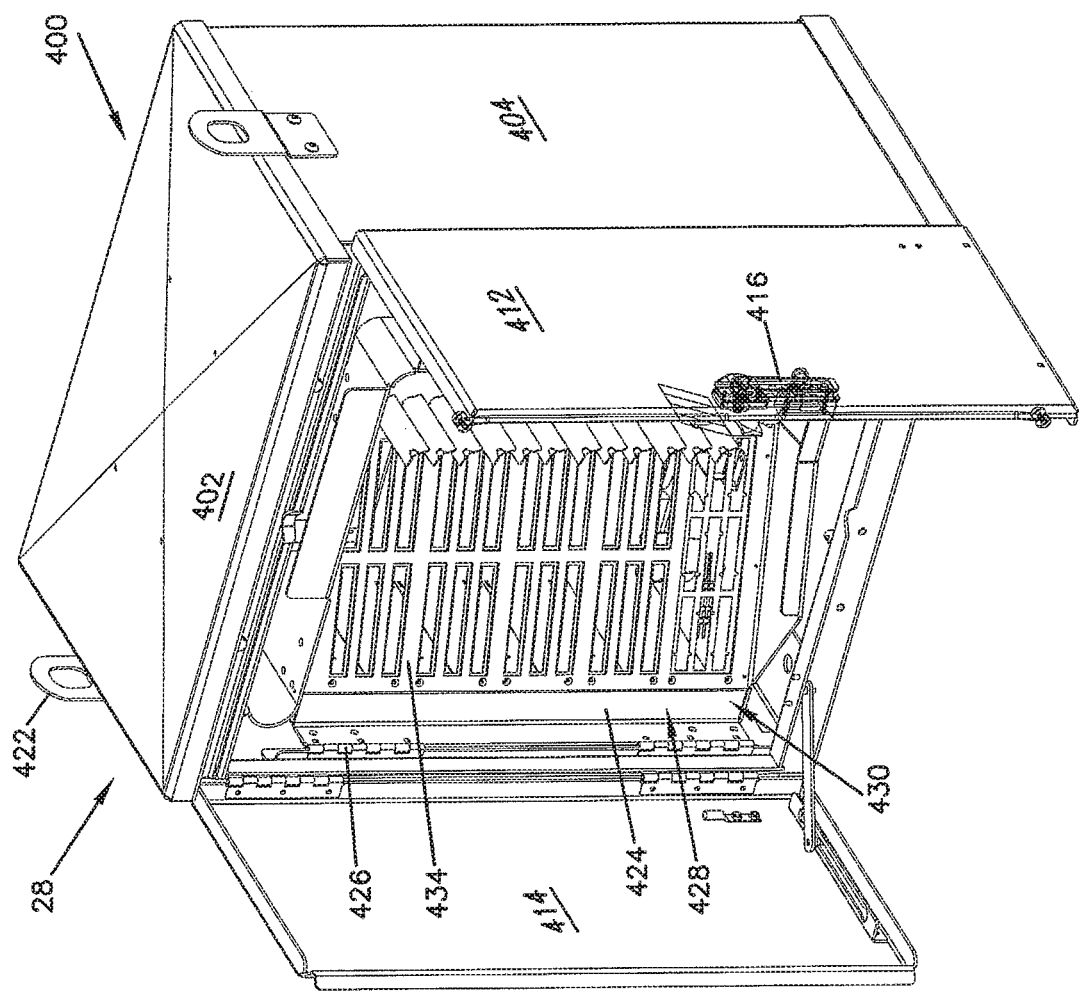
FIG. 10 is a perspective view of the fiber distribution hub of FIG. 9 with front doors in an open position.
Figure 11:
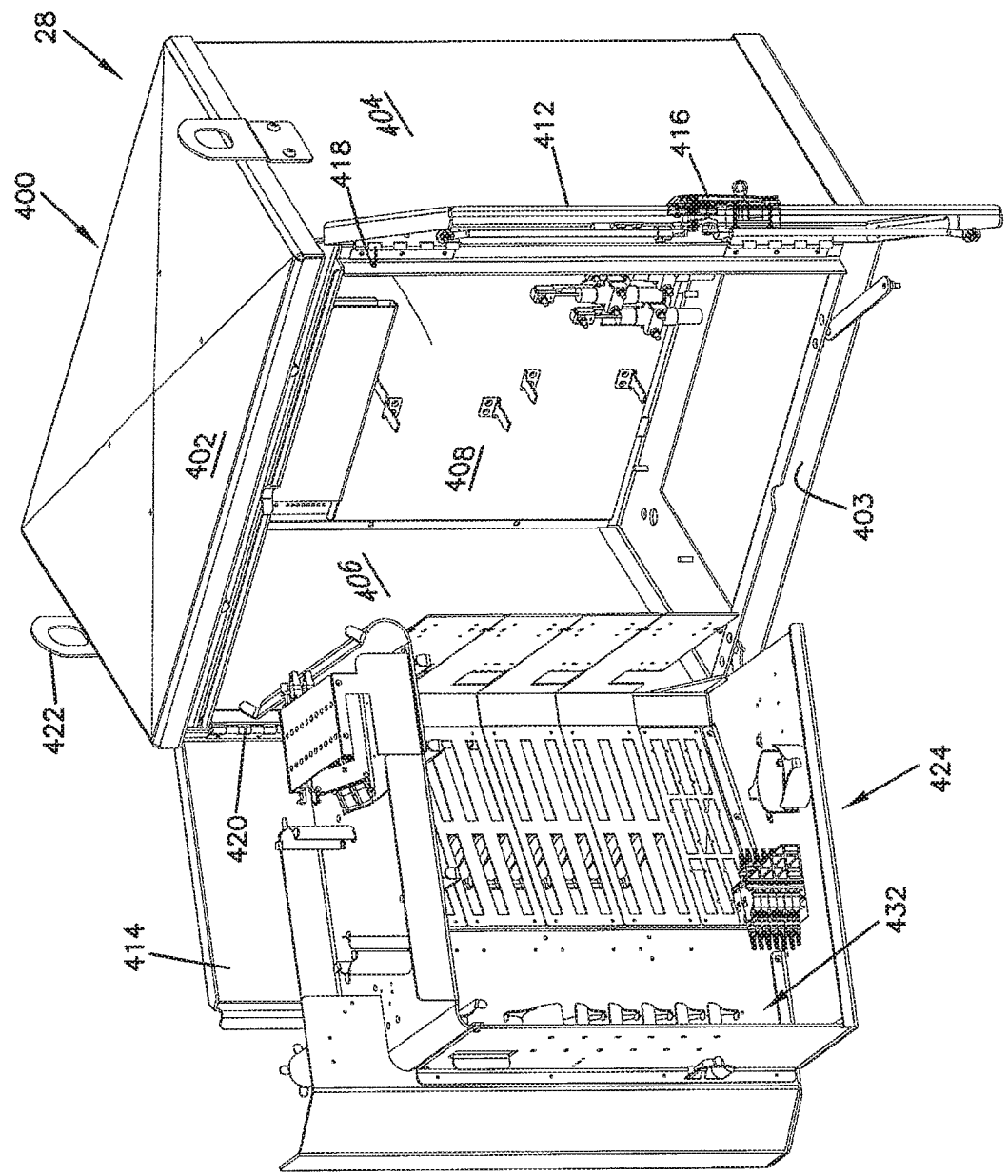
FIG. 11 is a perspective view of the fiber distribution hub of FIG. 9 with a swing frame in an open position.

Referring now to FIGS. 9-11, an exemplary configuration of the fiber distribution hub (FDH) 28 is shown. Certain aspects of the FDH shown in FIGS. 9-11 have been described in U.S. patent application Ser. No. 11/354,286, published as U.S. Publication No. 2007/0189691, which is hereby incorporated by reference in its entirety.

The FDH 28 includes a cabinet 400 that houses internal components. The cabinet 400 of the FDH 28 includes a top panel 402, a bottom panel 403, a right side panel 404, a left side panel 406, a back panel 408, and at least one front door

410. In one embodiment, the at least one front door 410 includes a right door 412 and a left door 414. In one embodiment, the front doors 412, 414 include a lock 416. The at least one front door 410 is pivotally mounted to the cabinet 400 using hinges 418, 420 to facilitate access to the components mounted within the cabinet 400.

In general, the cabinet 400 of the FDH 28 is configured to protect the internal components against rain, wind, dust, rodents and other contaminants. However, the cabinet 400 remains relatively lightweight for easy installation, and breathable to prevent accumulation of moisture in the unit. In some embodiments, an aluminum construction with a heavy powder coat finish also provides for corrosion resistance. In one example embodiment, the cabinet 400 is manufactured from heavy gauge aluminum and is NEMA-4X rated. In other embodiments, however, other materials can also be used.

In accordance with example embodiments, the FDH 28 is provided in pole mount or pedestal mount configurations. For example, as shown in FIG. 9, loops 422 can be provided on the cabinet 400 for facilitating deployment of the cabinet 400 at a desired location. The loops 422 can be used to position the cabinet using a crane. In particular, the crane can lower the cabinet 400 into an underground region. In some embodiments, the loops 422 are removable or can be adjusted to not protrude from the top panel 402.

A swing frame 424 is pivotably mounted on hinges 426 within the cabinet 400. The swing frame 424 includes bulkhead 428 that divides the swing frame 424 into a front portion 430 and a back portion 432 (shown in FIG. 11). The bulkhead 428 includes a main panel 434 having a termination region 436 and a storage region 438. Generally, at least one termination module 440 (shown schematically in FIG. 12) is provided at the termination region 436 and at least one storage module 442 (shown schematically in FIG. 12) is provided at the storage region 438. One or more distribution cable interfaces 444 can be positioned within the back portion 432 of the swing frame 424. At least one optical separator module housing 446 accommodating one or more optical separator modules 448 is positioned at the top of the swing frame 424.

The FDH 28 generally administers connections at a termination panel between incoming fiber and outgoing fiber in an Outside Plant (OSP) environment. As the term is used herein, "a connection" between fibers includes both direct and indirect connections. Examples of incoming fibers include the F1 distribution cable fibers that enter the cabinet and intermediate fibers (e.g., connectorized pigtails extending from splitters and patching fibers/jumpers) that connect the F1 distribution cable fiber to the termination panel. Examples of outgoing fibers include the F2 distribution cable fibers that exit the cabinet and any intermediate fibers that connect the F2 distribution cable fibers to the termination panel. The FDH 28 provides an interconnect interface for optical transmission signals at a location in the network where operational access and reconfiguration are desired. The FDH 28 is designed to accommodate a range of alternative sizes and fiber counts and support factory installation of pigtails, fanouts, and splitters. For example, as noted above, the FDH 28 can be used to split the F1 distribution cables and terminate the split F1 distribution cables to F2 distribution cables. In addition, the FDH 28 can be used to split the F1 distribution cable signals of a DAS 90 onto F2 distribution cables 97, 99.

Figure 12A:
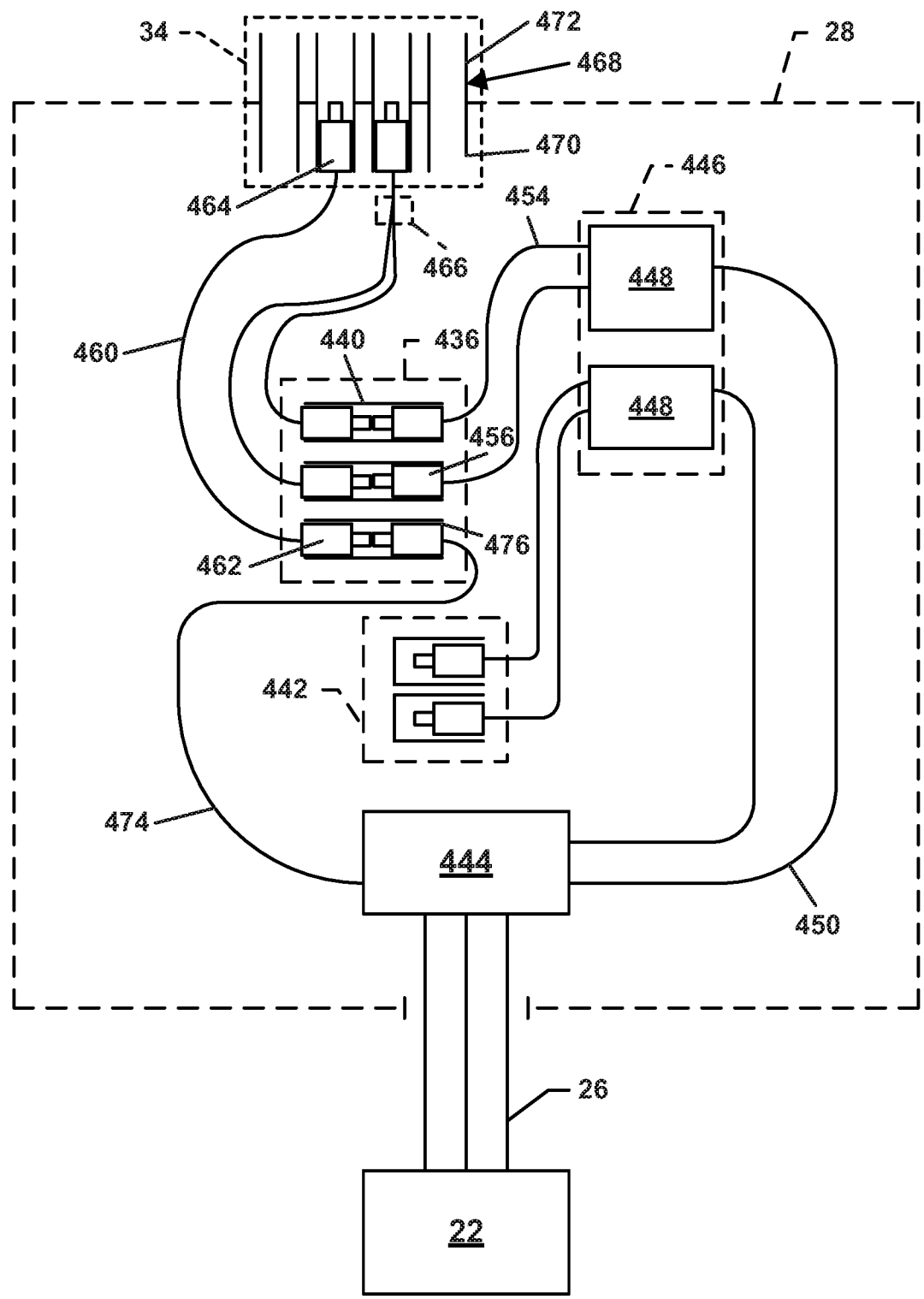
FIGS. 12A-12D are schematic representations of example cable routing schemes for a fiber distribution hub suitable for use in fiber optic networks of FIGS. 1, 5 and 8 in accordance with the principles of the present disclosure.
Figure 12B:
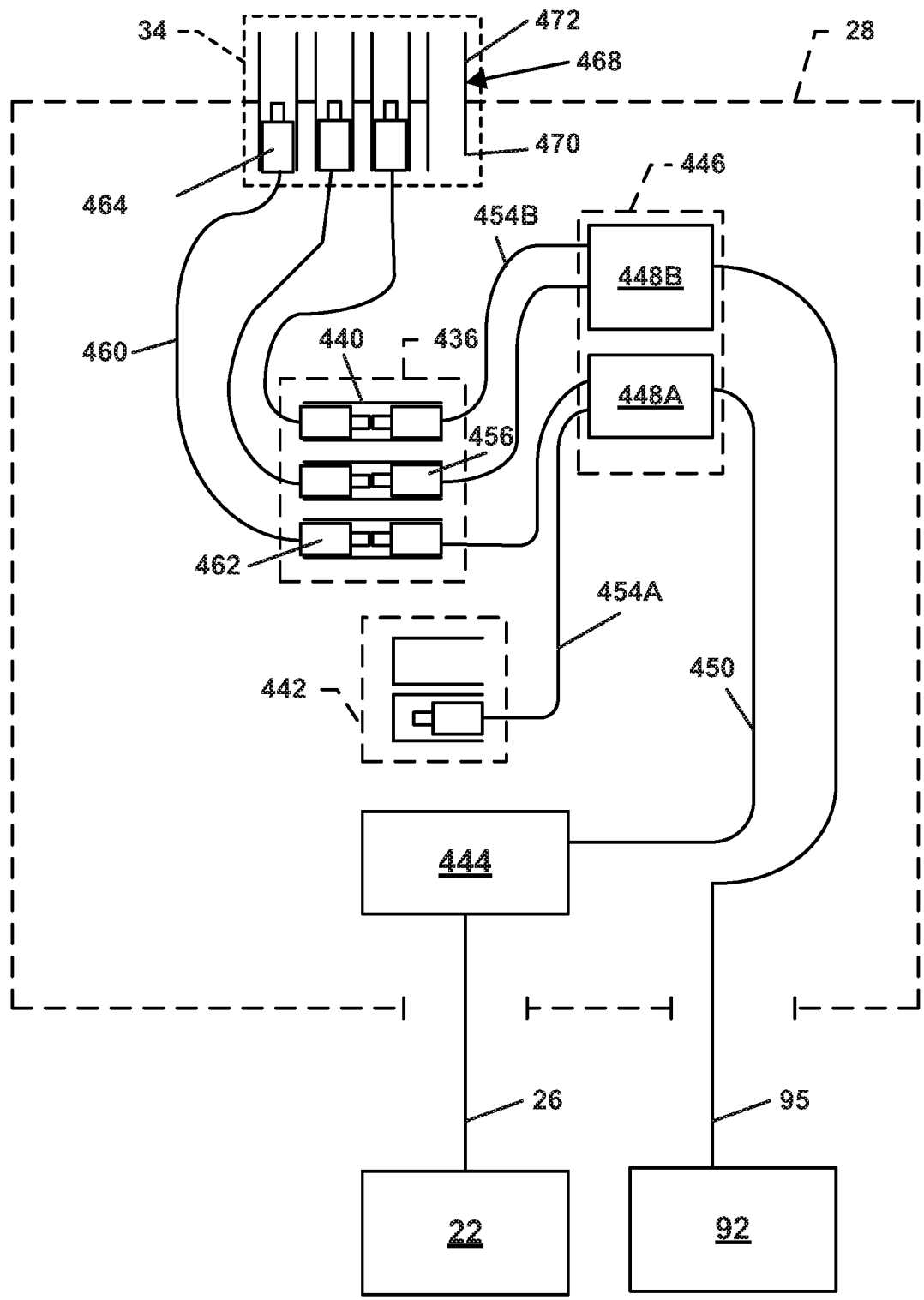
Figure 12C:
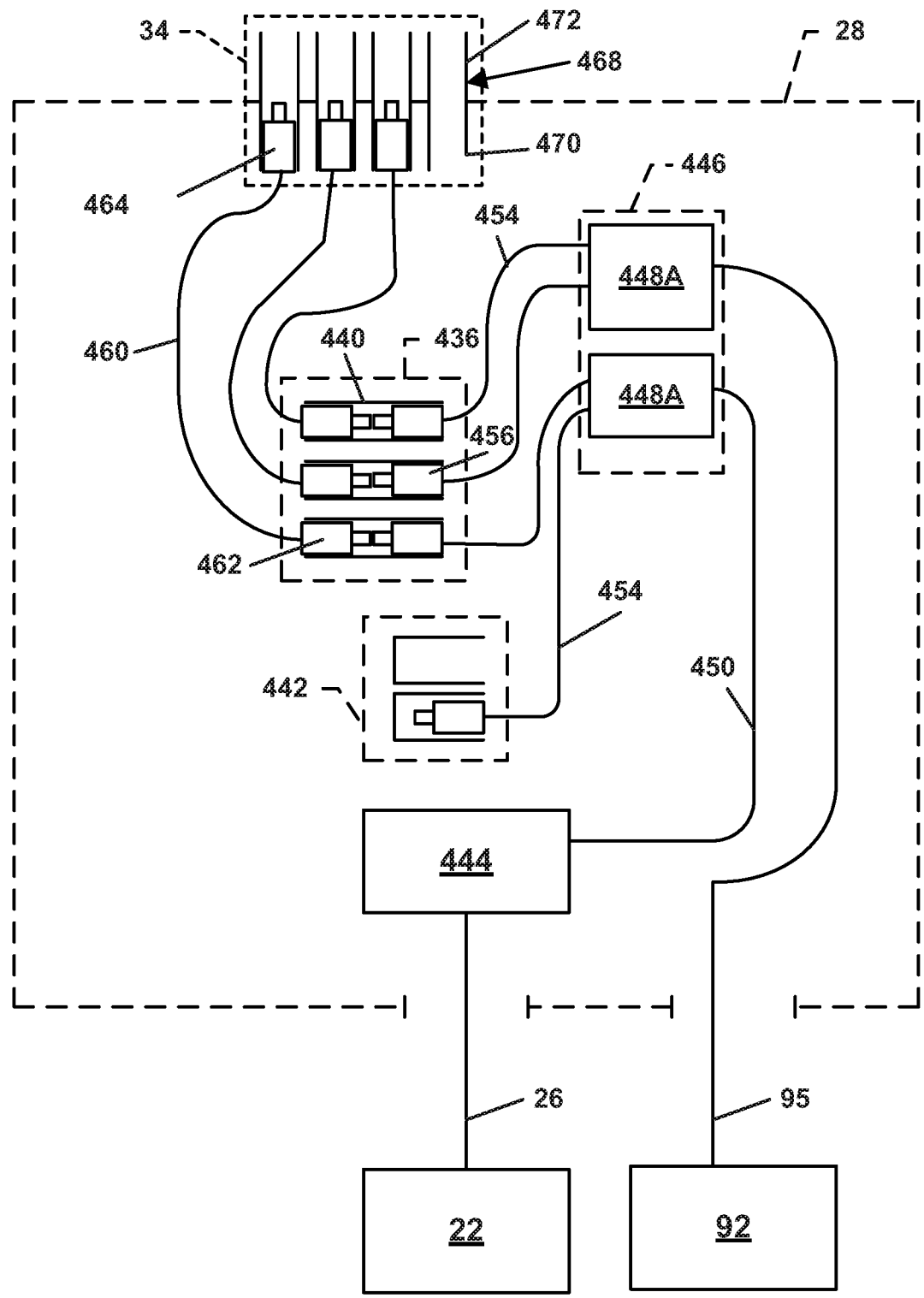
Figure 12D:
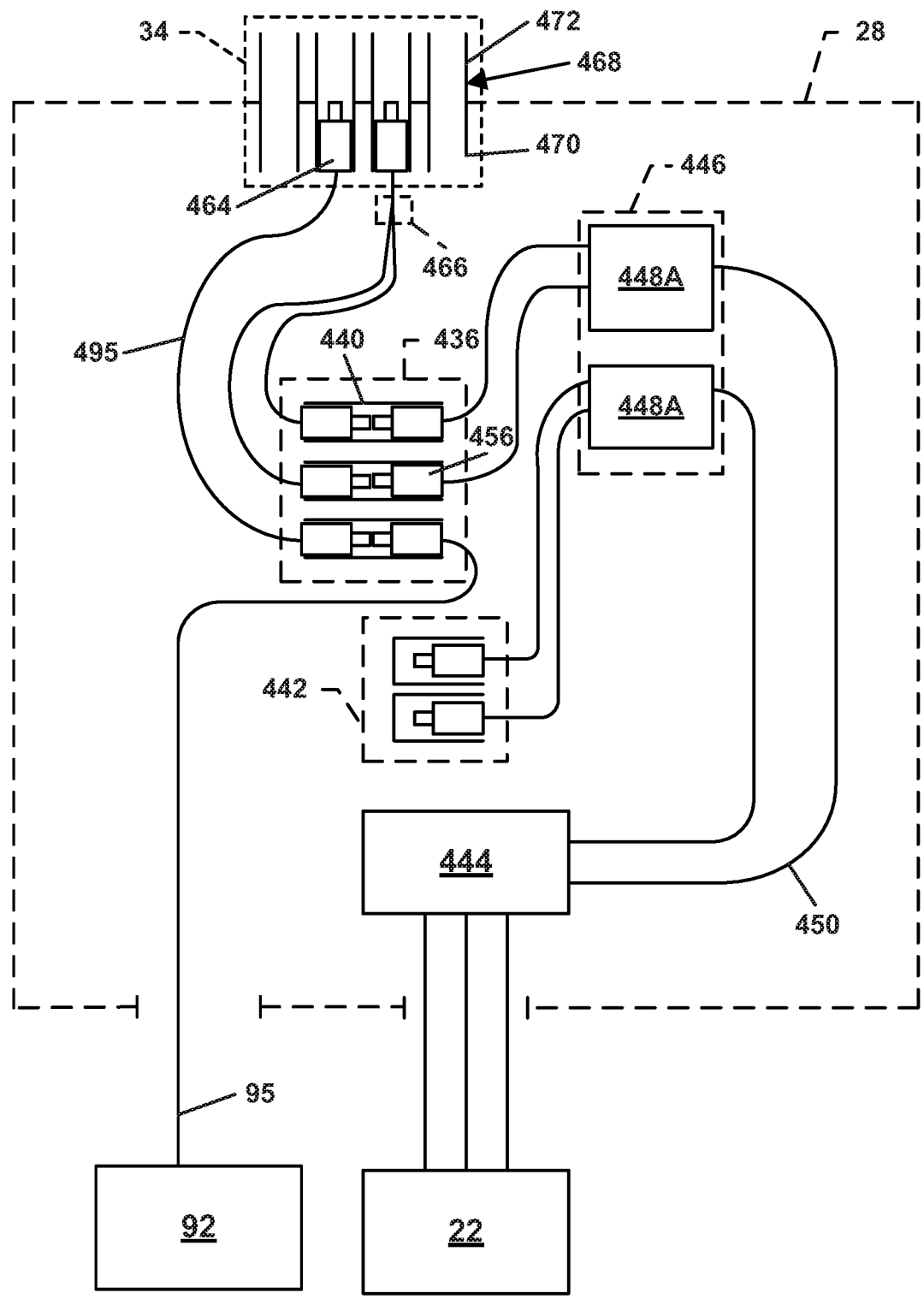

Referring now to FIGS. 12A-12C, schematic diagrams of four example cable routing schemes for the FDH 28 are shown. FIG. 12A shows a first example cable routing scheme for the FDH 28 in which signals from the central office 22 are routed through optical splitters 448 and no DAS signals are present. In FIGS. 12B-12D, the F1 cable 26 and fiber connected thereto can be routed in the same way. FIG. 12B shows a second example cable routing scheme in which DAS signals are routed through a WDM 448B. FIG. 12C shows a third example cable routing scheme for the FDH 28 in which DAS signals are routed through an optical power splitter 448A. FIG. 12D shows a fourth example cable routing scheme in which DAS signals are routed directly to the termination region 436 without passing through an optical splitter 448.

As shown in FIG. 12A, in some implementations, the F1 distribution cable 26 is initially routed into the FDH 28 through the cabinet 400 (e.g., typically through the back or bottom of the cabinet 400 as shown in FIG. 11). In certain embodiments, the fibers of the F1 distribution cable 26 can include ribbon fibers. An example F1 distribution cable 26 may include twelve to forty-eight individual fibers connected to the central office 22. In some embodiments, after entering the cabinet 400, the fibers of the F1 distribution cable 26 are routed to the distribution cable interface 444 (e.g., fiber optic adapter modules, a splice tray, etc.). At the distribution cable interface 444, one or more of the fibers of the F1 distribution cable 26 are individually connected to separate intermediate fibers 450. The intermediate fibers 450 are routed from the distribution cable interface 444 to the optical splitter module housing 446. At the optical splitter module housing 446, the intermediate fibers 450 are connected to separate optical splitter modules 448, wherein the signals carried on the intermediate fibers 450 are each separated onto multiple pigtails 454, each having connectorized ends 456. In other embodiments, however, the fibers of the F1 distribution cable 26 can be connectorized and can be routed directly to the optical splitter modules 448, thereby bypassing or eliminating the need for the distribution cable interface 444.

When the pigtails 454 are not in service, the connectorized ends 456 can be temporarily stored on the storage module 442 that is mounted at the storage region 438 of the swing frame 424. When the pigtails 454 are needed for service, the pigtails 454 are routed from the splitter modules 448 to the termination module 440 that is provided at the termination region 436 of the swing frame 424. At the termination module 440, the pigtails 454 are connected to fibers of an F2 distribution pigtail 460.

In one embodiment, one or more of the fibers of the F1 distribution cable 26 are not connected to any of the splitter modules 448. Rather, these fibers of the F1 distribution cable 26 are connected to pass-through fibers 474 having connectorized ends 476. The pass-through fibers 474 are connected to the termination modules 440, without first connecting to the splitter modules 452. By refraining from splitting the fiber 474, a stronger signal can be sent to one of the subscribers. The connectorized ends 476 of the pass-through fibers 474 can be stored at the storage region 438 when not in use. In some implementations, the F1 distribution cable fibers can be routed directly to the termination modules 440 instead of connecting to separate pass-through fibers 474.

The F2 distribution pigtail 460 includes a plurality of single fiber connectorized ends 462 on one end and a multi-fiber connectorized end 464 on an opposite end of the F2 distribution pigtail 460. In one embodiment, the fibers of the F2 distribution pigtail 460 are routed to a fanout 466 where the individual fibers of the F2 distribution pigtail 460 are brought together. The multi-fiber connectorized end 464 of the F2 distribution pigtail 460 is adapted for engagement with a multi-fiber optic adapter 468 disposed in the adapter bank 34, which in the subject embodiment extends through the cabinet 400. The multi-fiber optic adapter 468 includes an interior port 470 and an exterior port 472. The interior port 470 of the fiber optic adapter 468 is accessible from the interior of the cabinet 400 while the exterior port 472 is accessible from the exterior of the cabinet 400. As the intermediate cable is disposed in the interior of the cabinet 400, the multi-fiber connectorized end 466 of the intermediate cable 464 is engaged with the interior port 470 of the multi-fiber optic adapter 468. The multi-fiber connector 32 of the F2 distribution cable 30 is adapted for engagement with the exterior port 472 of the multi-fiber optic adapter 468.

As shown in FIGS. 12B and 12C, in some implementations, the DAS F1 distribution cable 95 is initially routed into the FDH 28 through the cabinet 400 (e.g., typically through the back or bottom of the cabinet 400 as shown in FIG. 11). In certain embodiments, the fibers of the DAS F1 distribution cable 95 can include ribbon fibers. An example DAS F1 distribution cable 95 may include twelve to forty-eight individual fibers connected to the base station 92. In some embodiments, the fibers of the DAS F1 distribution cable 95 can be connectorized and can be routed directly to the optical splitter modules 448, thereby bypassing or eliminating the need for the distribution cable interface 444.

In other embodiments, however, after entering the cabinet 400, the fibers of the DAS F1 distribution cable 95 are routed to the distribution cable interface 444 (e.g., fiber optic adapter modules, a splice tray, etc.). In one implementation, the interface 444 is the same interface at which the F1 cable 26 is routed. At the distribution cable interface 444, one or more of the fibers of the DAS F1 distribution cable 95 can be individually connected to separate intermediate fibers 450. The intermediate fibers 450 are routed from the distribution cable interface 444 to the optical splitter module housing 446. At the optical splitter module housing 446, the intermediate fibers 450 are connected to one or more separate optical splitter modules 448, wherein the signals carried on the intermediate fibers 450 are each separated onto multiple pigtails 454, each having connectorized ends 456.

In certain example implementations, as shown in FIG. 12B, the signals from the DAS F1 cable 95 are routed to a WDM 448B. For example, in one implementation, the WDM 448B can be a DWDM. In other example implementation, the WDM 448B can be a CWDM. In some such example implementations, signals from the central office 22 can be routed to one or more optical power splitters 448A, which separates the signal into multiple copies of the same signal. Accordingly, the optical power of the split signals is reduced compared to the incoming signal. In other example implementations, as shown in FIG. 12C, at least some of the signals from the DAS F1 cable 95 are routed to one or more optical power splitters 448A instead of to WDMs. In one implementation, at least some of the signals from the DAS F1 cable 95 can be routed to the same optical splitter 448A as the signals from the F1 cable 26.

When the pigtails 454 (e.g. pigtails 454A from the optical power splitters 448A and/or pigtails 454B from the WDMs 448B) are not in service, the connectorized ends 456 can be temporarily stored on the storage module 442 that is mounted at the storage region 438 of the swing frame 424. When the pigtails 454 are needed for service, the pigtails 454 are routed from the splitter modules 448 to the termination module 440 that is provided at the termination region 436 of the swing frame 424. At the termination module 440, the pigtails 454 are connected to fibers of an F2 distribution pigtail 460.

In some implementations, the F2 distribution pigtails 460 are adapted for engagement with the multi-fiber optic adapter 468 disposed in the adapter bank 34 as described above. The multi-fiber connector 32 of the F2 distribution cable 30 is adapted for engagement with the exterior port 472 of the multi-fiber optic adapter 468. In other implementations, the F2 distribution pigtails 460 are optically coupled (e.g., spliced, connected via an adapter, etc.) to a stub cable (not shown) that is routed out of the cabinet 400. One example implementation of such a stub cable can be found in U.S. Provisional Application No. 61/310,214, filed Mar. 3, 2010, and titled Fiber Distribution Hub with Connectorized Stub Cables, the disclosure of which is hereby incorporated herein by reference.

In some implementations, as shown in FIG. 12D, one or more of the fibers of the DAS F1 distribution cable 95 are not connected to any of the splitter modules 448. Rather, these fibers of the F1 distribution cable 95 are routed directly to the termination region 436 for connection to F2 fibers 495. In other implementations, the fibers of the DAS F1 distribution cable 95 are optically coupled to pass-through fibers 474 having connectorized ends 476 (see FIG. 12A). The pass-through fibers 474 are connected to the termination modules 440 without first connecting to the splitter modules 452. By refraining from splitting the fiber 95, 474, a stronger signal can be sent to one of the drop terminal ports and, accordingly, to one or more of the antennas 96. The connectorized ends 476 of the pass-through fibers 474 (i.e., or DAS F1 fibers) can be stored at the storage region 438 when not in use.

Referring now to FIG. 13, an exemplary configuration of the drop terminal 36 is shown. The drop terminal 36 includes the housing 42, the spool 44 disposed on an exterior surface of the housing 42 and a mounting assembly 500 adapted for rotational engagement with the spool 44.

Figure 14:
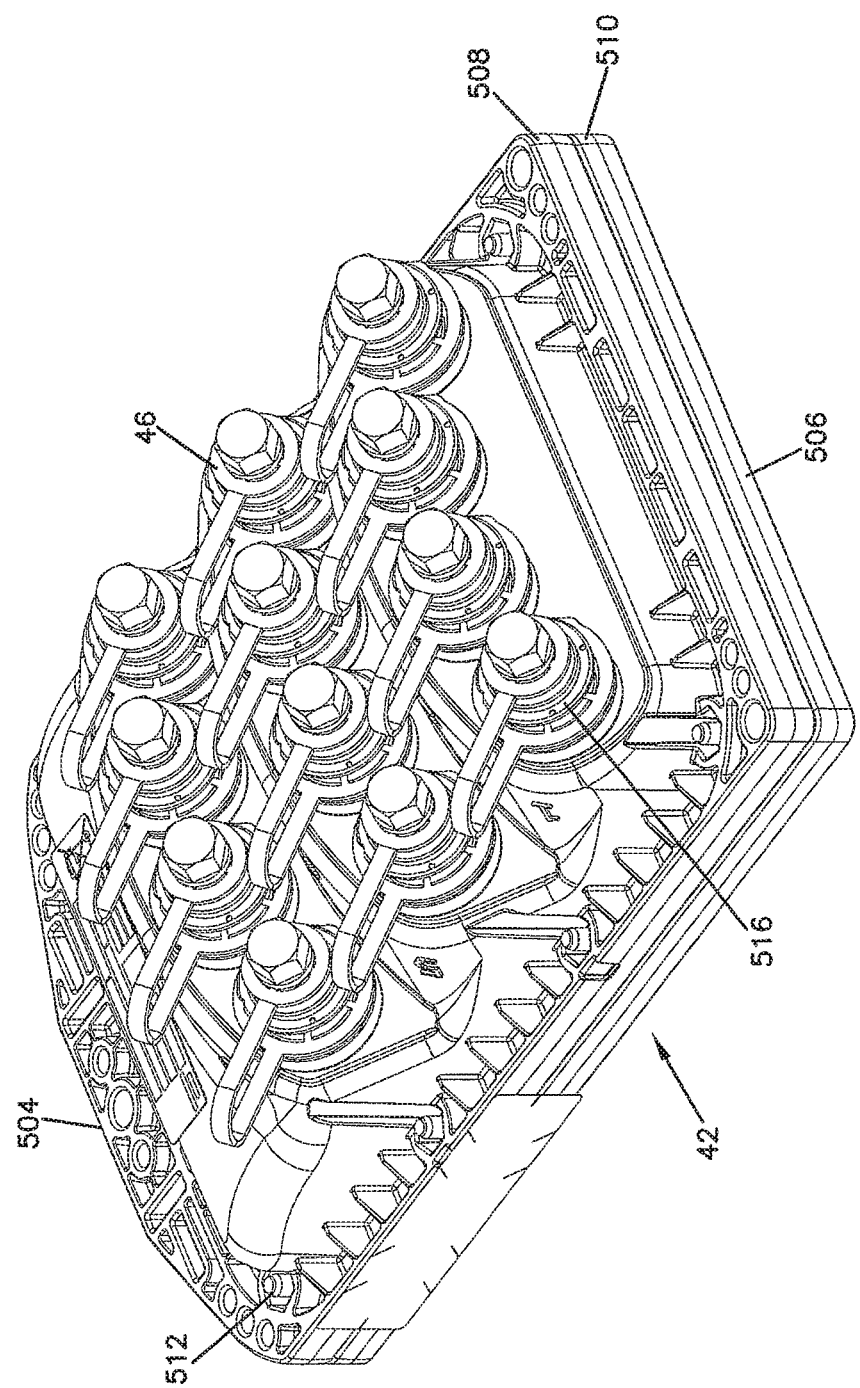
FIG. 14 is a perspective view of a housing suitable for use with the drop terminal in the fiber optic networks of FIGS. 1, 5 and 8.
Figure 15:
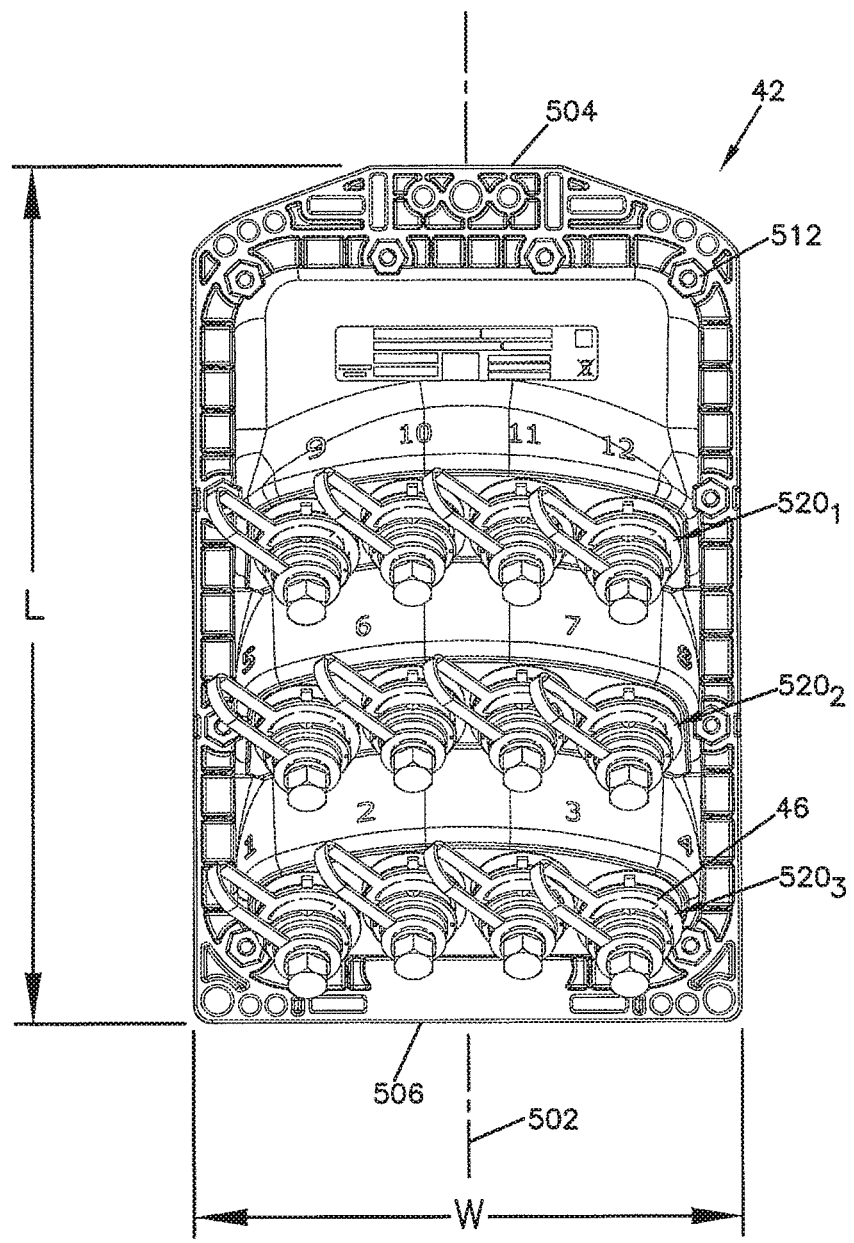
FIG. 15 is a front view of the housing of FIG. 14.
Figure 16:
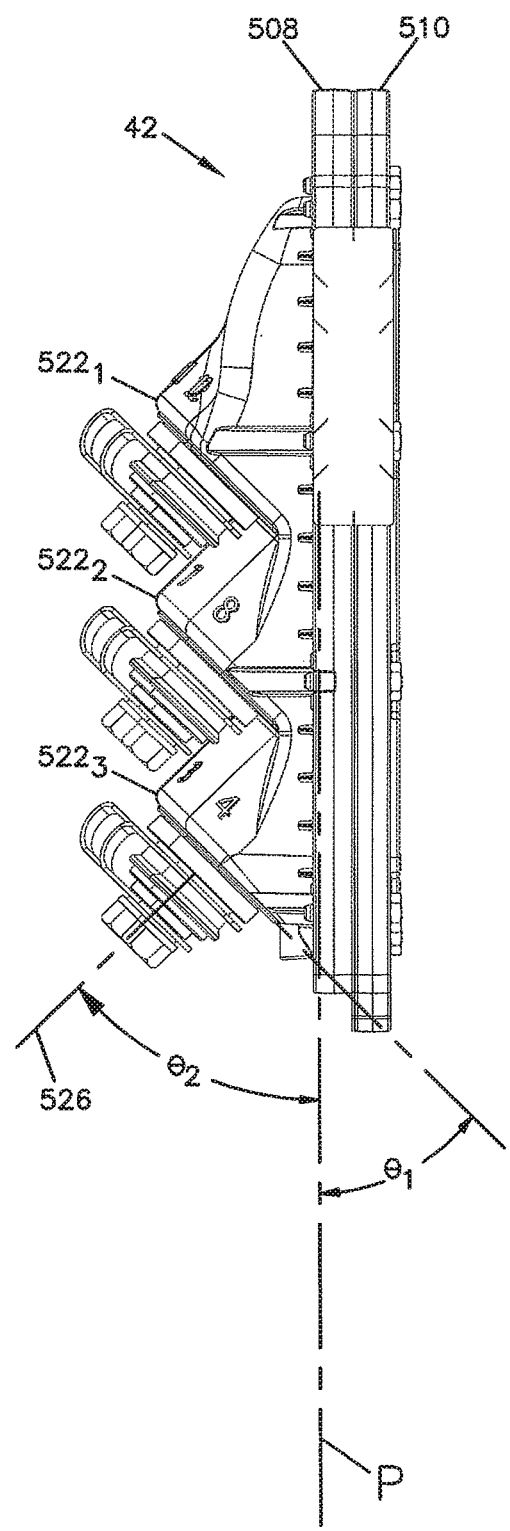
FIG. 16 is a side view of the housing of FIG. 14.

Referring now to FIGS. 14-16, an exemplary configuration of the housing 42 of the drop terminal 36 is shown. The drop terminal shown in FIGS. 13-15 has been has been described in U.S. patent application Ser. No. 11/728,043 (now U.S. Pat. No. 7,512,304), the disclosure of which is hereby incorporated by reference in its entirety.

The housing 42 of the drop terminal 36 includes a central longitudinal axis 502 that extends from a first end 504 to a second end 506 of the housing 42. The housing 42 includes a front piece 508 and a back piece 510 that cooperate to define an enclosed interior of the housing 42. The front and back pieces 508, 510 are joined by fasteners 512 (e.g., bolts or other fastening elements) spaced about a periphery of the housing 42. The front and back pieces 508, 510 are elongated along the central axis 502 so as to extend generally from the first end 504 to the second end 506 of the housing 42.

The drop terminal 36 is environmentally sealed. In the subject embodiment, the drop terminal 36 includes a gasket mounted between the front and back pieces 508, 510 of the housing 42. The gasket extends around the perimeter or periphery of the housing 42 and prevents moisture from entering the enclosed interior of the assembled housing 42.

Figure 17:
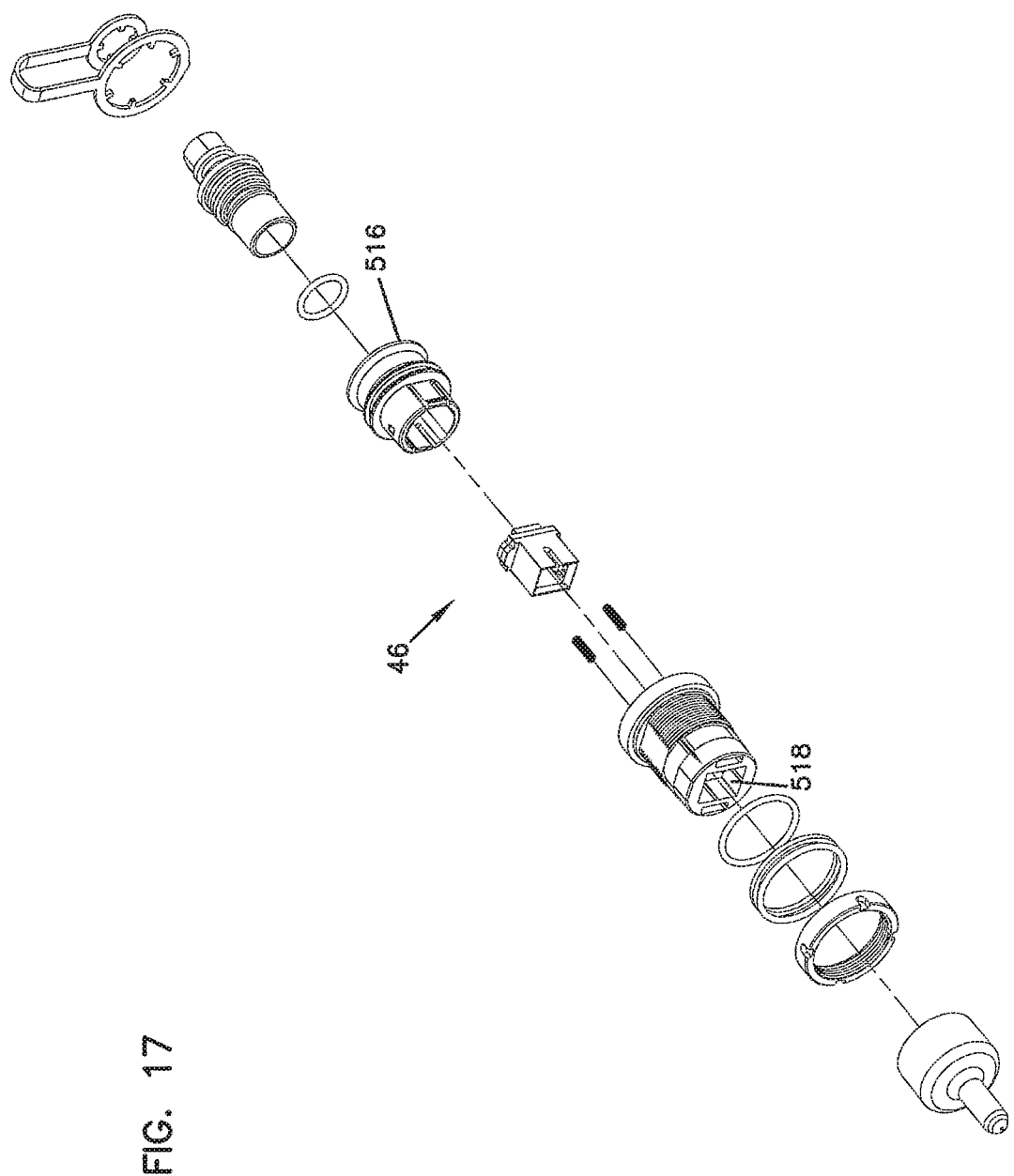
FIG. 17 is an exploded view of a ruggedized fiber optic adapter suitable for use with the drop terminal of FIG. 13.

The housing 42 of the drop terminal 36 also includes the plurality of ruggedized fiber optic adapters 46 mounted to the front piece 508 of the housing 42. As best shown in FIG. 17, each of the ruggedized fiber optic adapters 46 include the first port 516 accessible from outside the housing 42 and the second port 518 accessible from within the housing 42.

The housing 42 of the drop terminal 36 includes a length L and a width W. The length L is parallel to the central longitudinal axis 502 of the housing 42. In the subject embodiment, first, second and third rows $520_1$-$520_3$ of the ruggedized fiber optic adapters 46 are mounted to the front piece 508 of the housing 42. Each of the first, second and third rows $520_1$-$520_3$ includes four ruggedized fiber optic adapters 46 spaced-apart across the width W of the housing 42. It will be understood, however, that the scope of the present disclosure is not limited to the housing 42 of the drop terminal 36 having first, second and third rows $520_1$-$520_3$ or to the housing 42 having four ruggedized fiber optic adapters 46 per row.

In the subject embodiment, the first row $520_1$ is located closest the first end 504 of the housing 42, the third row $520_3$ is located closest the second end 506 of the housing 42 and the second row $520_2$ is located between the first and third rows $520_1$, $520_3$. The front face of the front piece 508 has a stepped configuration with three steps $522_1$-$522_3$ positioned consecutively along the length L of the housing 42. Each step $522_1$-$522_3$ includes an adapter mounting wall $524_1$-$524_3$ defining adapter mounting openings in which the ruggedized fiber optic adapters 46 are mounted. A sealing member 523 (shown in FIG. 17) is compressed between a main housing 525 of the ruggedized fiber optic adapter 46 and the adapter mounting wall $524_1$-$524_3$ to provide an environmental seal about the adapter mounting opening.

As shown at FIG. 15, the adapter mounting walls $524_1$-$524_3$ are generally parallel to one another and are spaced apart along the length L of the housing 42. The adapter mounting walls $524_1$-$524_3$ have front faces that are aligned at an oblique angle $\theta_1$ relative to a plane P that extends through the central longitudinal axis 502 and across the width W of the housing 42. The angled configuration of the adapter mounting walls 524 causes the ruggedized fiber optic adapters 46 to be angled relative to the plane P. For example, center axes 526 of the ruggedized fiber optic adapters 46 are shown aligned at an oblique angle $\theta_2$ relative to the plane.

Figure 18:
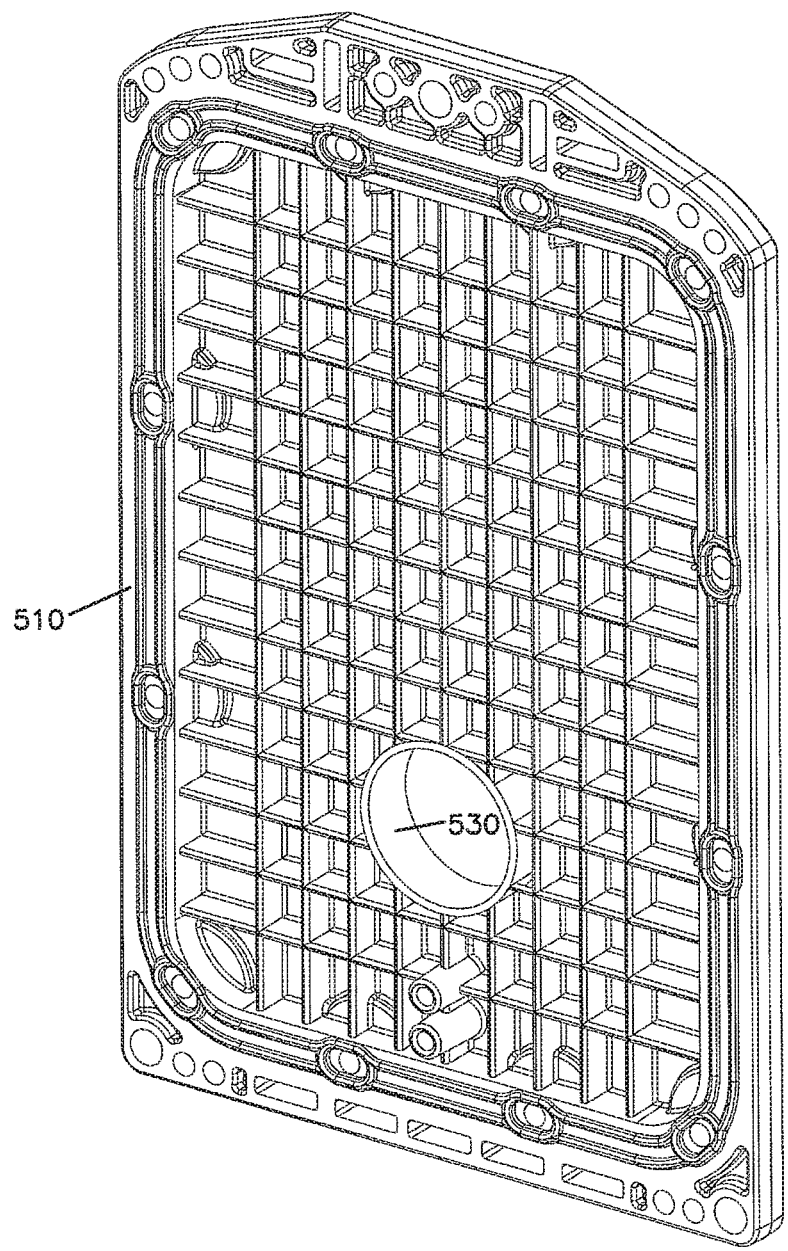
FIG. 18 is a perspective view of a back piece of the housing of FIGS. 14-16.

Referring now to FIG. 18, the back piece 512 of the housing 42 is shown. The back piece 512 defines a cable passage 530 that extends through the back piece 512. The cable passage 530 is adapted to allow the distribution cable 30 to enter/exit the interior of the housing 42. In one embodiment, the cable passage 530 is adapted to receive a cable seal through which the distribution cable 30 passes. The cable seal is adapted to be in sealing engagement with the distribution cable 30 and the cable passage 530 to prevent the ingress of dirt, dust, water, etc. from entering the drop terminal 36 through the cable passage 530.

Referring now to FIG. 13, the spool 44 includes a first end 600a, an oppositely disposed second end 600b, and a drum portion 602 around which the F2 distribution cable 30 is coiled or wrapped. A spool 44 suitable for use with the drop terminal 36 has been described in U.S. patent application Ser. No. 12/113,786, the disclosure of which is hereby incorporated by reference in its entirety.

In the subject embodiment, the first end 600a is disposed adjacent to the back piece 510 of the housing 42. In one embodiment, the first end 600a is sealingly engaged with the back piece 510.

In the depicted embodiment, the first and second spool ends 600a, 600b of the spool 44 are substantially similar. As the first and second ends 600a, 600b in the subject embodiment are substantially similar, the first and second ends 600a, 600b shall be referred to as spool end 600 in both singular and plural tense as required by context. It will be understood, however, that the scope of the present disclosure is not limited to the first and second ends 600a, 600b being substantially similar.

Each spool end 600 is adapted to be a tear-away end. As a tear-away end, the spool end 600 includes a line of weakness 604. In the subject embodiment, the line of weakness 604 extends from an inner diameter 606 of the spool end 600 to an outer diameter 608 of the spool end 600.

Figure 19:
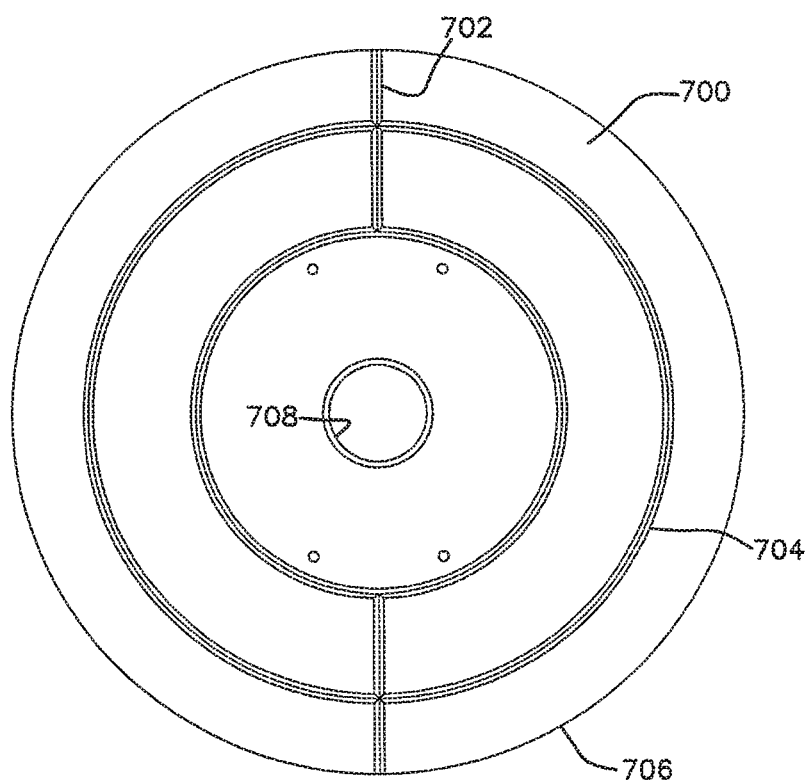
FIG. 19 is an alternate embodiment of a spool end suitable for use with the drop terminal of FIG. 13.

Referring now to FIG. 19, an alternate embodiment of a spool end 700 is shown. In the depicted embodiment of FIG. 19, the spool end 700 includes at least one radial area of weakness 702 and at least one circular area of weakness 704. The radial area of weakness extends from an outside diameter 706 radially inward toward an inner diameter 708 of the spool end 700. The circular area of weakness 704 forms a ring having a diameter that is less than the outer diameter 706 but greater than the inner diameter 708. In the subject embodiment, the circular area of weakness 704 is concentric with the outer diameter 706. In one embodiment, the radial and circular areas of weakness 702, 704 are perforated areas. In another embodiment, the radial and circular areas of weakness 702, 704 are areas of reduced thickness.

Referring again to FIG. 13, each of the spool ends 600 defines an access notch 610 that extends outwardly in a radial direction from the inner diameter 606 and a tab 612 that extends inwardly in a radial direction. The access notch 610 is adapted to provide access to cable wound around the drum portion 602 of the spool 44. The access notch 610 is also adapted to provide a location through which the F2 distribution cable 30 can pass to get access to the cable passage 530 in the housing 42 of the drop terminal 36. The tab 612 is adapted for engagement with the drum portion 602 in order to prevent rotation of the spool ends 600 relative to the drum portion 602.

The drum portion 602 is generally cylindrical in shape and includes a first axial end 614 and an oppositely disposed second axial end 616. In the subject embodiment, the first axial end 614 is disposed adjacent to a bracket 618 that is adapted to receive the housing 42 while the second axial end 616 is disposed adjacent to the mounting assembly 500. The drum portion further includes an inner bore 620 and an outer surface 622.

Each of the first and second axial ends 614, 616 defines a groove 624. In the subject embodiment, each groove 624 extends from the inner bore 620 through the outer surface 622 and is adapted to receive the tab 612 from one of the spool ends 600. As previously stated, the engagement of the tab 612 of spool end 600 in the groove 624 of the drum portion 602 prevents rotation of the spool end 600 relative to the drum portion 602.

The second axial end 616 further defines a notch 626. In the subject embodiment, the notch 626 extends from the inner bore 620 through the outer surface 622 and is disposed on the second axial end 616 opposite the groove 624 on the second axial end 616. The notch 626 is adapted to engage a protrusion 628 on a first plate 630 of the mounting assembly 500. The engagement of the notch 626 and the protrusion 628 of the first plate 630 of the mounting assembly 500 prevents relative rotation between the drum portion 602 and the first plate 630 of the mounting assembly 500.

The mounting assembly 500 includes the first plate 630 and a second plate 632. The first plate 630 is adapted for engagement with the spool 44 while the second plate 632 is adapted for engagement with a mounting location (e.g., hand hole 38, telephone pole 40, etc.). A bearing 634 is disposed between the first and second plates 630. In the subject embodiment, the bearing 634 is a simple bearing having a ring member 636, which is engaged with the second plate 632, and a puck 638, which is engaged with the first plate 630. The puck 638 is adapted for sliding rotational engagement with the ring member 636.

The bearing 634 and the engagement between the first plate 630, the spool 44, and the housing 42 of the drop terminal 36 allow the drop terminal 36 to rotate relative to the second plate 632. This engagement of the first plate 630, the spool 44 and the housing 42 allows the first end 31 of the F2 distribution cable 30 to be deployed from the spool 44 while the second end 33 is optically engaged within the interior of the housing 42.

Figure 20:
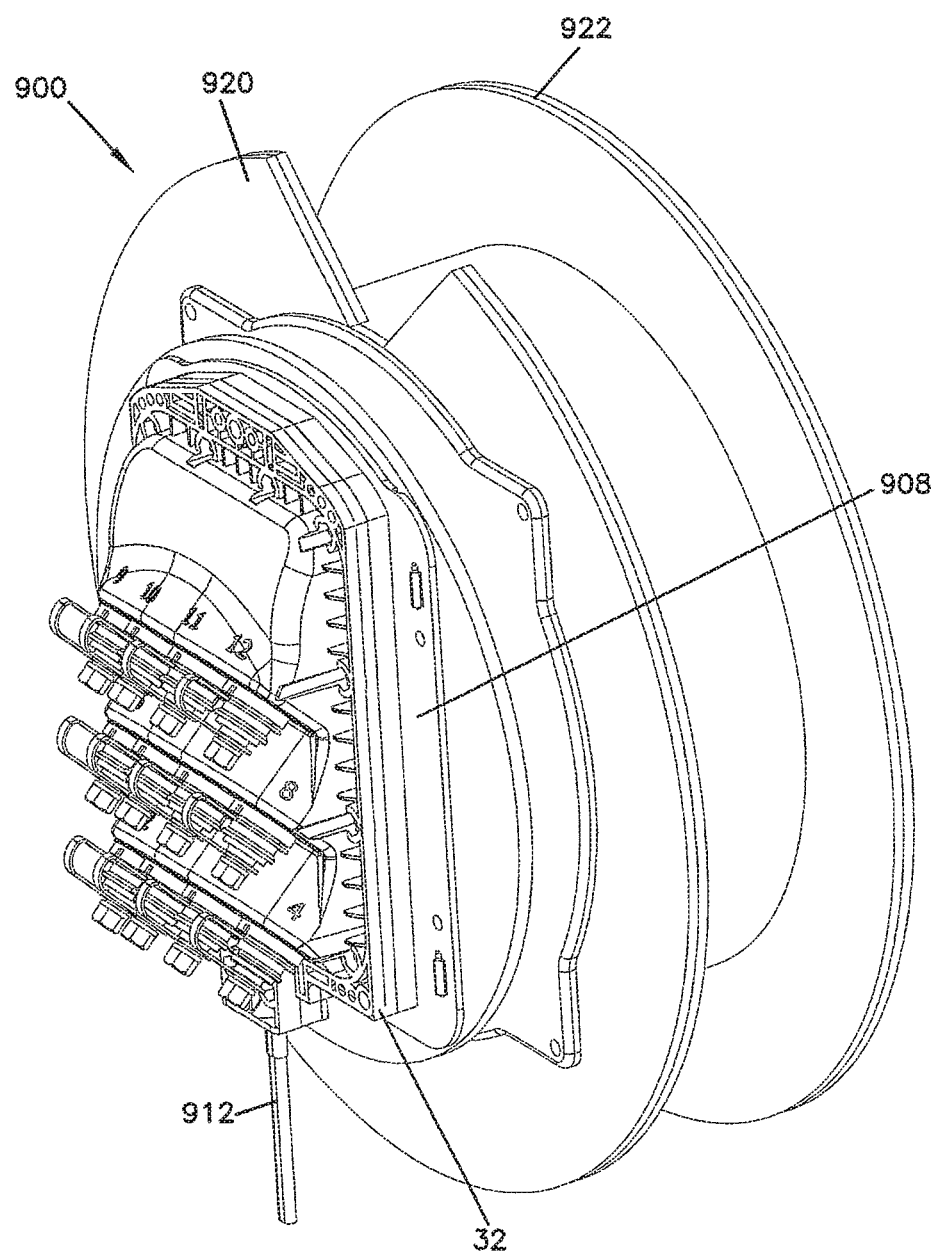
FIG. 20 is a perspective view of an alternate embodiment of a fiber spooling system in accordance with the principles of the present disclosure for use with a drop terminal.
Figure 21:
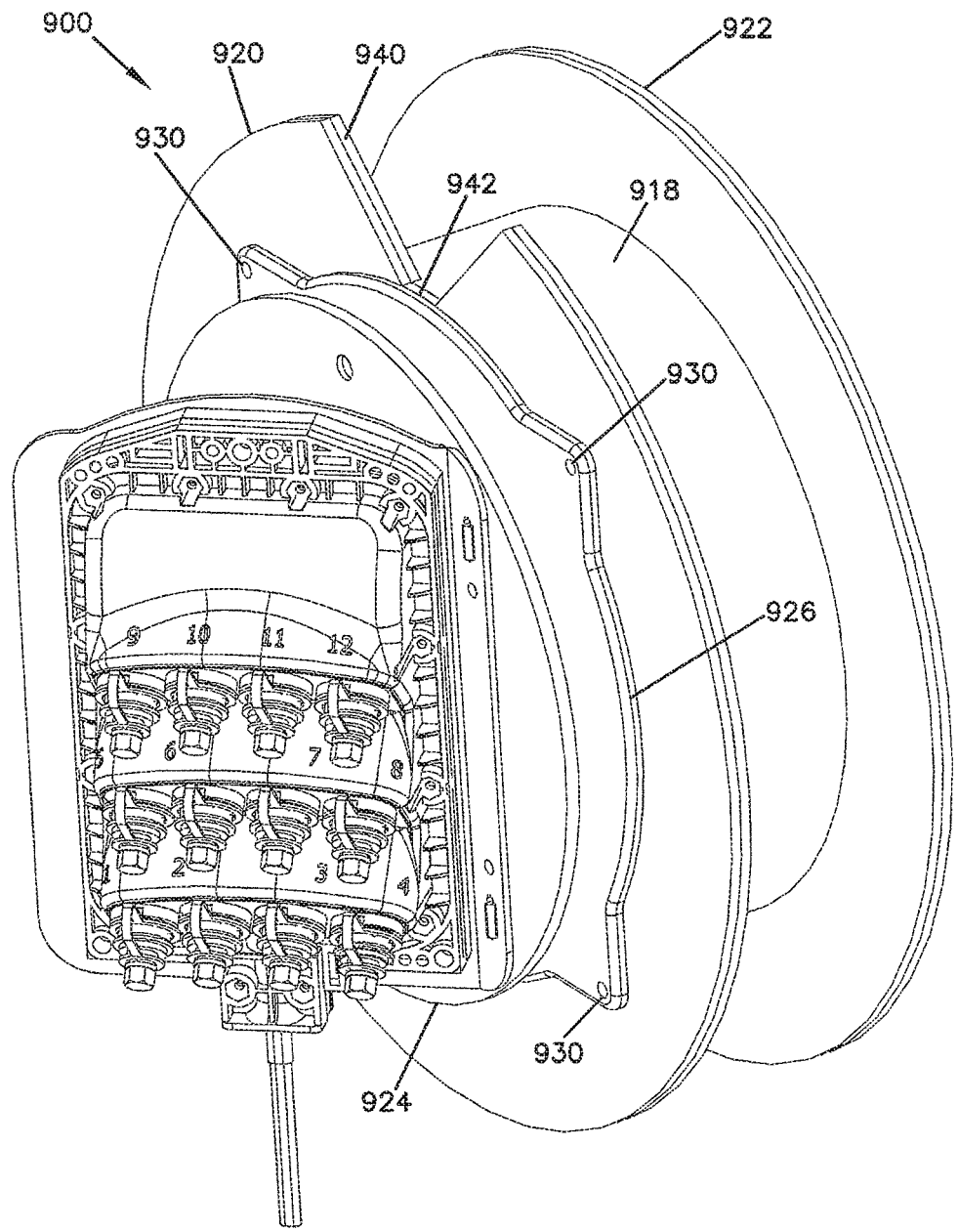
FIG. 21 is a perspective view of the fiber spooling system of FIG. 20 with a hinge plate in an open position.
Figure 22:
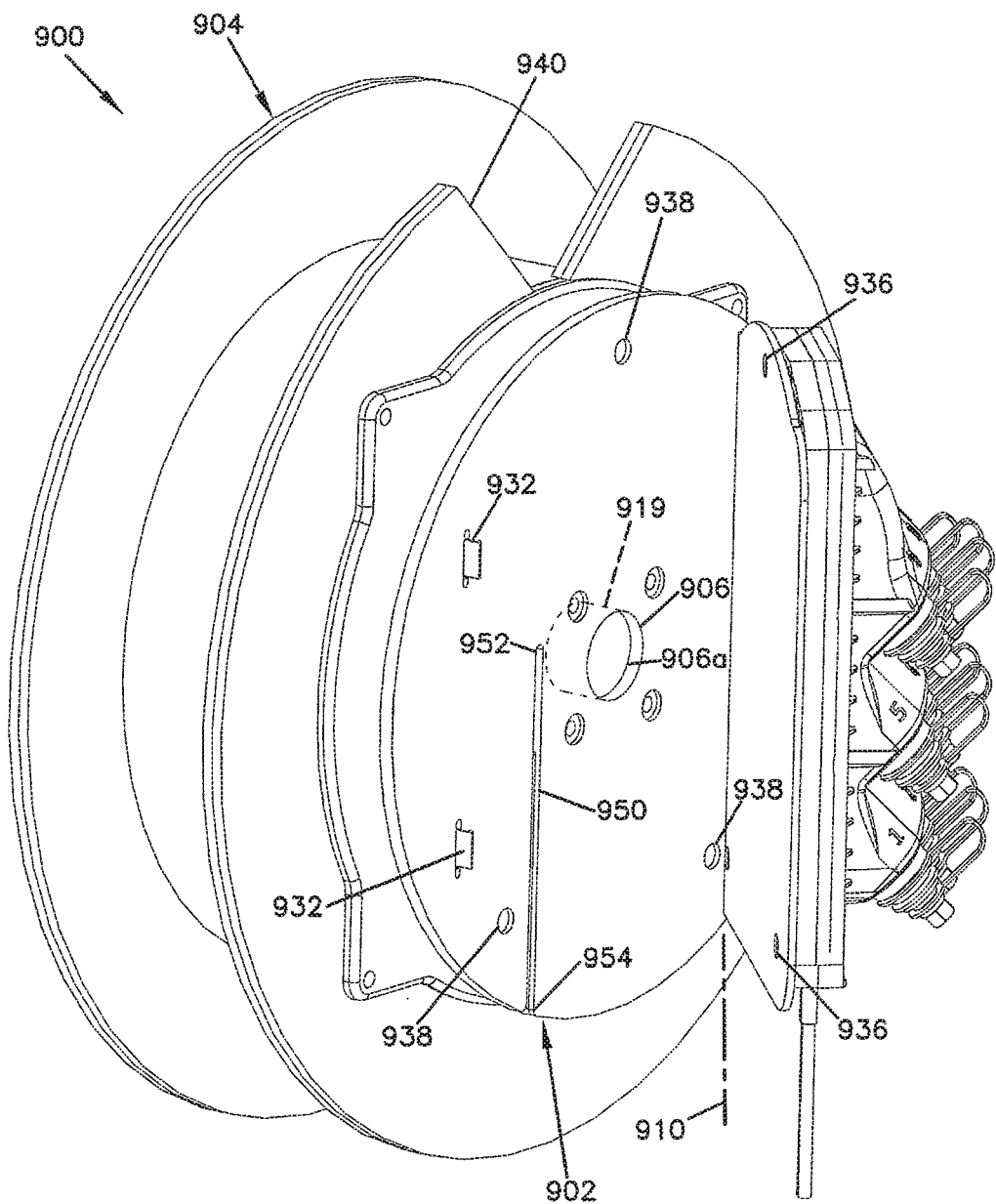
FIG. 22 is a perspective view of the fiber spooling system of FIG. 20 with the hinge plate in the open position.

FIGS. 20-22 show another fiber optic cable spooling system 900 in accordance with the principles of the present disclosure. The spooling system 900 is shown used in combination with drop terminal 36. The spooling system 900 includes a slack storage spool 902 mounted to a disposable bulk storage spool 904. A central passage 906 extends axially through both the bulk storage spool 904 and the slack storage spool 902. The central passage 906 is formed by a first opening 906a that extends coaxially through the slack storage spool 902 and a second opening (not shown) that extends through the bulk storage spool 904 in coaxial alignment with the first opening 906a. The spooling system 900 further includes a hinge plate 908 mounted to a front face of the slack storage spool 902. The hinge plate 908 is pivotally connected to the slack storage spool 902 by a hinge or other type of pivot structure that allows the hinge plate 908 to pivot relative to the slack storage spool 902 about a pivot axis 910 that is generally parallel to the front face of the slack storage spool 902. The drop terminal 36 mounts to a front face of the hinge plate 908. The hinge plate 908 allows the drop terminal 36 to be pivoted between a first position (see FIG. 20) and second position (see FIGS. 21 and 22). When the drop terminal 36 and the hinge plate 908 are in the first position, a front side of the drop terminal 36 faces outwardly from the front side of the slack storage spool 902 and a back side of the drop terminal 36 faces toward the front side of the slack storage spool 902. In this orientation, the hinge plate 908 and the drop terminal 36 block access to the central passage 906 from the front side of the spooling system 900. When the drop terminal 36 and the hinge plate 908 are in the second position, the hinge plate 908 and the drop terminal 36 are pivoted away from the front side of the slack storage spool 902 such that the central passage 906 can be access from the front side of the spooling system 900.

Prior to installation of the drop terminal 36 in the field, a distribution cable 912 corresponding to the drop terminal 36 is spooled around both the slack storage spool 902 and the bulk storage spool 904 to facilitate shipping and handling of the drop terminals 36 along with the corresponding distribution cable 912. A first portion of the distribution cable 912 is stored at the slack storage spool 902 while a second portion of the distribution cable 912 is stored about the bulk storage spool 704.

In use of the spooling system 900, the spooling system 900 and its corresponding drop terminal 36 can be delivered to a location in close proximity to where it is desired to mount the drop terminal 36. When shipping takes place, the hinge plate 908 and drop terminal 36 are oriented in the closed position. To begin the installation process, the hinge plate 908 is pivoted from the closed position of FIG. 20 to the open position of FIGS. 21 and 22. With the hinge plate 908 in the open position, a front end of the central passage 906 is exposed such that a mandrel can be inserted through the central passage 906. It will be appreciated that the mandrel may be supported on a cart, frame, or other structure so that the spooling system 900 is elevated above the ground. The distal end of the distribution cable 912 (i.e., the end of the distribution cable that is farthest from the drop terminal 36) can then be accessed and pulled towards a connection/termination location such as a fiber distribution hub. For example, the distal end of the distribution cable 912 could be pulled through an underground conduit or routed along an aerial routing path. As the distribution cable 912 is pulled, the second portion of the distribution cable 912 is removed from the bulk storage spool 904. As the second portion of the distribution cable 912 is removed from the bulk storage spool 904, the bulk storage spool 904, the slack storage spool 902, the hinge plate 908 and the drop terminal 36 all rotate together in unison about the mandrel as the cable pays off of the bulk storage spool 904. Once the second portion of the distribution cable 912 has been completely removed from the bulk storage spool 904, the first portion of the distribution cable 912 begins to pay off of the slack storage spool 902. The first portion of the distribution cable 912 continues to be paid off of the slack storage spool 902 until the distal end of the distribution cable 912 reaches its end destination (e.g., a fiber distribution hub, collector box or other termination location). Once a sufficient length of the distribution cable 912 has been removed from the spooling system 900, the spools 902, 904 can be removed from the mandrel, and the bulk storage spool 904 can be disconnected from the slack storage spool 902 and discarded. Extra length of the distribution cable 912 can remain stored on the slack storage spool 902. The hinge plate 908 can then be moved back to the closed position of FIG. 20, and the drop terminal 36 can be mounted to its desired mounting location by securing the slack storage spool 902 to the mounting location (e.g., a wall, a pole or other structure).

The spooling system 900 is preferably adapted to hold a relatively large amount of cable. For example, in one embodiment, the slack storage spool 902 holds about 60 meters of 5 mm diameter distribution cable, and the bulk spool 904 is sized to hold about 550 meters of 5 mm diameter distribution cable. In other embodiments, the spooling system 900 holds at least 200 meters of 5 millimeter diameter cable. In still other embodiments, the spooling system 900 is sized to hold at least 400 meters of 5 millimeter diameter cable. In additional embodiments, the spooling system 900 is configured to hold at least 600 meters of 5 millimeter diameter cable.

Referring to FIGS. 20-22, the bulk storage spool 904 has a diameter that is substantially larger than the diameter of the slack storage spool 902. The bulk storage spool 904 includes a core 918 about which the distribution cable is wrapped during storage. The bulk storage spool 904 also includes front and back radial flanges 920, 922 positioned at front and back axial ends of the core 918. The flanges 920, 922 are spaced-apart in a direction extending along the axis of the core 918 so as to define a cable storage space between the flanges 920, 922 which surrounds the core 918. The central passage 906 extends axially through a center of the core 918. During use of the bulk storage spool 904, the second portion of the distribution cable 912 is wrapped around the core 918 and is contained in the region between the front and back flanges 920, 922.

The slack storage spool includes a core 919 that is coaxially aligned with the core 918 of the bulk storage spool 904. The core 919 has a diameter that is substantially smaller than the diameter of the core 918 and the passage 906 extends axially through a center of the core 919. The slack storage spool 902 also includes front and back radial flanges 924, 926 positioned at front and back axial ends of the core 919. The flanges 924, 926 are spaced-apart in a direction extending along the axis of the core 919 so as to define a cable storage space between the flanges 924, 926 which surrounds the core 919. The flanges 924, 926 have smaller diameters than the flanges 920, 922. During use of the slack storage spool 902, the first portion of the distribution cable 912 is wrapped around the core 919 and is contained in the region between the front and back flanges 924, 926.

The slack storage spool 902 is preferably non-rotatably mounted to the bulk storage spool 904. By "non-rotatably" mounted, it is meant that the slack storage spool 902 is mounted in such a way that the slack storage spool 902 and the bulk storage spool 904 can rotate in unison about a mandrel through the central passage 906 when cable is dispensed from the spooling system 900. In one embodiment, the slack storage spool 902 can be secured to a front face of the front flange 920 of the bulk storage spool 904 by fasteners (e.g., bolts, screws, rivets, pins, snaps, etc.) inserted through fastener openings 930 defined through the rear flange 926 of the slack storage spool 902. Preferably, the fasteners are removable so that the slack storage spool 902 can be disconnected from the bulk storage spool 904 after the second portion distribution cable 912 has been removed from the bulk storage spool 904. After the bulk storage spool 904 has been disconnected from the slack storage spool 902, the mounting openings 930 can be used to receive fasteners for securing the slack storage spool 902 to the structure (e.g., a wall or pole) to which it is desired to mount the drop terminal 36.

Referring to FIG. 22, the front face of the front flange 924 of the slack storage spool 902 includes a pair of flexible latches 932 that engage the hinge plate 908 when the hinge plate 908 is in the closed position to selectively hold the hinge plate 908 in the closed position.

The drop terminal 36 can be secured to the hinge plate 908 by fasteners inserted through openings defined through the housing 42 of the drop terminal 36 that coaxially align with corresponding opening 936 provided through the hinge plate 908. After the distribution cable 912 has been dispensed from the spooling system 900 and the hinge plate 908 has been pivoted back to the closed position, the openings 936 can be aligned with corresponding opening 938 provided in the front flange 924 of the slack storage spool 902, and the fasteners used to secure the drop terminal 36 to the hinge plate 908 can be removed and replaced with longer fasteners that extend through the openings defined by the housing 42 of the drop terminal 36, the openings 936 defined by the hinge plate 908 and the openings 938 defined through the front flange 924 of the slack storage spool 902. In this manner, the fasteners provide retention of the drop terminal 36 to the slack storage spool 902 that supplements the retention force provided by the clip 932.

The front flange 920 of the bulk storage spool 904 defines a cable transition notch 940 having a bottom end 942 that is generally flush with an outer circumferential surface of the core 918 and is also generally flush with the outer peripheral surface of the rear flange 926 of the slack storage spool 902. Similarly, the slack storage spool 902 includes a cable transition slot 950 having a closed end 952 that is generally flush with the outer circumferential surface of the core 919 of the slack storage spool 902. The slot 950 also includes an open end 954 located at an outer peripheral edge of the front flange 924 of the slack storage spool 902. When spooling the distribution cable 912 on the spooling system 900, the distribution cable 912 is routed from the bottom end of the drop terminal 36 through the cable transition slot 950 to the core 919. The first portion of the distribution cable 912 is then wrapped around the core 919 until the space between the flanges 924, 926 is filled and the cable reaches the outer peripheral edges of the flanges 924, 926. The cable is then passed through the cable transition notch 940 to the outer circumferential surface of the core 918 of the bulk storage spool 904. The second portion of the distribution cable 912 is then wrapped around the core 918 to complete the storage of the remainder of the distribution cable 912.

In an alternative installation process, the spooling system 900 and the corresponding drop terminal 36 can initially be delivered to a termination location (e.g., a fiber distribution hub, collector box or other structure) that is remote from the desired mounting location of the drop terminal 36. The distal end of the distribution cable is then connected to the termination location. Thereafter, the hinge plate 908 is pivoted to the open position of FIGS. 21 and 22, and a mandrel mounted to a moveable structure such as a moveable cart is passed through the central opening 906. Thereafter, the cart is used to move the spooling system 900 and its corresponding drop terminal 36 to the desired mounting location. As the cart is moved, the slack storage spool 902, the bulk spool 904 and the drop terminal 36 rotate in unison as the distribution cable 912 is paid off the spooling system. Before reaching the end destination, it is preferred for all of the second portion of the distribution cable 912 to be removed from the bulk storage spool 904. Thus, when the final destination is reached, the bulk spool 904 can be removed from the slack storage spool 902 and discarded. Thereafter, the slack storage spool 902 can be mounted to a desired mounting location to secure the drop terminal at the desired location.

Figure 23:
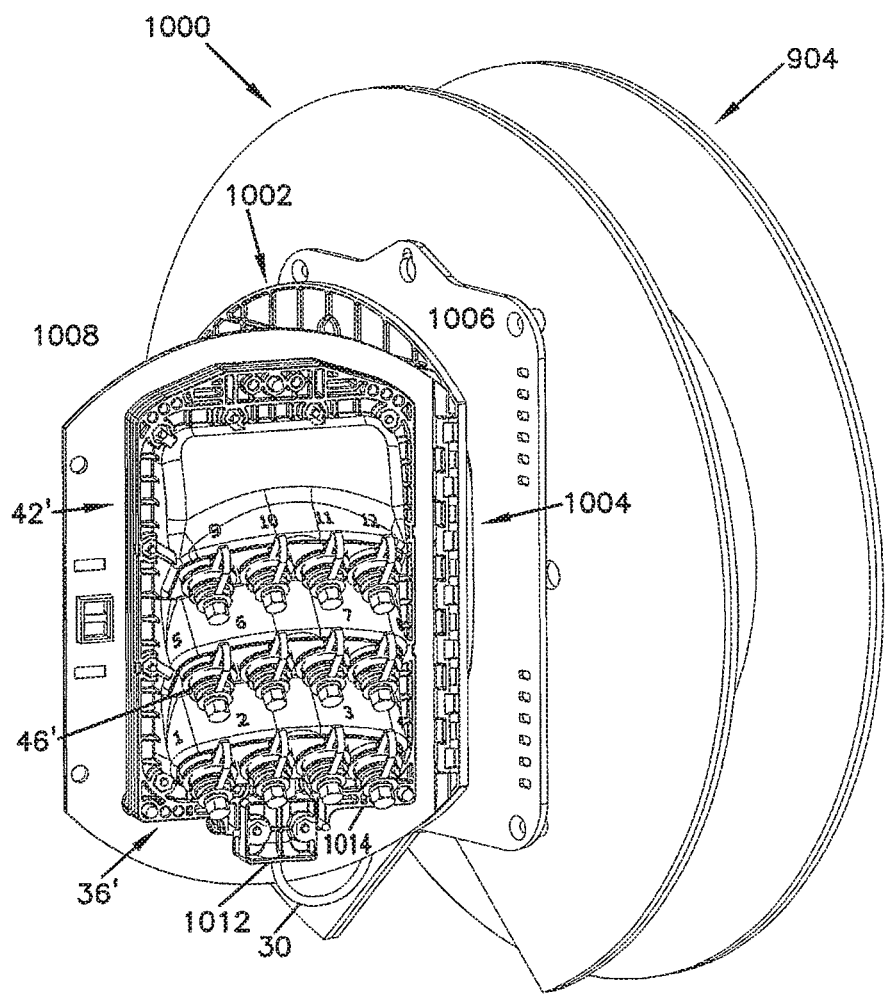
FIG. 23 is a perspective view of an alternate embodiment of a spooling system.
Figure 24:
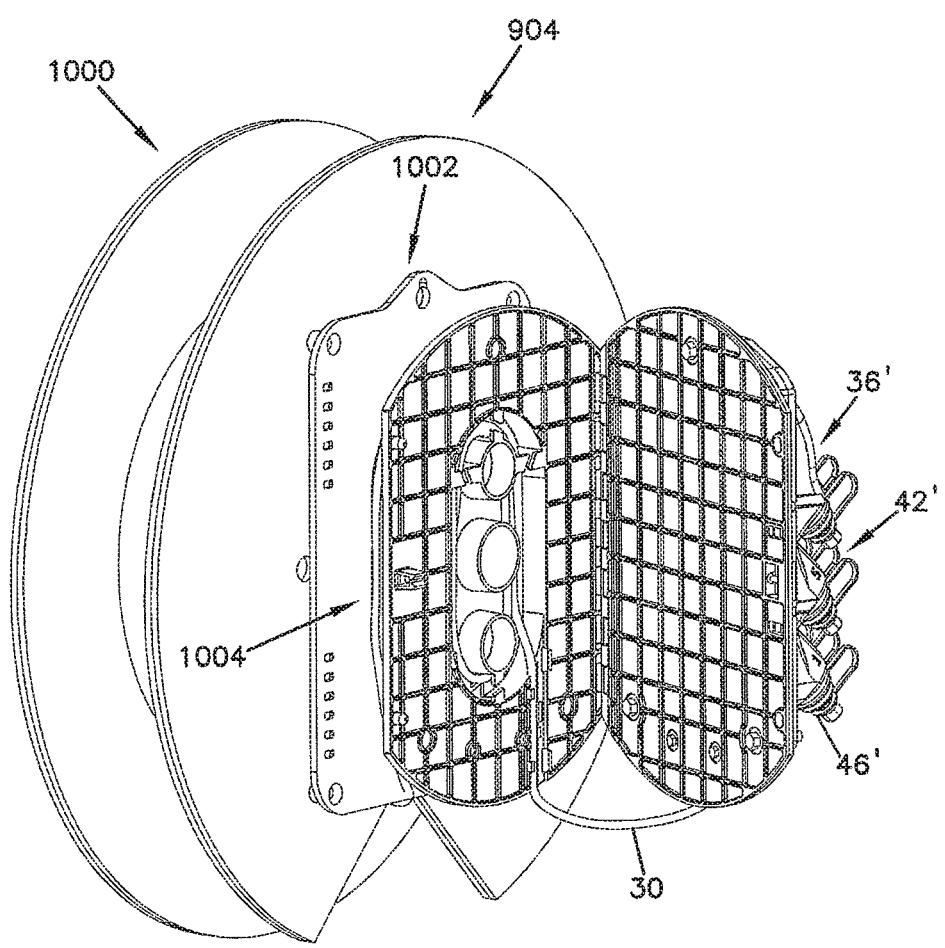
FIG. 24 is a perspective view of the spooling system with a hinge plate in an open position.
Figure 25:
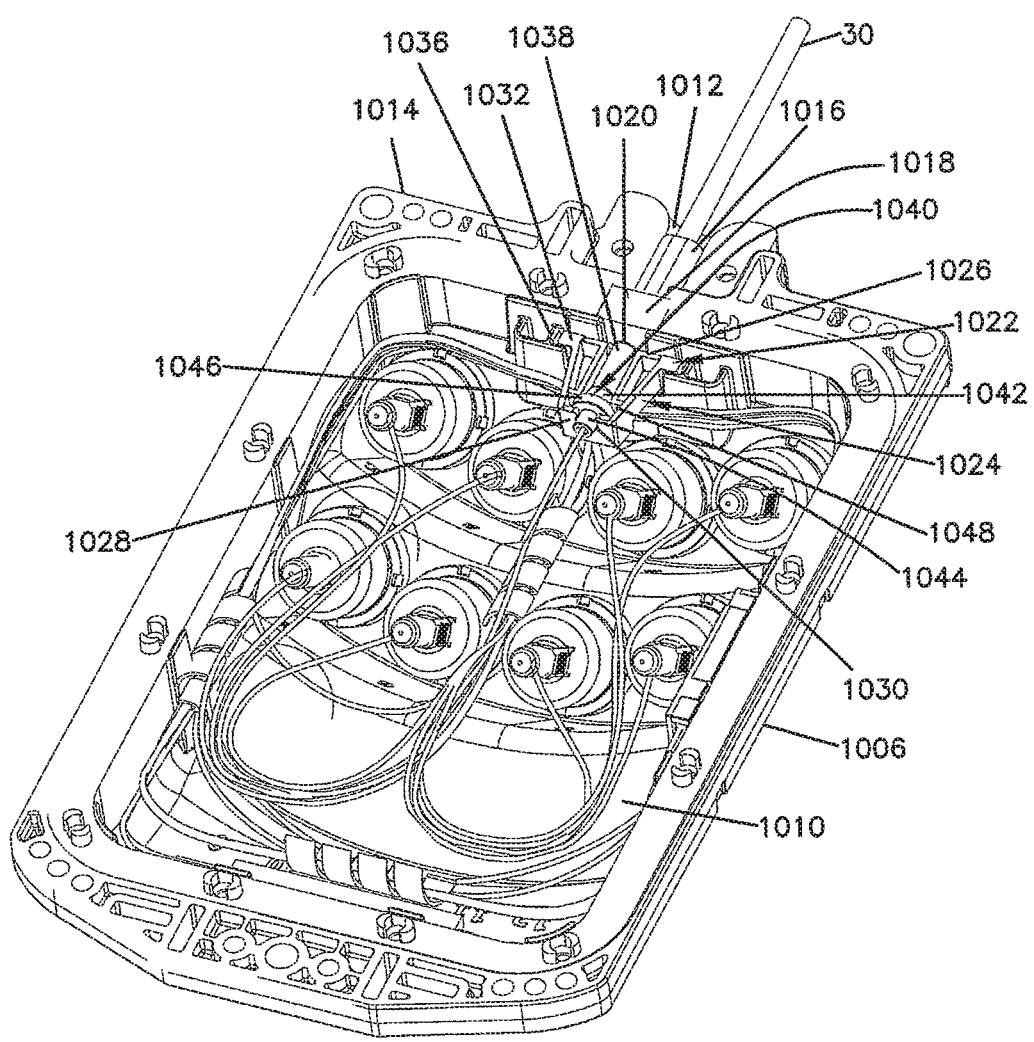
FIG. 25 is a perspective view of a cover of a drop terminal of the spooling system of FIG. 23.
Figure 26:
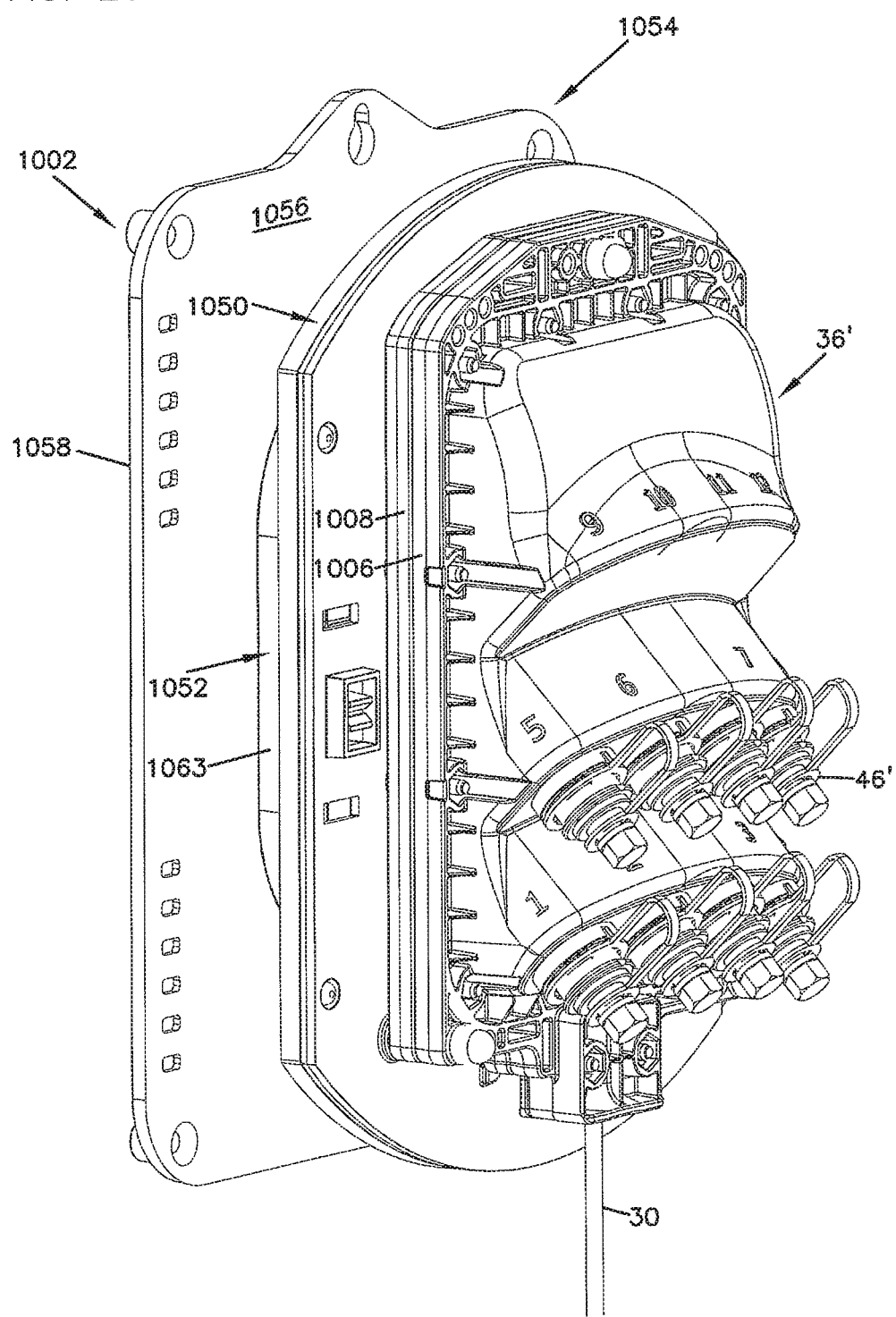
FIG. 26 is a perspective view of a drop terminal assembly suitable for use with the spooling system of FIG. 23.

Referring now to FIGS. 23-25, an alternate embodiment of a spooling system 1000 is shown. The spooling system 1000 includes a drop terminal assembly 1002 having a drop terminal 36' that is selectively releasably engaged with a slack storage spool 1004 that is selectively releasably engaged with the bulk storage spool 904.

The drop terminal 36' includes a housing 42'. The housing 42' includes a cover 1006 and a base 1008. In the subject embodiment, the cover 1006 and the base 1008 cooperatively define an interior region 1010. A plurality of ruggedized fiber optic adapters 46' is mounted to the housing 42'. In the subject embodiment, the plurality of ruggedized fiber optic adapters 46' is mounted to the cover 1006.

The ruggedized fiber optic adapters 46' include first ports that are accessible from outside the housing 42' and second ports that are accessible from inside the housing 42'. The first ports of the ruggedized fiber optic adapters 46' are adapted to receive connectorized ends of distribution cables. The second ports of the ruggedized fiber optic adapters 46' are adapted to receive fibers of the multi-fiber distribution cable 30.

The housing 42' defines an access opening 1012. In one embodiment, the access opening 1012 is cooperatively defined by the cover 1006 and the base 1008. In the subject embodiment, the access opening 1012 is disposed in a sidewall 1014 of the housing 42'. The multi-fiber cable 30 is routed into the interior of the housing 42' through the access opening 1012.

In the subject embodiment, the housing 42' includes a first environmental seal 1016 and a second environmental seal 1018. The first and second environmental seals 1016, 1018 are disposed in the access opening 1012. In the subject embodiment, the first environmental seal 1016 is a grommet. The first environmental seal 1016 is adapted to sealingly engage the multi-fiber cable 30. The second environmental seal 1018 includes a passage 1020 through which the multi-fiber cable 30 passes. The second environmental seal 1018 is adapted to seal around the multi-fiber cable 30.

The housing 42' further includes an anchor block 1022. The anchor block 122 is disposed in the interior region 1010 of the housing 42'. In the subject embodiment, the anchor block 1022 is disposed immediately adjacent to the access opening 1012 of the drop terminal 36'.

The anchor block 1022 includes a body 1024 having a first end 1026 and a second end 1028. The anchor block 1022 defines a passage 1030 that extends through the first and second ends 1026, 1028. The passage 1030 is adapted to receive a portion of the multi-fiber cable 30.

The anchor block 1022 is engaged with the housing 42'. In the subject embodiment, the anchor block 1022 is in interlocking engagement with the housing 42'. The anchor block 1022 includes a plurality of tabs 1032 that extend outwardly from the anchor block 1022. In the subject embodiment, the plurality of tabs 1032 extends outwardly from the body 1024 of the anchor block 1022 in a direction that is generally perpendicular to a central longitudinal axis of the anchor block 1022. The plurality of tabs 1032 is adapted to engage a first receptacle 1036 in the housing 42' of the drop terminal 36'.

The anchor block 1022 includes a crimp 1038 and a retainer 1040 disposed in the passage 1030. In the subject embodiment, the crimp 1038 is a cylindrical tube that is made of a deformable material. The crimp 1038 defines a thru-bore that is adapted to receive the multi-fiber cable 30. With the multi-fiber cable 30 disposed in the thru-bore of the crimp 1038, the crimp 1038 can be deformed around the multi-fiber cable 30 by compressing the crimp 1038.

The retainer 1040 includes a first end portion 1042, a second end portion 1044 and a flange 1046 disposed between the first and second end portions 1042, 1044. The retainer 1040 defines a bore that extends though the first and second end portions 1042, 1044. The bore is adapted to receive the multi-fiber cable 30.

The retainer 1040 is adapted to interlock with the anchor block 1022. In the subject embodiment, the flange 1046 of the retainer 1040 is adapted to be received in a second receptacle 1048 defined by the first end 1026 of the anchor block 1022. The engagement of the flange 1046 and the second receptacle 1048 axially retains the retainer 1040 in the anchor block 1022.

Referring now to FIGS. 26-29, the drop terminal 36' and the slack storage spool 1004 are shown in engagement. The slack storage spool 1004 includes a first flange 1050, a drum portion 1052 and a second flange 1054.

The second flange 1054 is adapted for engagement with the front radial flange 920 of the bulk storage spool 904. In the subject embodiment, a plurality of fasteners 1055 (e.g., bolts, screws, rivets, etc.) is used to engage the second flange 1054 to the front radial flange 920 of the bulk storage spool 904.

The second flange 1054 includes a first surface 1056 and an oppositely disposed second surface 1058. The first surface 1056 faces in a direction toward the drum portion 1052 while the second surface 1058 faces in a direction toward the bulk cable spool 904. The second surface 1058 includes a mounting area 1060. The mounting area 1060 extends outwardly from the second surface 1058. The mounting area 1060 adapted for mounting the slack storage spool 1004 and the drop terminal 36' to a mounting location (e.g., wall, pole, post, hand hole, etc.). In the subject embodiment, the mounting area 1060 defines a channel 1062. In the subject embodiment, the channel 1062 is arcuate in shape. The channel 1062 is adapted to receive a portion of a mounting structure (e.g., a post, pole, etc.).

The drum portion 1052 is disposed between the first flange 1050 and the second flange 1054. In the subject embodiment, the drum portion 1052 is releasably engaged to the first flange 1050. The releasable engagement is potentially advantageous as it allows the drum portion 1052 and the second flange 1054 to be removed from the drop terminal 36' in the event all of the cable 30 is unwound from the bulk storage spool 904 and the slack storage spool 1004. In one embodiment, the drum portion 1052 is in snap-fit engagement with the first flange 1050. In another embodiment, the drum portion 1052 is engaged with the first flange 1050 by fasteners 1061 (e.g., bolts, screws, etc.).

The drum portion 1052 includes an outer surface 1063 (shown in FIG. 26) and defines an inner cavity. The drum portion 1052 is configured to receive the multi-fiber cable 30 such that the multi-fiber cable 30 wraps around the outer surface 1063 of the drum portion 1052. In the subject embodiment, the drum portion 1052 is cylindrical in shape having a cross-section that is generally oblong. In another embodiment, the drum portion 1052 has a cross-section that is generally oval in shape.

The first flange 1050 includes a flange plate 1065 and a hinge plate 1066. The first flange 1050 further includes a hinge assembly 1068.

Figure 27:
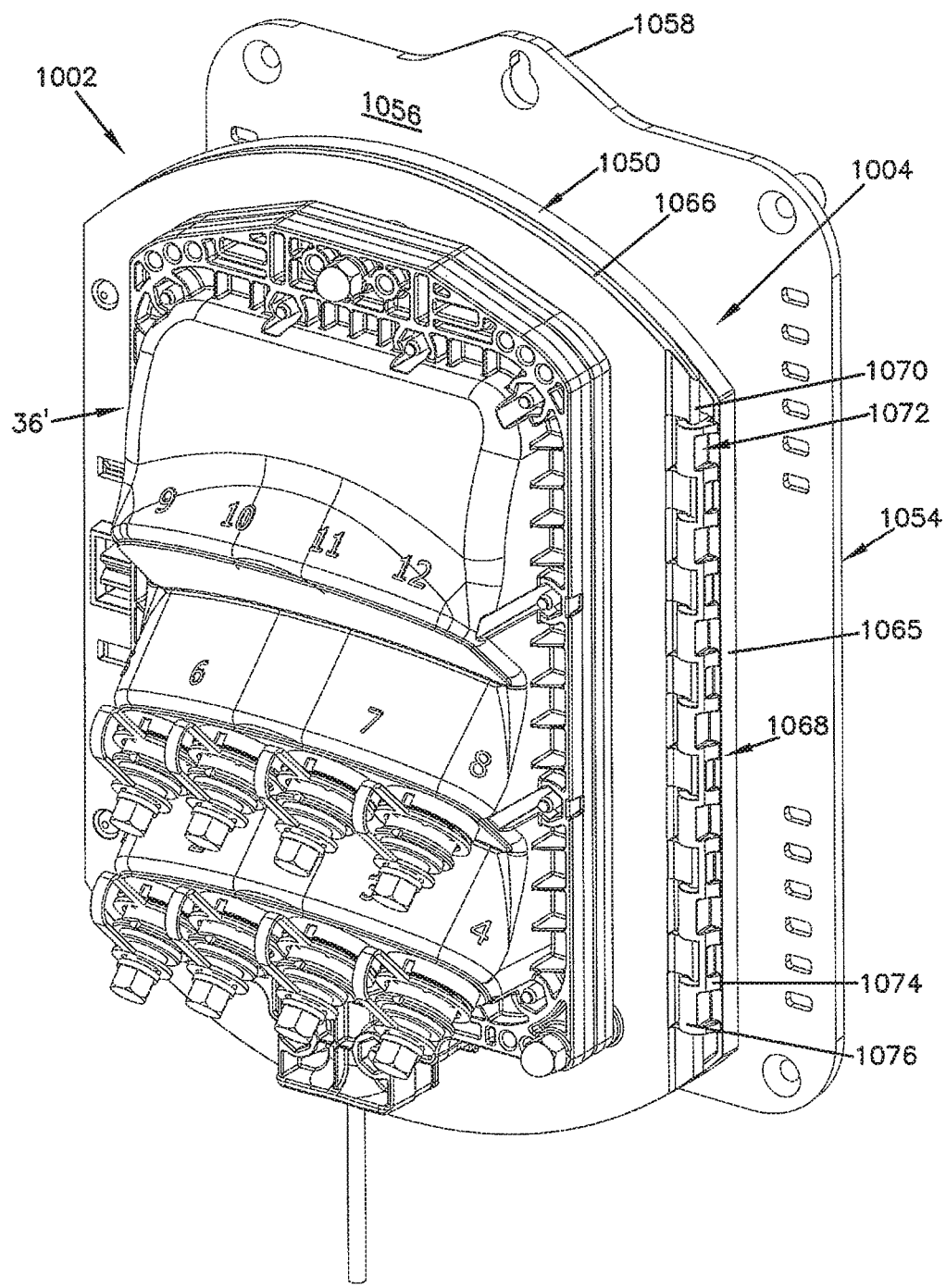
FIG. 27 is a perspective view of the drop terminal assembly of FIG. 26.

Referring now to FIG. 27, the hinge assembly 1068 includes a hinge pin 1070 and a hinge receptacle 1072. The hinge receptacle 1072 is adapted to receive the hinge pin 1070. In the subject embodiment, the hinge pin 1070 is engaged to the hinge plate 1066 while the hinge receptacle 1072 is fixed to the flange plate 1065. In the subject embodiment, the hinge receptacle 1072 includes a base end 1074 that is fixed to the flange plate 1065 and a free end 1076 that extends outwardly from the flange plate 1065. In one embodiment, the free end 1076 of the hinge receptacle 1072 is generally hook-shaped.

The hinge assembly 1068 is adapted to allow the hinge plate 1066 to pivot relative to the flange plate 1065 between a first position (shown in FIG. 27) and a second position (shown in FIG. 28) relative to the flange plate 1065. In one embodiment, the hinge plate 1066 pivots in a range of about 0 degrees to about 180 degrees. In another embodiment, the hinge plate 1066 pivots in a range of about 0 degrees to about 90 degrees. In another embodiment, the hinge plate 1066 pivots an amount greater than or equal to 45 degrees.

Figure 28:
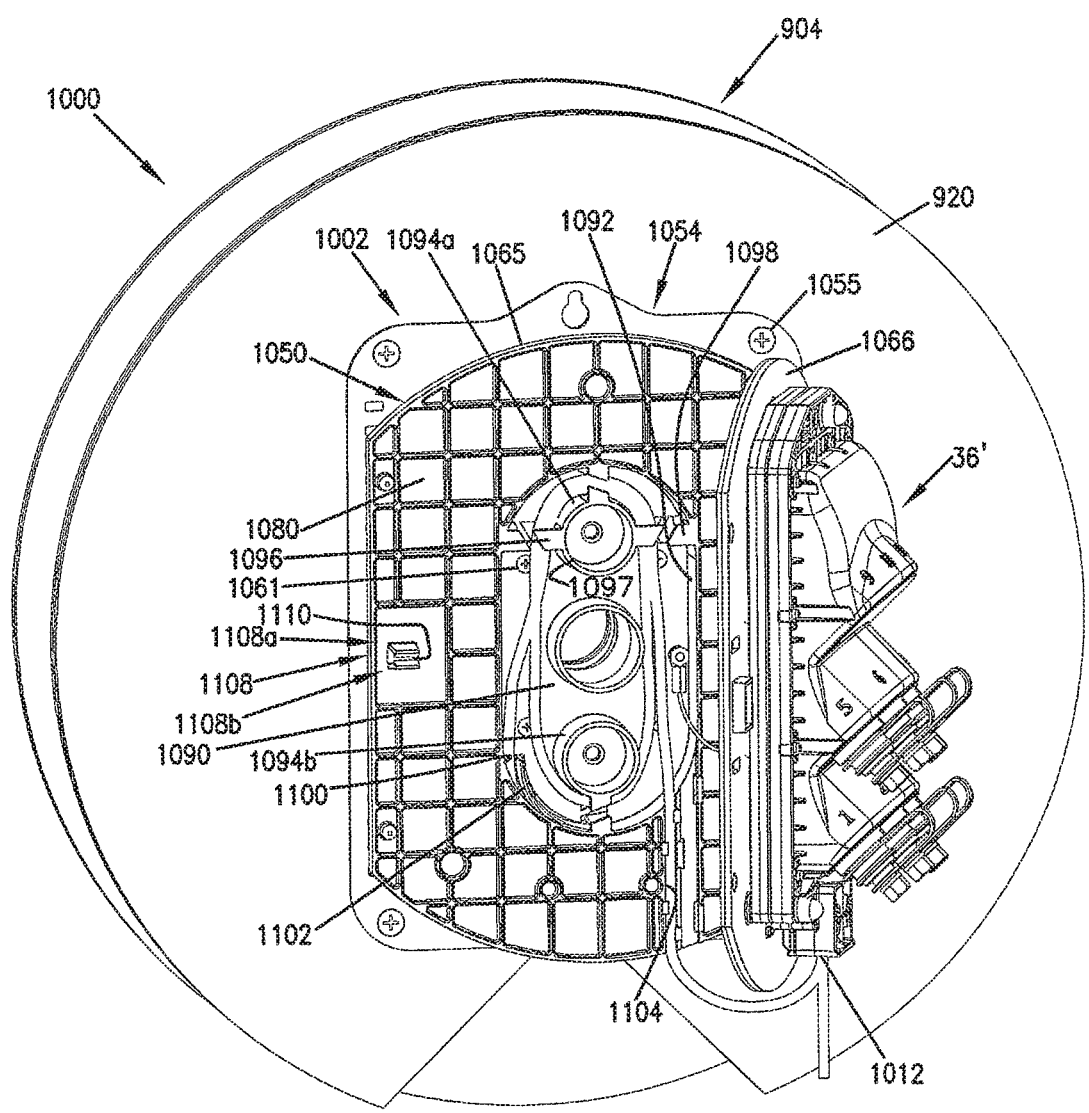
FIG. 28 is a perspective view of the spooling system of FIG. 23.
Figure 29:
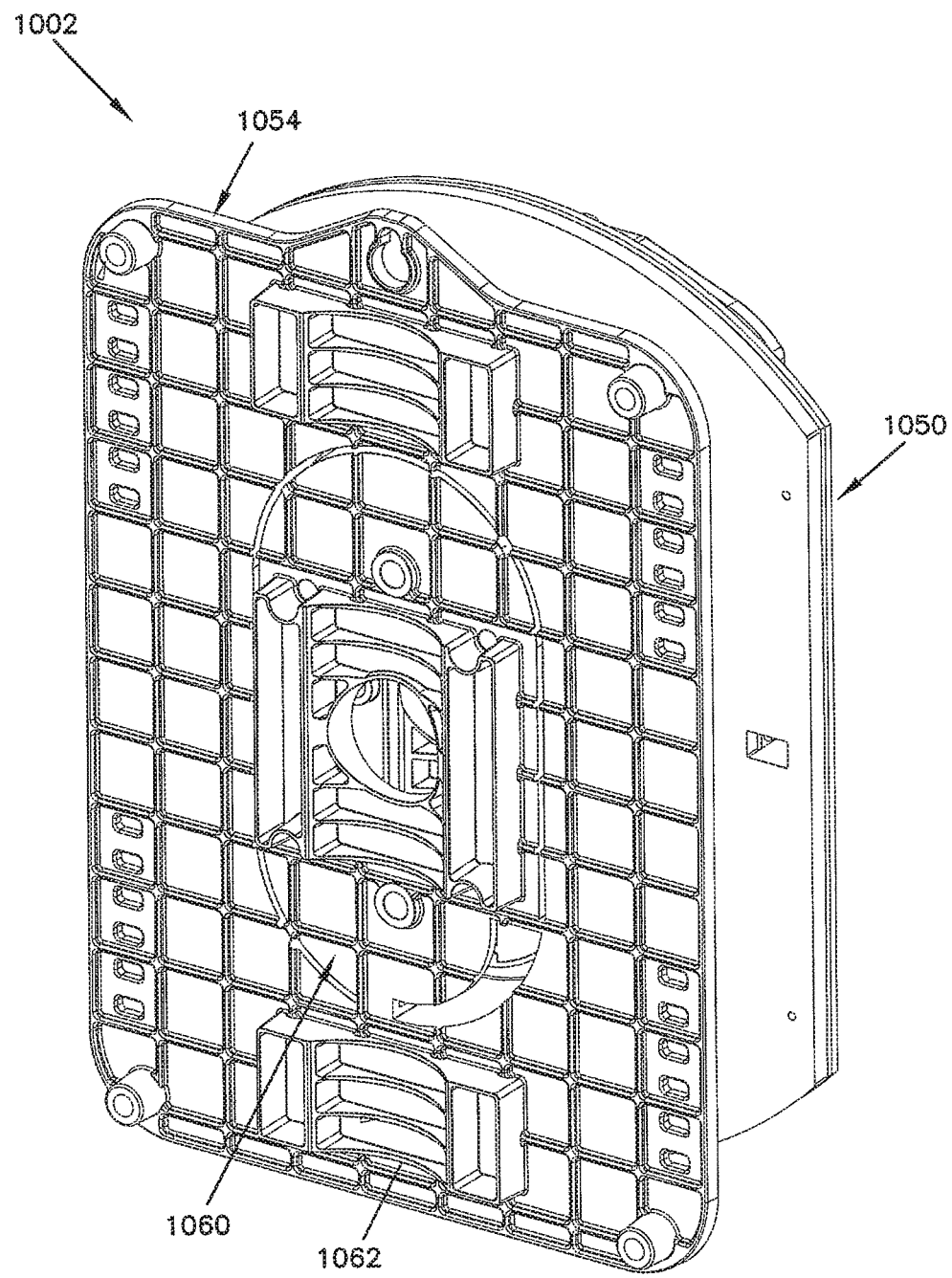
FIG. 29 is a rear perspective view of the drop terminal assembly of FIG. 26.
Figure 30:
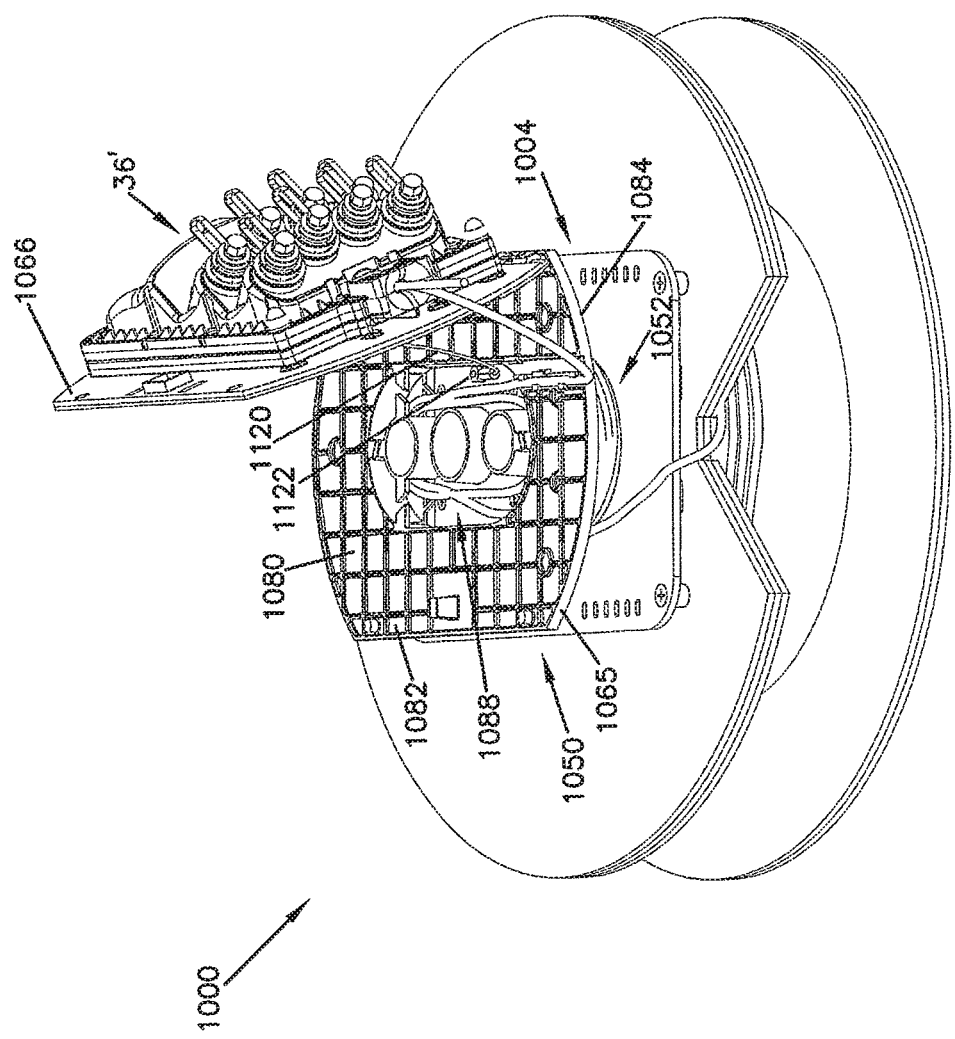
FIG. 30 is a perspective view of the spooling system of FIG. 23.
Figure 31:
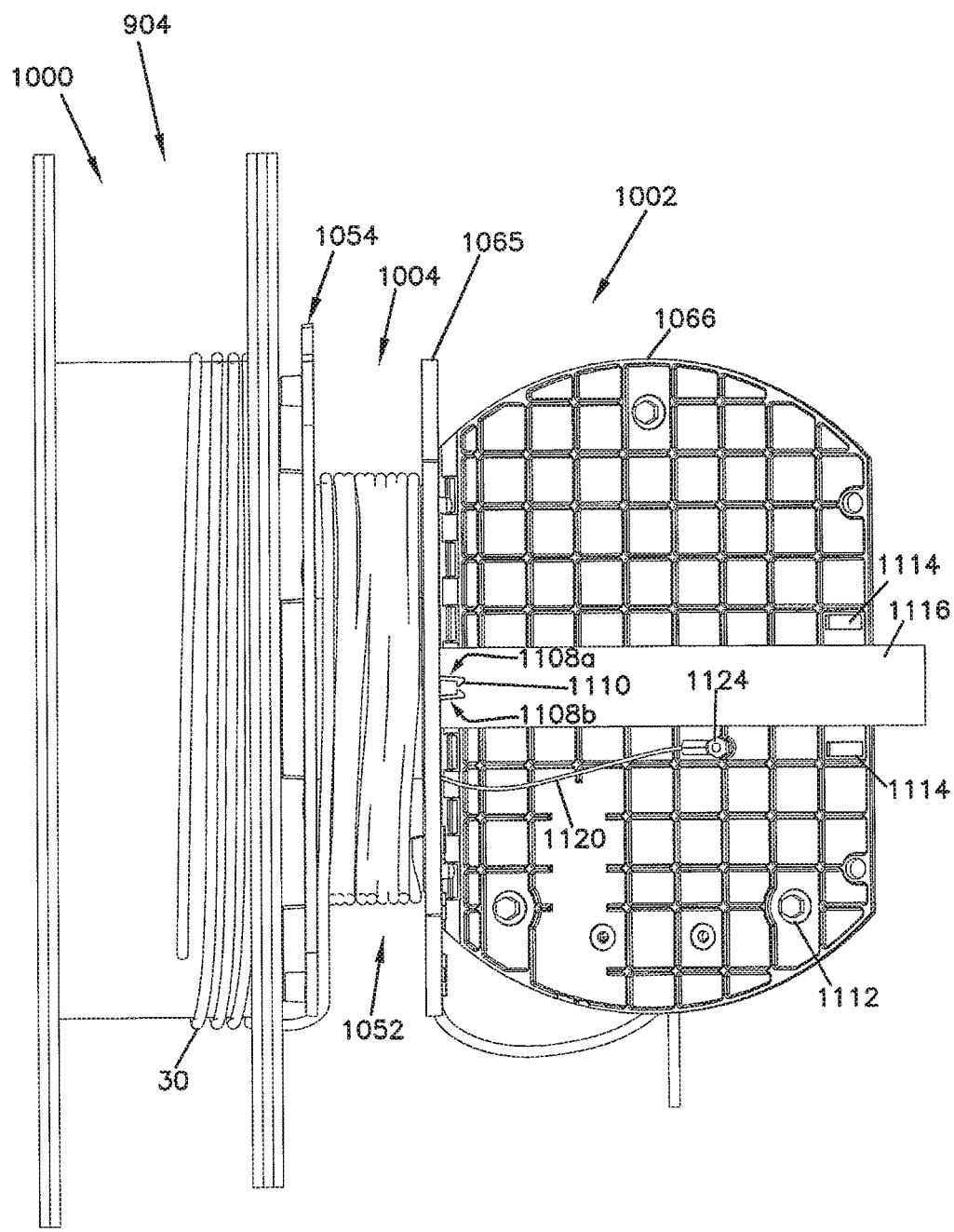
FIG. 31 is a side view of the spooling system of FIG. 23 with a mandrel.

Referring now to FIGS. 28, 30 and 31, the flange plate 1065 includes a base wall 1080 having a first surface 1082 and an oppositely disposed second surface 1084. The first surface 1082 faces toward the drop terminal 36' when the hinge plate 1066 is in the first position relative to the flange plate 1065. The second surface 1084 faces toward the drum portion 1052 of the slack storage spool 1004.

The flange plate 1065 further includes a cable management area 1088. In the subject embodiment, the cable management area 1088 is a recessed area. The cable management area 1088 includes a base 1090 that is axially offset from the base wall 1080 of the flange plate 1065 and a sidewall 1092 that extends between the base 1090 of the cable management area 1088 and the base wall 1080 of the flange plate 1065. The cable management area 1088 is adapted to be received in the inner cavity 1064 of the drum portion 1052.

The cable management area 1088 includes a first cable management spool 1094a and a second cable management spool 1094b. The first and second cable management spools 1094a, 1094b are offset from a central axis that extends axially through the center of the slack storage spool 1004.

In the subject embodiment, each of the first and second cable management spools 1094a, 1094b includes at least one cable retention projection 1096 that extends outwardly from an end 1097 of the first and second cable management spool 1094a, 1094b. In the subject embodiment, the cable retention projection 1096 extends outwardly from the cable management spool 1094 in a radial direction. The cable retention projection 1096 is aligned with a retention projection 1098 that extends inwardly from the sidewall 1092. A gap 1099 is disposed between an end of the cable retention projection 1096 and an end of the retention projection 1098 of the sidewall 1092 so that the multi-fiber cable 30 can be inserted in to the space between the cable management spool 1094 and the sidewall 1092.

The cable management area 1088 provides an additional location at which a portion of the multi-fiber cable 30 can be stored. Storage at this location is potentially advantageous during manufacturing as it allows for a length of cable to be stored prior to installation in the drop terminal 36'. In addition, the cable management area 1088 may provide a strain relief function. For example, as the spooling system 1000 is rotating during cable payout, the cable management area 1088 will reduce the risk of a tensile force being applied to the multi-fiber cable 30 at the access opening 1012 of the drop terminal 36' if all of the cable 30 is unwound from the bulk cable spool 904 and the slack storage spool 1004.

The sidewall 1092 of the cable management area 1088 defines a cable opening 1100 through which the multi-fiber cable 30 is routed to the cable management area 1088 from the drum portion 1052. In the subject embodiment, the cable opening 1100 is adapted to receive a transition portion 1102 disposed on an axial end, which is nearest the first flange 1050, of the drum portion 1052. The transition portion 1102 extends through the cable opening 1100 and into the cable management area 1088.

The base wall 1080 of the flange plate 1065 defines a cable channel 1104. The cable channel 1104 extends from the cable management area 1088 to an outer edge 1106 of the flange plate 1065. The cable channel 1104 is adapted to receive the multi-fiber cable 30 as the multi-fiber cable 30 is routed from the cable management area 1088 to the access opening 1012 of the drop terminal 36'.

The base wall 1080 includes a latch 1108. In the subject embodiment, the latch 1108 is a resilient latch that is adapted to engage a catch on the hinge plate 1066. In the subject embodiment, the latch 1108 includes a first resilient latch 1108a and a second resilient latch 1108b. Each of the first and second resilient latches 1108a, 1108b includes a protrusion 1110. In the subject embodiment, the protrusion 1110 of the first resilient latch 1108a faces the protrusion of the second resilient latch 1108b. Each protrusion 1110 engages the catch on the hinge plate 1066. The latch 1108 can be disengaged by moving the protrusion 1110 of the first resilient latch 1108a in a direction away from the protrusion 1110 of the second resilient latch 1108b.

Referring now to FIG. 31, the hinge plate 1066 includes a plurality of mounts 1112 at which the drop terminal 36' is mounted to the hinge plate 1066. In the depicted embodiment of FIG. 34, the hinge plate 1066 further includes a plurality of cable tie openings 1114. The cable tie openings 1114 extend through the hinge plate 1066 and are disposed adjacent to the catch. The cable tie openings 1114 are adapted to receive a cable tie that can be tied around a mandrel 1116. In the subject embodiment, the mandrel 1116 is a cylindrical bar that extends through a central opening that extends through the flange plate 1065, the drum portion 1052, the second flange 1054 and the bulk storage spool 904. In one embodiment, the mandrel 1116 can be held at opposite ends allowing the spooling system 1000 to rotate about the mandrel 1116 as multi-fiber cable 30 is paid out. The cable tie prevents the drop terminal 36' and the hinge plate 1066 from striking the mandrel 1116 as the spooling system 1000 rotates.

The second flange 1054 further includes a tether 1120. The tether 1120 includes a first end portion 1122 and an oppositely disposed second end portion 1124. The first end portion 1122 is engaged with the flange plate 1065 while the second end portion 1124 is engaged with the hinge plate 1066. The tether 1120 is adapted to prevent the hinge plate 1066 from opening beyond the second position.

In one embodiment, the hinge plate 1066 includes a mounting area similar to the mounting area 1060 on the second flange 1054. If the cable 30 is completely paid out from the bulk storage spool 904 and the slack storage spool 1004, the bulk storage spool 904, the second flange 1054, the drum portion 1052 and the flange plate 1065 can be removed from the spooling system 1000 such that the hinge plate 1066 and the drop terminal 36' can be directly mounted to a mounting structure.

Figure 32:
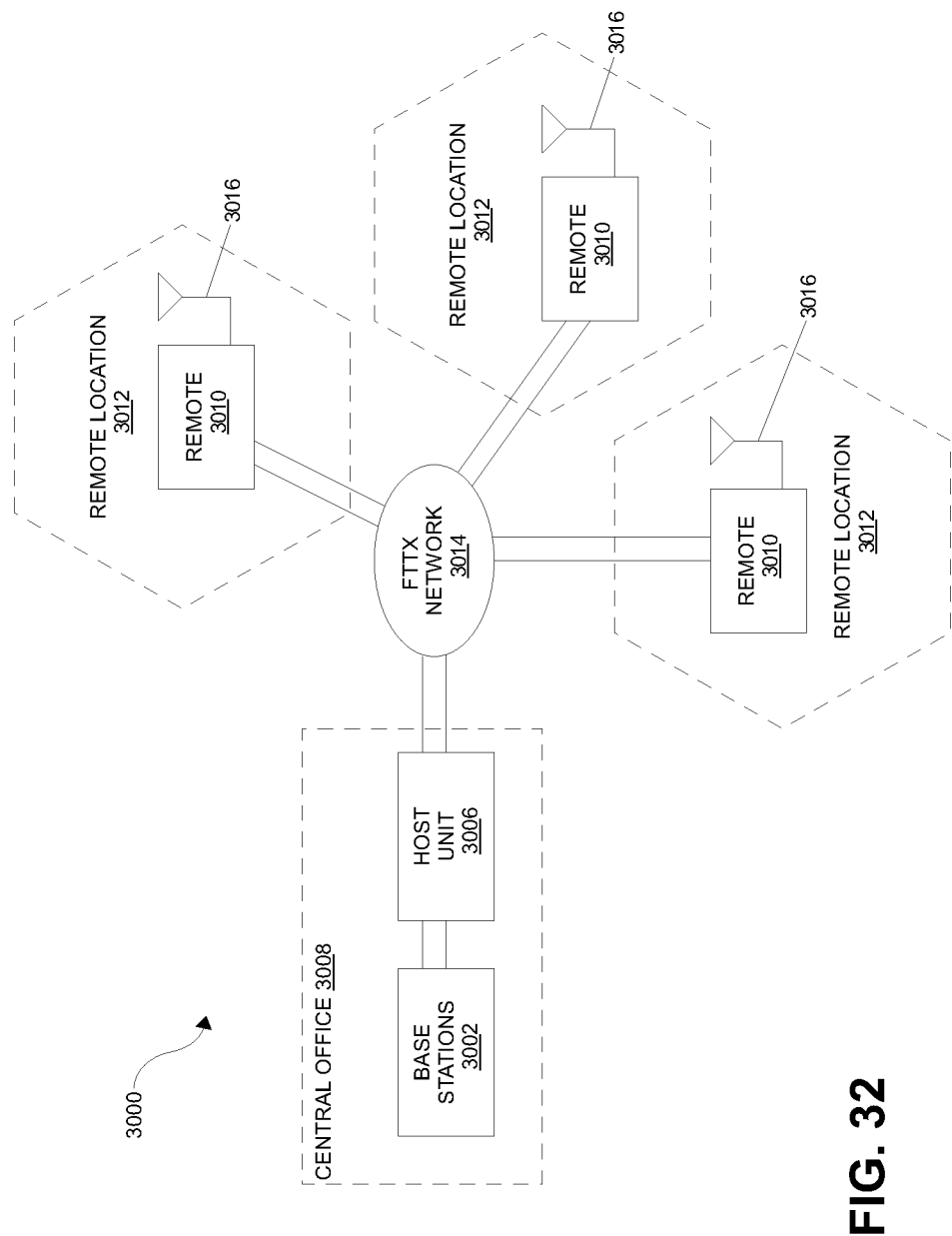
FIG. 32 is a block diagram of one exemplary embodiment of a distributed antenna system (DAS).

FIG. 32 is a block diagram of one exemplary embodiment of a distributed antenna system (DAS) 3000. The DAS 3000 is used to distribute bi-directional wireless communications between one or more base stations 3002 and one or more wireless devices (not shown in FIG. 32) (such as mobile wireless devices such as mobile telephones, mobile computers, and/or combinations thereof such as personal digital assistants (PDAs) and smartphones). In the example embodiment shown in FIG. 32, the DAS 3000 is used to distribute a plurality of bi-directional radio frequency bands. Each radio frequency band is typically used to communicate multiple logical bi-directional RF channels.

The techniques described here are especially useful in connection with the distribution of wireless communications that use licensed radio frequency spectrum, such as cellular radio frequency communications. Examples of such cellular RF communications include cellular communications that support one or more of the second generation, third generation, and fourth generation Global System for Mobile communication (GSM) family of telephony and data specifications and standards, one or more of the second generation, third generation, and fourth generation Code Division Multiple Access (CDMA) family of telephony and data specifications and standards, and/or the WIMAX family of specification and standards. In other embodiments, the DAS 3000 is used to distributed wireless communications that make use of unlicensed radio frequency spectrum such as wireless local area networking communications that support one or more of the IEEE 802.11 family of standards.

In the particular exemplary embodiment described here in connection with FIG. 32, the DAS 3000 is configured to distribute wireless communications that use frequency division duplexing to implement the logical bi-directional RF channels that are distributed by the DAS 3000. In other embodiments, the DAS 3000 is configured to communicate at least some wireless communications that use other duplexing techniques (such as time division duplexing, which is used, for example, in some WIMAX implementations).

In the particular example embodiment described here in connection with FIG. 32, each of the bi-directional radio frequency bands distributed by the DAS 3000 includes a separate radio frequency band for each of two directions of communications. One direction of communication goes from the base station 3002 to a wireless device and is referred to here as the "downstream" or "downlink" direction. The other direction of communication goes from the wireless device to the base station 3002 and is referred to here as the "upstream" or "uplink" direction. Each of the distributed bi-directional radio frequency bands includes a "downstream" band in which downstream RF channels are communicated for that bidirectional radio frequency band and an "upstream" band in which upstream RF channels are communicated for that bidirectional radio frequency band.

The DAS 3000 comprises a host unit 3006 that is deployed in a first location 3008 (for example, a central office of a telecommunication service provider). In the particular embodiment shown in FIG. 32, the DAS 3000 also comprises multiple remote units 3010 that are located at other locations 3012 that are remote from the first location 3008 (for example, near the premises of homes and/or businesses that otherwise receive wireline telecommunication services from the telecommunication service providers).

The host unit 3006 is communicatively coupled to the one or more base stations 3002 either directly via one or more telecommunications cable connections (for example, when the base stations 3002 are co-located with the host unit 3006 at the first location 3008) or indirectly via one or more donor antennas and one or more bidirectional amplifiers (for example, when the base stations 3002 are not co-located with the host unit 3006 at the first location 3008).

In the particular exemplary embodiment shown in FIG. 32, each remote unit 3010 is communicatively coupled to a respective antenna 3016 (for example, over a respective telecommunication cable). In other embodiments, the remote unit 3010 is communicatively coupled to multiple antennas and/or is integrated into a common package with one or more antennas.

The host unit 3006 is communicatively coupled to the remote units 3010 using an optical access network 3014. Non-limiting example optical networks suitable for use with the host unit 3006 and remote units 3010 include the passive fiber optic distribution network 20 of FIG. 1, the fiber optic distribution network 120 of FIG. 5, and the fiber optic distribution network 220 of FIG. 8. In the exemplary embodiment shown in FIG. 32, the optical access network 3014 is an existing fiber optical access network that is otherwise used to deliver "wireline" telecommunication services (for example, wireline telephony, video, or data services). The optical access network 3014 is also referred to here as an "FTTX" network 3014. Examples of FTTX networks 3014 include, without limitation, active and passive fiber-to-the-node (FTTN), networks, active and passive fiber-to-the-cabinet or fiber-to-the-curb (FTTC) networks, active and passive fiber-to-the-building or fiber-to-the-basement (FTTB) networks, fiber-to-the-home (FTTH) networks, and active and passive fiber-to-the premises (FTTP) networks and combinations thereof.

In the particular exemplary embodiment shown in FIG. 32, the host unit 3006 and the remote units 3010 are configured to connect to the optical access network 3014 using a pair of optical fibers—one of which is used to communicate data from the host unit 3006 to the remote unit 3010 (and is also referred to here as a "downstream" fiber) and the other of which is used to communicate data from the remote unit 3010 to the host unit 3006 (and is also referred to here as the "upstream" fiber). In other embodiments, the host unit 106 and the remote units 3010 are configured to connect to the optical access network 3014 using a single optical fiber (for example, where each such unit includes suitable multiplexing functionality).

RF signals (also referred to here as "downlink RF signals") transmitted from the base station 3002 are received at the host unit 3006. The host unit 3006 uses the downlink RF signals to generate a downlink transport signal that is distributed to the remote units 3010 via the FTTX network 3014. Each such remote unit 3010 receives the downlink transport signal and reconstructs the downlink RF signals based on the downlink transport signal and causes the reconstructed downlink RF signals to be radiated from the antenna 3016 coupled to or included in that remote unit 3010.

A similar process is performed in the uplink direction. RF signals (also referred to here as "uplink RF signals") transmitted from mobile units or other wireless devices are received at each remote unit 3010 (via the respective antenna 3016). Each remote unit 3010 uses the uplink RF signals to generate an uplink transport signal that is transmitted from the remote unit 3010 to the host unit 3006 via the FTTX network 3014. The host unit 3006 receives and combines the uplink transport signals transmitted from the remote units 3010. The host unit 3006 reconstructs the uplink RF signals received at the remote units 3010 and communicates the reconstructed uplink RF signals to the base station 3002. In this way, the coverage of the base station 3002 can be expanded using the DAS 3000 and an existing FTTX network 3014.

In some implementations of the embodiment shown in FIG. 32, the DAS 3000 is implemented as a digital DAS in which the downlink and uplink transport signals are generated by digitizing the downlink and uplink RF signals. For example, in one such implementation, for each of the bi-directional radio frequency bands distributed by the DAS 3000, the host unit 3006 receives downstream radio frequency signals for that bi-directional radio frequency band from the base station 3002 and band-pass filters the relevant downstream radio frequency band. The host unit 3006 down-converts the downstream radio frequency band for each bi-directional radio frequency band to an intermediate frequency version of the downstream radio frequency band and digitizes the resulting intermediate frequency version. In other words, the host unit 3010, for each of the bi-directional radio frequency bands distributed by the DAS 3000, generates digital samples of that respective downstream frequency band.

The host unit 3010 frames together digital samples for the downstream frequency bands (along with overhead data such as, for example, synchronization data and gain control data) and generates one or more downstream optical signals that are communicated over the FTTX network 3014 to the remote units 3010 (using one or more optical transmitters or other electrical-to-optical devices). Each remote unit 3010 receives the one or more downstream optical signals transmitted by the host unit 3006 (using one or more optical receivers or other optical-to-electrical devices). The downstream frames transmitted by the host unit 106 are recovered by each remote unit 3010. The remote unit 3010 removes the digital samples for the downstream frequency bands and uses a digital-to-analog process to recreate each of the analog downstream intermediate frequency versions of the downstream frequency bands that were digitized in the host unit 3006 (using the associated overhead data to, for example, synchronize the digital samples and adjust the gain of the IF signals). Each remote unit 3010 then up-converts each recreated downstream IF signal back to its original RF frequency band. The reconstructed downstream RF signals for each of the downstream RF frequency bands are combined and output to the relevant antenna 3016. The downstream RF signals are radiated from the antenna 3016 for reception by the relevant wireless devices.

A similar process is performed in the upstream direction in such an digital implementation. For each of the bi-directional radio frequency bands distributed by the DAS 3000, each remote unit 3010 receives upstream radio frequency signals for that bi-directional radio frequency band from any wireless devices that are transmitting in that upstream frequency band. The remote unit 3010 band-pass filters the received upstream RF signals. The remote unit 3010 down-converts the upstream radio frequency band for each bi-directional radio frequency band to an intermediate frequency version of the upstream radio frequency band and digitizes the resulting intermediate frequency version. In other words, each remote unit 3010, for each of the bi-directional radio frequency bands distributed by the DAS 3000, generates digital samples of that respective upstream frequency band.

Each remote unit 3010 frames together digital samples for the upstream frequency bands (along with overhead data such as, for example, synchronization data and gain control data) and generates one or more upstream optical signals that are communicated over the FTTX network 3014 to the host unit 3006 (using one or more optical transmitters or other electrical-to-optical devices).

The host unit 3006 receives the one or more upstream optical signals transmitted by each of the remote units 3010 (using one or more optical receivers or other optical-to-electrical devices). The upstream frames transmitted by each remote unit 3010 are recovered by the host unit 3006. The host unit 3006, for each upstream frequency band, combines the digital samples received from each of the remote units 3010 for that upstream frequency band. In one implementation of such an embodiment, the digital samples are combined by digitally summing, for each sample period, the digital samples received from each remote unit 3010 for each upstream frequency band. That is, in such an implementation, for each sample period, the respective digital samples for each upstream frequency band are added together (with suitable overflow control to keep the sum within the number of bits supported by the digital-to-analog process in the host unit 3006).

The host unit 3006 uses a digital-to-analog process to create analog upstream intermediate frequency signals for each of the upstream frequency bands (using the associated overhead data in the frames to, for example, synchronize the digital samples and adjust the gain of the resulting IF signals). The host unit 3006 then individually up-converts the analog upstream intermediate frequency signals for each of the upstream frequency bands back to the respective original radio frequency at which the corresponding signals were received at one or more of the remote units 3010. The resulting radio frequency versions of the upstream frequency bands are communicated to the one or more base stations 3002.

In such a digital DAS implementation, standard optical technology (such as SONET technology) can be used to frame and deframe the digital samples and overhead data and to send and receive the optical signals over the FTTX network 3014. In other implementations, proprietary technology can be used to frame and deframe the digital samples and overhead data and/or to send and receive the optical signals over the FTTX network 3014.

Examples of such digital DAS 3000 systems are described in U.S. patent application Ser. No. 11/627,251, entitled "MODULAR WIRELESS COMMUNICATIONS PLATFORM" filed on Jan. 25, 2007, U.S. patent application Ser. No. 11/627,255, entitled "A DISTRIBUTED REMOTE BASE STATION SYSTEM" filed Jan. 25, 2007, and U.S. patent application Ser. No. 12/686,488, entitled "SYSTEMS AND METHODS FOR IMPROVED DIGITAL RF TRANSPORT IN DISTRIBUTED ANTENNA SYSTEMS" filed Jan. 13, 2010, all of which are hereby incorporated herein by reference.

In some implementations of the embodiment shown in FIG. 32, the DAS 3000 is implemented as an analog DAS in which the downlink and uplink transport signals are generated by amplitude modulating an optical carrier signal with the relevant RF signals (or frequency-translated versions of the relevant RF signals). An example of such an analog DAS is described in U.S. Pat. No. 6,801,767, entitled "METHOD AND SYSTEM FOR DISTRIBUTING MULTIBAND WIRELESS COMMUNICATIONS SIGNALS", filed on Jan. 26, 2001, which is hereby incorporated herein by reference.

In some other embodiments, the DAS 3000 is implemented using a distributed base station architecture in which the host unit 3006 and the remote units 3010 includes base station functionality. For example, in such embodiment, the host unit 3006 comprises base station baseband signal processing functionality and base station control functionally and the remote units 3010 comprise remote radio heads. The remote radio heads include RF transceivers and power amplifiers. Digital baseband data is transported between the baseband processing located in the host unit 3006 and the remotely located RF transceivers located at the remote units 3010 using the FTTX network 3014. In some such embodiments, the host units 3006 and remote radio heads 3010 are configured to support specifications published by at least one of the Common Public Radio Interface (CPRI) consortium and the Open Base Station Architecture Initiative (OBSAI) consortium.

In some embodiments, the DAS 3000 is configured for use in a "neutral host" or "base station hotel" configuration in which multiple wireless service providers share a single DAS 3000. Examples of such neutral-host DAS systems are described in U.S. Pat. No. 6,785,558, entitled "SYSTEM AND METHOD FOR DISTRIBUTING WIRELESS COMMUNICATION SIGNALS OVER METROPOLITAN TELECOMMUNICATION NETWORKS" filed Dec. 6, 2002, and U.S. Pat. No. 6,963,552, entitled "MULTI-PROTOCOL DISTRIBUTED WIRELESS SYSTEM ARCHITECTURE" filed Mar. 27, 2001, all of which are hereby incorporated herein by reference.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

The invention claimed is:

1. A fiber distribution hub comprising:
   a cabinet defining an interior, the cabinet including a cabinet body having an open front, the cabinet also including a lockable door mounted on the cabinet body to pivot between open and closed positions, the door at least partially blocking access to the interior through the open front when disposed in the closed position, wherein access to the interior is provided through the open front when the door is disposed in the open position, the cabinet body also defining a cable entrance separate from the open front;

a termination field disposed within the interior of the cabinet and covered by the door when the door is disposed in the closed position, the termination field including a plurality of first ports exposed to and accessible from the open front when the door is disposed in the open position and a plurality of second ports;

a splitter region disposed within the interior of the cabinet; and a plurality of splitter modules disposed at the splitter region, each of the plurality of splitter modules outputting signals onto connectorized pigtails extending outwardly from the splitter module, each of the connectorized pigtails being received at the first ports of the termination field when in use, the plurality of splitter modules including a first splitter module having a passive optical power splitter and a second splitter module having a passive wavelength splitter, the passive optical power splitter of the first splitter module outputting power split optical signals onto the respective connectorized pigtails, the passive wavelength splitter of the second splitter module outputting wavelength split optical signals onto the respective connectorized pigtails, the first splitter module not having a passive wavelength splitter and the second splitter module not having a passive optical power splitter.

2. The fiber distribution hub of claim 1, further comprising an input cable routed into the interior of the cabinet, the input cable having an optical fiber optically coupled to an input of the passive optical power splitter.

3. The fiber distribution hub of claim 1, further comprising an input cable routed into the interior of the cabinet, the input cable having an optical fiber optically coupled to an input of the passive wavelength splitter.

4. The fiber distribution hub of claim 1, further comprising an input cable routed into the interior of the cabinet, the input cable having optical fibers optically coupled to inputs of the splitter modules disposed at the splitter region.

5. The fiber distribution hub of claim 4, wherein the optical fibers of the input cable are connectorized and are routed directly to the splitter modules.

6. The fiber distribution hub of claim 4, wherein the optical fibers of the input cable are routed to a cable interface at which the optical fibers of the input cable are optically coupled to splitter input pigtails.

7. The fiber distribution hub of claim 6, wherein the cable interface includes a splice tray.

8. The fiber distribution hub of claim 6, wherein the cable interface includes adapter modules.

9. The fiber distribution hub of claim 1, further comprising a storage region disposed within the interior of the cabinet, the storage region receiving connectors terminating the connectorized pigtails when the connectorized pigtails are not in use.

10. The fiber distribution hub of claim 1, further comprising a distribution cable extending from the cabinet to a drop terminal, the distribution cable having an optical fiber with a first connectorized end optically coupled to one of the second ports of the termination field, the optical fiber of the distribution cable having a second connectorized end received at the drop terminal.

11. The fiber distribution hub of claim 10, wherein the drop terminal provides connection locations for connecting an antenna node of a distributed antenna system to a fiber optic network.

12. The fiber distribution hub of claim 11, wherein the antenna node includes a remote unit including transmit and receive connection locations, wherein a first drop cable extends from a first connection location of the drop terminal to the transmit connection location of the remote unit, and wherein a second drop cable extends from a second connection location of the drop terminal to the receive connection location of the remote unit.

13. The fiber distribution hub of claim 10, wherein the optical fiber of the distribution cable is one of a plurality of optical fibers of the distribution cable, and wherein the first connectorized end of the optical fiber of the distribution cable includes a multi-fiber connector terminating the plurality of optical fibers.

14. The fiber distribution hub of claim 1, wherein the passive wavelength splitter is a dense wavelength division multiplexer.

15. The fiber distribution hub of claim 1, wherein the passive wavelength splitter is a coarse wavelength division multiplexer.

16. A fiber distribution hub for connecting an antenna node of a distributed antenna system to a fiber optic network comprising:

a cabinet defining an interior;

a termination field disposed within the interior of the cabinet, the termination field including fiber optic adapters;

a splitter region disposed within the interior of the cabinet;

a plurality of splitter modules disposed at the splitter region, each of the plurality of splitter modules outputting signals onto connectorized pigtails extending outwardly from the splitter module, each of the connectorized pigtails being received at the termination field when in use, the plurality of splitter modules including a passive optical power splitter and a passive wavelength splitter;

an antenna node including a remote unit including transmit and receive connection locations;

a distribution cable extending from the cabinet to a drop terminal, the first distribution cable having an optical fiber with a first connectorized end received at the termination field, the optical fiber of the distribution cable having a second connectorized end received at the drop terminal, the drop terminal providing connection locations;

a first drop cable extending from a first of the connection locations of the drop terminal to the transmit connection location of the remote unit; and a second drop cable extending from a second of the connection locations of the drop terminal to the receive connection location of the remote unit.

17. The fiber distribution hub of claim 1, further comprising:

a first input fiber routed into the interior of the cabinet, the first input fiber being optically coupled to an input of the first splitter module without passing through a passive wavelength splitter; and a second input fiber routed into the interior of the cabinet, the second input fiber being optically coupled to an input of the second splitter module.

18. The fiber distribution hub of claim 1, wherein the termination field is pivotally mounted within the cabinet body.

* * * * *